US007085099B2

(12) United States Patent
Sasaki et al.

(10) Patent No.: US 7,085,099 B2
(45) Date of Patent: Aug. 1, 2006

(54) THIN FILM MAGNETIC HEAD HAVING SPIRAL COILS AND MANUFACTURING METHOD THEREOF

(75) Inventors: Yoshitaka Sasaki, Milpitas, CA (US); Kazuo Ishizaki, Milpitas, CA (US); Takehiro Kamigama, Kwai Chung (HK)

(73) Assignees: Headway Technologies, Inc., Milpitas, CA (US); SAE Magnetics (Hong Kong) Limited, Shatin (HK)

( * ) Notice: Subject to any disclaimer, the term of this patent is extended or adjusted under 35 U.S.C. 154(b) by 110 days.

(21) Appl. No.: 10/759,005

(22) Filed: Jan. 20, 2004

(65) Prior Publication Data
US 2005/0157423 A1     Jul. 21, 2005

(51) Int. Cl.
G11B 5/17       (2006.01)
G11B 5/147      (2006.01)
(52) U.S. Cl. .................................. 360/123; 360/126
(58) Field of Classification Search ................ 360/126, 360/123
See application file for complete search history.

(56) References Cited

U.S. PATENT DOCUMENTS

| 5,796,564 | A | * | 8/1998 | Shouji et al. ............... 360/123 |
| 6,043,959 | A | | 3/2000 | Crue et al. |
| 6,191,916 | B1 | | 2/2001 | Sasaki |
| 6,204,997 | B1 | | 3/2001 | Sasaki |
| 6,259,583 | B1 | | 7/2001 | Fontana, Jr. et al. |
| 6,541,065 | B1 | | 4/2003 | Sasaki et al. |
| 6,751,052 | B1 | * | 6/2004 | Tagawa et al. ............. 360/126 |
| 6,762,911 | B1 | | 7/2004 | Sasaki et al. |
| 2005/0157423 | A1 | | 7/2005 | Sasaki et al. |

OTHER PUBLICATIONS

U.S. Appl. No. 10/682,732, filed Oct. 10, 2003, Sasaki et al.
U.S. Appl. No. 10/687,634, filed Oct. 20, 2003, Sasaki et al.
U.S. Appl. No. 10/782,930, filed Feb. 23, 2004, Sasaki et al.
U.S. Appl. No. 10/759,005, filed Jan. 20, 2004, Sasaki et al.
U.S. Appl. No. 10/067,911, filed Feb. 8, 2002, Sasaki et al.
U.S. Appl. No. 10/673,172, filed Sep. 30, 2003, Sasaki et al.
U.S. Appl. No. 11/134,447, filed May 23, 2005, Sasaki et al.
U.S. Appl. No. 11/109,671, filed Apr. 20, 2005, Sasaki et al.

* cited by examiner

Primary Examiner—A. J. Heinz
(74) Attorney, Agent, or Firm—Oblon, Spivak, McClelland, Maier & Neustadt, P.C.

(57) ABSTRACT

The invention is directed to improvement of a write element of a thin film magnetic head. In the write element, a lower coil surrounds in a spiral form a back gap portion, arranged within a height of a lower pole. An upper coil is disposed above the lower coil, surrounding in a spiral form the back gap portion and arranged within a height of an upper pole. A gap film is at an intermediate level in the pole length that is defined by the height of the lower pole and the height of the upper pole.

19 Claims, 80 Drawing Sheets

THIN FILM MAGNETIC HEAD HAVING SPIRAL COILS AND MANUFACTURING METHOD THEREOF

BACKGROUND OF THE INVENTION

1. Field of the Invention

The present invention relates to a thin film magnetic head, a magnetic recording device using the same and a method for manufacturing the same, and particularly to improvement of a thin film magnetic head.

2. Discussion of Background

In recent years, the improvement in performance of a thin film magnetic head is demanded with the improvement in areal recording density of a hard disk device. A thin film magnetic head is composed of a layered structure of a write element for writing and a read element utilizing a magnetoresistance effect for reading. Particularly, recent GMR heads are close to exceed 150 to 200 (GB/P) in areal recording density. A GMR film is of a multilayer structure having a plurality of layers combined with one another. There are some kinds of mechanisms for generating GMR, and the layered structure of a GMR film varies according to the mechanism. As a GMR film for mass production, there are known a spin valve film (hereinafter, referred to as an SV film) and a ferromagnetic tunnel junction film (hereinafter, referred to as a TMR film).

On the other hand, with the improvement in performance of a read element, the improvement in performance of a write element also is demanded. In order to improve a write element in recording density, it is necessary to achieve a narrow track structure, which provides an increased track density. As a means for achieving a narrow track structure, there is known a technique of applying a submicron process onto an upper pole by a semiconductor process technology. However, if the track width is reduced by a semiconductor process technology, difficulty in obtaining a sufficient write magnetic flux arises. To compensate for this disadvantage, a high saturation magnetic flux material (hereinafter, referred to as a HiBs material) is usually used for a narrow track pole.

And in case of a thin film magnetic head for a notebook-sized personal computer, a desktop personal computer, or a high frequency type computer often used as a server or a workstation, excellent high-frequency response characteristic is required. And in a recent hard disk drive, greater access speed is required, and in order to meet the requirement for speed, a compact thin-film magnetic head is required.

The high-frequency characteristic can be improved by shortening the yoke length from a back gap to a pole. Combination of shortening the yoke length YL and using a HiBs material for a pole makes it possible to keep high levels in NLTS, an over-write characteristic (hereinafter, referred to as an O/W characteristic) or the like up to a high-frequency band (500 MHz to 1000 MHz).

Various kinds of techniques for shortening the yoke length are conceivable. One technique is to make a coil pitch as narrow as possible. However, this technique has the following problems.

First, if the coil pitch is narrowed, the coil decreases in width and increases in resistance. As a result, the coil generates heat and the heat raises thermal expansion in the periphery of a pole, namely, thermal protrusion of pole. Since the thermal protrusion causes the possibility of collision between a magnetic head and a recording medium, the thermal protrusion hinders the reduction in floating height of a slider indispensable for high-density recording. Therefore, a technique of shortening the yoke length by narrowing the coil pitch has a limit.

Next, with the advance of narrowing the coil pitch, a photolithography process for forming a coil becomes more difficult. The reason is that the narrower the coil pitch is, the worse the reflection in exposure affects a photolithography process for forming the coil. Unless some prevention of the reflection is taken, it is impossible to form an accurate and vertical coil. For example, in cases where a coil of 1.5 µm or more in coil height and 0.3 to 0.5 µm in coil pitch is formed by means of an existing photolithography technique, the yield rate remarkably lowers.

Another technique for shortening the yoke length YL is to reduce the number of coil turns. In this case, the resistance of coil can be reduced by increasing the height of coil. However, since this method reduces the number of coil turns, it cannot provide a sufficient write magnetic flux and causes a defective O/W characteristic. And it is very difficult to make high a coil having a narrow coil pitch and particularly, when the coil is formed by plating and then a seed layer is etched by ion beams, short-circuiting between the coil turns occurs frequently.

Generally, a write element of a thin film magnetic head is designed so that the minimum coil width of the coil closest to the air bearing surface (hereinafter, referred to as ABS) determines the yoke length YL. Since the total length of this minimum coil width determines a coil resistance of 60 to 70% or more of the total coil resistance, it is necessary to make the total length of the minimum coil width as short as possible in order to shortening the yoke length YL. If a coil with wide coilturns is used to reduce the coil resistance, the yoke length YL cannot be shortened and such a write element has an inferior high-frequency characteristic, and inferior NLTS and O/W characteristic in a high frequency range, which causes the reduction in yield rate.

A conceivable structure for increasing the coil sectional area (increasing the coil height) to increase the number of coilturns and decrease the coil resistance as keeping the yoke length YL short, is a structure in which coils are stacked in the layered form such as two layers or three layers. However, such a layered structure increases the distance between a write gap film and a GMR sensor and so, it has difficulty in achieving both a narrow GMR height (reader portion) and a narrow throat (write portion) in case of polishing the ABS in the polishing process for forming the slider. In some angles of polishing the slider, the throat height varies greatly.

As a means for improving the high-frequency characteristic of a thin film magnetic head, various prior arts have been proposed up to now. For example, the specification of U.S. Pat. No. 6,043,959 discloses a technique in which a second yoke (upper yoke) is made flat to reduce the mutual inductance of coils and thus improve the high-frequency characteristic. The specification of U.S. Pat. No. 6,259,583B1 discloses a structure in which high-permeability and low-anisotropy layers and non-magnetic layers are alternately stacked to form a second flat yoke.

The flat pole structures as disclosed in the above-mentioned prior arts are defined by photolithography. In order to enhance the recording density in the flat pole structures, it is necessary to apply a submicron process onto the pole portion through a semiconductor processing technique and achieve a narrow-track structure. However, in the submicron process there are the problems described above. The above-mentioned prior arts do not disclose a means for solving those problems.

SUMMARY OF THE INVENTION

An object of the present invention is to provide a thin film magnetic head and a magnetic recording device in which a coil resistance is lowered as increasing the number of coil turns and the quantity of generated heat is reduced.

Another object of the present invention is to provide a thin film magnetic head and a magnetic recording device having a shortened yoke length and an improved high-frequency characteristic.

A further object of the present invention is to provide a thin film-magnetic head and a magnetic recording device in which it is possible to avoid nonuniformity in throat height in case of polishing the ABS and meet the demand for a low floating height of a slider indispensable for high-density recording.

In order to achieve the above-mentioned objects, a thin film magnetic head according to the present invention has a write element comprising a lower yoke, a lower pole, an upper yoke, an upper pole, a gap film, a lower coil, and an upper coil.

The lower pole projects from one surface of the lower yoke at a medium-facing surface side and has a reduced track width at its upper end adjacent to the gap film.

The upper yoke is disposed at a distance from the lower yoke and is connected to the lower yoke by a back gap portion that is recessed in the thin film magnetic head from the medium-facing surface.

The upper pole is adjacent to the gap film, faces the lower pole with the gap film interposed between the lower pole and the upper pole, and has the top surface adjacent to one surface of the upper yoke;

The lower coil surrounds in a spiral form the back gap portion, arranged within the height of the lower pole in relation to said one surface of the lower yoke.

The upper coil is disposed above the lower coil, surrounding in a spiral form the back gap portion and arranged within the height of the upper pole in relation to said one surface of the upper yoke.

The gap film is at an intermediate level in the pole length that is defined by the height of the lower pole and the height of the upper pole.

As described above, in a thin film magnetic head according to the present invention, a lower pole projects from one surface of a lower yoke at a medium-facing surface side, an upper yoke is disposed at a distance from the lower yoke and is connected to the lower yoke by a back gap portion that is recessed in the thin film magnetic head from the medium-facing surface, and an upper pole is adjacent to a gap film, faces the lower pole with the gap film interposed between the lower pole and the upper pole, and has the top surface adjacent to one surface of the upper yoke. Consequently, a thin film magnetic circuit going through the lower yoke, the lower pole, the gap film, the upper pole, the upper yoke, and the back gap portion is formed. The gap film functions as a convert gap.

Since the lower coil surrounds in a spiral form the back gap portion and the upper coil also surrounds in a spiral form the back gap portion, the total number of coil turns of the lower coil and the upper coil becomes the number of coil turns. Consequently, increase in the number of coil turns is achieved.

The lower coil is arranged within the height of the lower pole in relation to the one surface of the lower yoke, and the upper coil is arranged within the height of the upper pole in relation to the one surface of the upper yoke. Consequently, the height of the lower coil can be increased up to a dimension determined by the height of the lower pole. In the same way, the height of the upper coil can be also increased up to a dimension determined by the height of the upper pole.

In addition, the upper coil is disposed above the lower coil and so, a coil-layer structure utilizing the space between the lower yoke and the upper yoke is obtained. The coil-layer structure, unlike the structure of coils disposed on the same plane, makes it possible to increase the width of the lower coil and the width of the upper coil while increasing the number of coil turns. And, the coil-layer structure makes it possible to shorten the yoke length while increasing the number of coil turns, and consequently improve the high-frequency characteristic.

As described above, since it is possible to increase the lower coil and the upper coil in height and width while increasing the total number of coil turns of them, the coils are necessarily increased also in sectional area. As a result, it is possible to decrease the coil resistance while increasing the number of coil turns, and consequently decrease the quantity of generated heat.

In addition, the lower coil is arranged within the height of the lower pole, the upper coil is arranged within the height of the upper pole, and the gap film is at an intermediate level in the pole length that is defined by the height of the lower pole and the height of the upper pole. As a result, it is possible to balance the height of the lower pole disposed in the lower side of the gap film, with the height of the upper pole disposed in the upper side of the gap film, in spite of a coil-layer structure. Consequently, in case of polishing the ABS, uniformity in polishing quantity is achieved on the lower pole and the upper pole, which are disposed in both sides of the gap film. As a result, it is possible to avoid the collision between a magnetic head and a recording medium, which is caused by nonuniformity in polishing quantity. Consequently, it is possible to meet the demand for a low floating height of a slider, which is indispensable for high-density recording.

In the thin film magnetic head according to the present invention, the lower coil may comprise a first coil and a second coil. One of the first and second coils is fitted into the space between coil turns of the other, insulated from the coil turns of the other.

An insulating film between the first coil and the second coil can be formed as a very thin $Al_2O_3$ film of about 0.1 μm in thickness by applying chemical vapor deposition (hereinafter, referred to as CVD) or the like. Therefore, it is possible to maximize sectional areas of the first and second coils between the back gap portion and the lower pole portion, and decrease the coil resistance as keeping the number of coil turns, and consequently reduce the quantity of generated heat. This makes it possible to suppress the occurrence of thermal protrusion in the poles during a write operation, avoid a head crash and the damage or destruction of a magnetic record on a magnetic recording medium and consequently meet the demand for a low floating height for a high recording density.

Since one of the first coil and the second coil is fitted into the space between coil turns of the other, insulated from the coil turns of the other by a second insulating film, high wiring density of coil conductors is achieved. This makes it possible to shorten the yoke length YL while keeping the same number of coil turns.

The first coil and the second coil are connected to each other so as to generate magnetic flux in the same direction. Since the first coil and the second coil are the same in winding direction, it is possible to generate magnetic fluxes in the same direction by making a series-connection structure in which the inner end of the first coil and the outer end of the second coil are connected to each other. Alternatively, magnetic fluxes in the same direction may be generated by connecting the first coil and the second coil in parallel with each other. In this case, reduction in coil resistance is achieved though the number of coil turns decreases.

The upper coil may comprise a third coil and a fourth coil. One of the third and fourth coils is fitted into the space between coil turns of the other, insulated from the coil turns of the other by a fourth insulating film. The third and fourth coils are connected to each other so as to generate magnetic flux in the same direction as each other and are further connected to the above-mentioned lower coil so as to generate magnetic flux in the same direction as the lower coil. In a thin film magnetic head of this aspect, the number of coil turns is increased by the third and fourth coils and so, a magnetomotive force for writing is increased.

In the thin film magnetic head according to the present invention, the lower pole may comprise a plurality of lower pole films. In this structure, a first pole film is formed of the lower yoke. A second lower pole film is adjacent to the first lower pole film and has one surface flattened to the same level as the lower coil. The other lower pole films are disposed in order adjacently to one another on the second lower pole film, and each of said other lower pole films has one surface flattened to the same level as an insulating film disposed in the vicinity of this film. The uppermost film of said other lower pole films is adjacent to the gap film.

As described above, since the second lower pole film has one surface flattened to the same level as the lower coil, it is possible to form an insulating film uniform in thickness on the flattened surface. In the prior art, if the lower pole is made low in height, a photoresist covering a coil recedes in a photolithography process and the coil is exposed and as a result, short-circuiting occurs between coils and further between the lower pole and the coil. In the present invention, since the surfaces of the second lower pole film and the coil are flattened so that an insulating film can be formed uniform in thickness thereon, the insulating film formed on the flattened surface protects the coil and so, it is possible to prevent damage to the coil even if the height of the second pole film (distance from the ABS toward the coil) is shortened.

And since a common insulating film can be provided onto the first and second coils forming the lower coil, an insulating structure on the upper surface of the lower coil is simplified. Furthermore, in case of forming another component on the lower coil, it is possible to provide a stable base and consequently form the said component as a high-accuracy pattern.

In a more specific structure, the lower pole may comprise a third lower pole film and a fourth lower pole film. The third lower pole film is adjacent to the second lower pole film. The fourth lower pole film is adjacent to the third lower pole film, being the uppermost film in the lower pole.

The upper pole also comprises a plurality of upper pole films. The upper pole films are disposed in order adjacently to one another on the gap film, and the uppermost film of the upper pole films is adjacent to the upper yoke.

More specifically, the upper pole comprises first to third upper pole films. The first upper pole film is adjacent to the gap film, the second upper pole film is adjacent to the first upper pole film, and the third upper pole film is adjacent to the second upper pole film.

The thin film magnetic head according to the present invention may comprise a coil-connecting conductor. The coil-connecting conductor comprises first to sixth connecting conductor films.

The first connecting conductor film is formed of the inner end of the first coil and has the surface flattened to the same level as the first coil, the second coil and the second lower pole film.

The second connecting conductor film is made of the same material as the first connecting conductor film, and is disposed on said surface of the first connecting conductor film, and has the surface flattened to the same level as the third lower pole film that is adjacent to the second lower pole film.

The third connecting conductor film is adjacent to the second connecting conductor film, the fourth connecting conductor film is adjacent to the third connecting conductor film, the fifth connecting conductor film is adjacent to the fourth connecting conductor film, and the sixth connecting conductor film is adjacent to the fifth connecting conductor film.

And the back gap portion comprises first to sixth back gap films. The first back gap film is made of the same material as the second lower pole film, is disposed on said one surface of the lower yoke and has the surface flattened to the same level as the first coil, the second coil and the second lower pole film.

The second back gap film is made of the same material as the third lower pole film, and is disposed on the second back gap film, and has the surface flattened to the same level as the third lower pole film.

The third back gap film is adjacent to the second back gap film. The fourth back gap film is adjacent to the third back gap film. The fifth back gap film is adjacent to the fourth back gap film. The sixth back gap film is adjacent to the fifth back gap film.

According to the above-described structure, since the first to sixth connecting conductor films forming the coil-connecting conductor and the first to sixth back gap films forming the back gap portion can be formed on the same flattened surfaces by specific processes required for the respective films, easy fabrication is achieved.

More specifically, the surfaces of the third lower pole film, the second connecting conductor film and the second back gap film are flattened to the same level as one another. The surfaces of the fourth lower pole film, the third connecting conductor film and the third back gap film are flattened to the same level as one another. The surfaces of the first upper pole film, the fourth connecting conductor film and the fourth back gap film are flattened to the same level as one another. The surfaces of the second upper pole film, the fifth connecting conductor film and the fifth back gap film are flattened to the same level as one another. The surfaces of the third upper pole film, the sixth connecting conductor film and the sixth back gap film are flattened to the same level as the top surfaces of the third coil and the fourth coil. The upper yoke has one end adjacent to the third upper pole film and the other end adjacent to the sixth back gap film.

According to the above-described structure, since the first to sixth connecting conductor films forming the coil-connecting conductor, the first to sixth back gap films forming the back gap portion, the lower pole films, and the upper pole films can be formed on the same flattened surfaces by specific processes required for the respective films, easy fabrication is achieved.

In the present invention, since the lower pole is of a structure in which a plurality of lower pole films are adjacent to one another in order, it is possible to select magnetic materials and processes suitable for the respective pole films, thereby obtaining a write element with a narrow track width and high write characteristics. For example, the lower pole made of CoFeN (2.4 T), which is a magnetic material having a high saturation magnetic flux density, makes it possible to obtain a write element in which magnetic flux generated in the coil reaches a write pole region effectively without saturation on the way, thereby achieving a little flux loss.

In the stage of forming the upper pole P2, a great part of the lower pole P1 has already been formed, so it is possible to form the upper pole P2 with a material and process suitable for the upper pole P2. For example, the upper pole P2 is made of CoFex or FeNx, which is a HiBs material, and reactive ion etching (hereinafter, referred to as RIE) is applied to the upper pole P2 to form an intermediate shape, using a plating layer of CoNiFe or an insulating film of alumina as a mask, and ion beam etching (hereinafter, referred to as IBE) is applied to obtain the final shape. This makes it possible to achieve narrower track widths than in photolithography. Specifically, it is possible to achieve track widths of 0.1 μm or less with high degree of accuracy, which are required for 150 GB/in$^2$ to 200 GB/in$^2$. Consequently, it is possible to accurately control track widths of 0.1 to 0.2 μm or less, which has been thought to be impossible in mass production up to now.

And since the upper pole can be made high as a whole by using a HiBs material, the magnetic volume is increased. In the upper pole of the above-mentioned structure, use of an alumina mask material provides a narrower track width than in the prior art. Consequently, it is possible to form an upper pole of 150 GB/in$^2$ to 200 GB/in$^2$ with high degree of accuracy, without reducing the magnetic volume of its fore-end.

The present invention also discloses a magnetic head device comprising a thin film magnetic head and a head supporting device combined with each other, a magnetic recording/reproducing apparatus comprising this magnetic head device and a magnetic recording medium (hard disk) combined with each other, and a method for manufacturing a thin film magnetic head.

Other objects, structures and advantages of the present invention are described in more detail with reference to the accompanying drawings. The drawings are only exemplifications.

DETAILED DESCRIPTION OF THE PREFERRED EMBODIMENTS

1. Thin Film Magnetic Head

Figure 1:
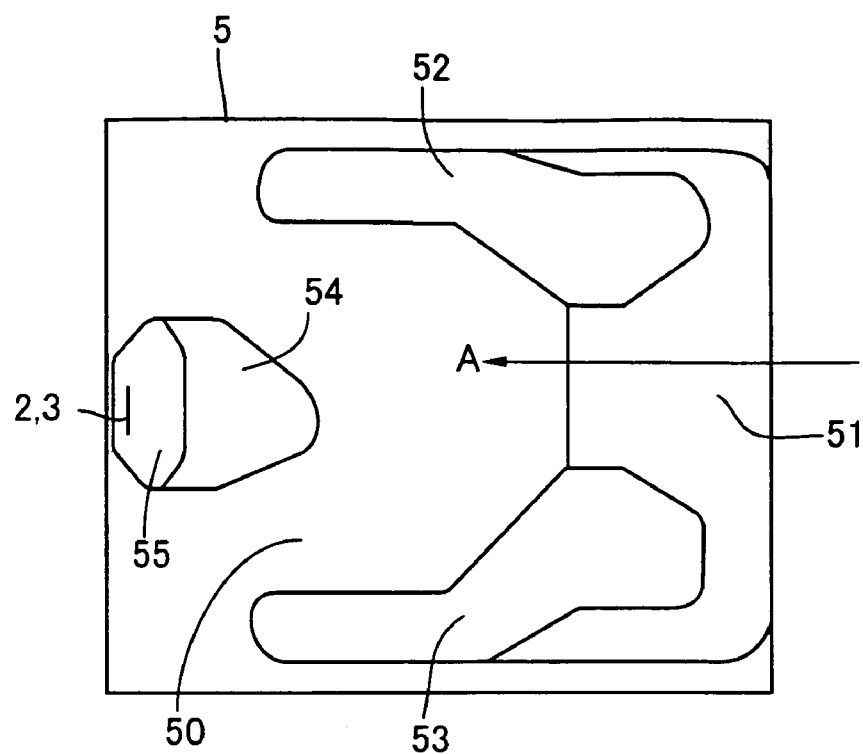
FIG. 1 is a diagram of a thin film magnetic head according to the present invention, seen from the ABS side.
Figure 2:
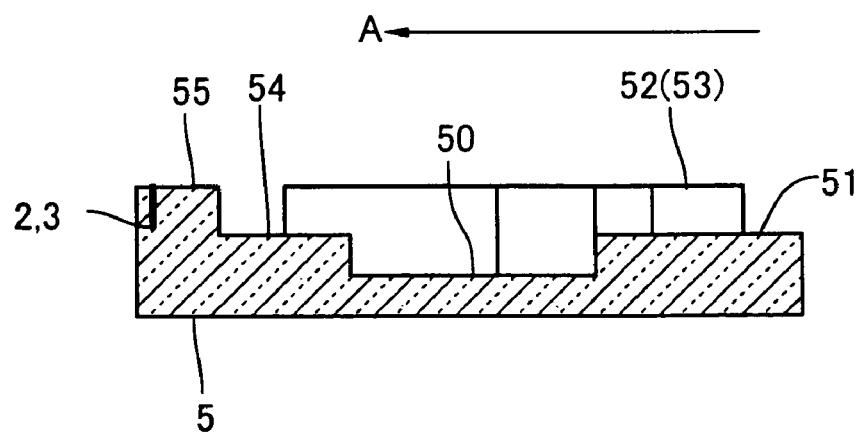
FIG. 2 is a sectional view of the thin film magnetic head shown in FIG. 1.

Referring to FIGS. 1 to 4, a thin film magnetic head according to the present invention comprises a slider 5, a write element 2 and a read element 3. The slider 5 is, for example, a ceramic structure having a base body 15 of $Al_2O_3$—TiC or the like with an insulating film 16 of $Al_2O_3$, $SiO_2$ or the like provided on the surface of the base body (see FIG. 3). The slider 5 has, in the medium-facing surface, a geometrical shape for controlling a floating characteristic. As a representative example of such a geometrical shape, there is shown an example being provided with a first step part 51, a second step part 52, a third step part 53, a fourth step part 54 and a fifth step part 55 on a base face 50 at the ABS side. The base face 50 becomes a negative pressure generating portion in relation to air flowing direction shown by the arrow F1, and the second step part 52 and the third step part 53 form a step-shaped air bearing rising from the first step part 51. The surfaces of the second step part 52 and the third step part 53 form an ABS. The fourth step part 54 stands up in the shape of a step from the base face 50 and the fifth step part 55 stands up in the shape of a step from the fourth step part 54. Electromagnetic converter elements 2 and 3 are provided in the fifth step part 55.

The electromagnetic converter elements 2 and 3 comprise a write element 2 and a read element 3. The write element 2 and the read element 3 are provided at the air flowing-out end (trailing edge) side in relation to the air flowing direction A.

Figure 3:
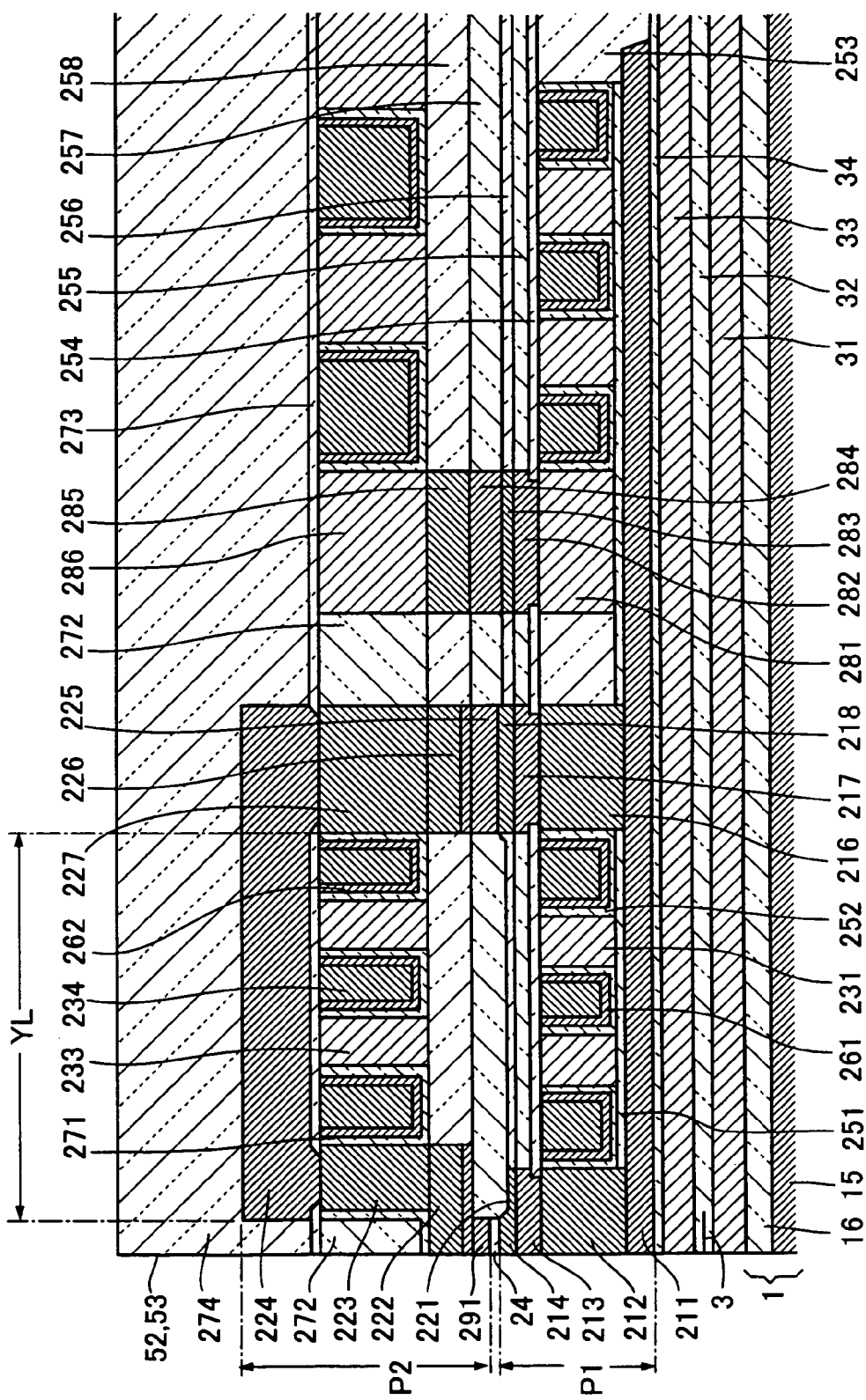
FIG. 3 is a magnified sectional view of an electromagnetic converter portion of the thin film magnetic head shown in FIGS. 1 and 2.
Figure 4:
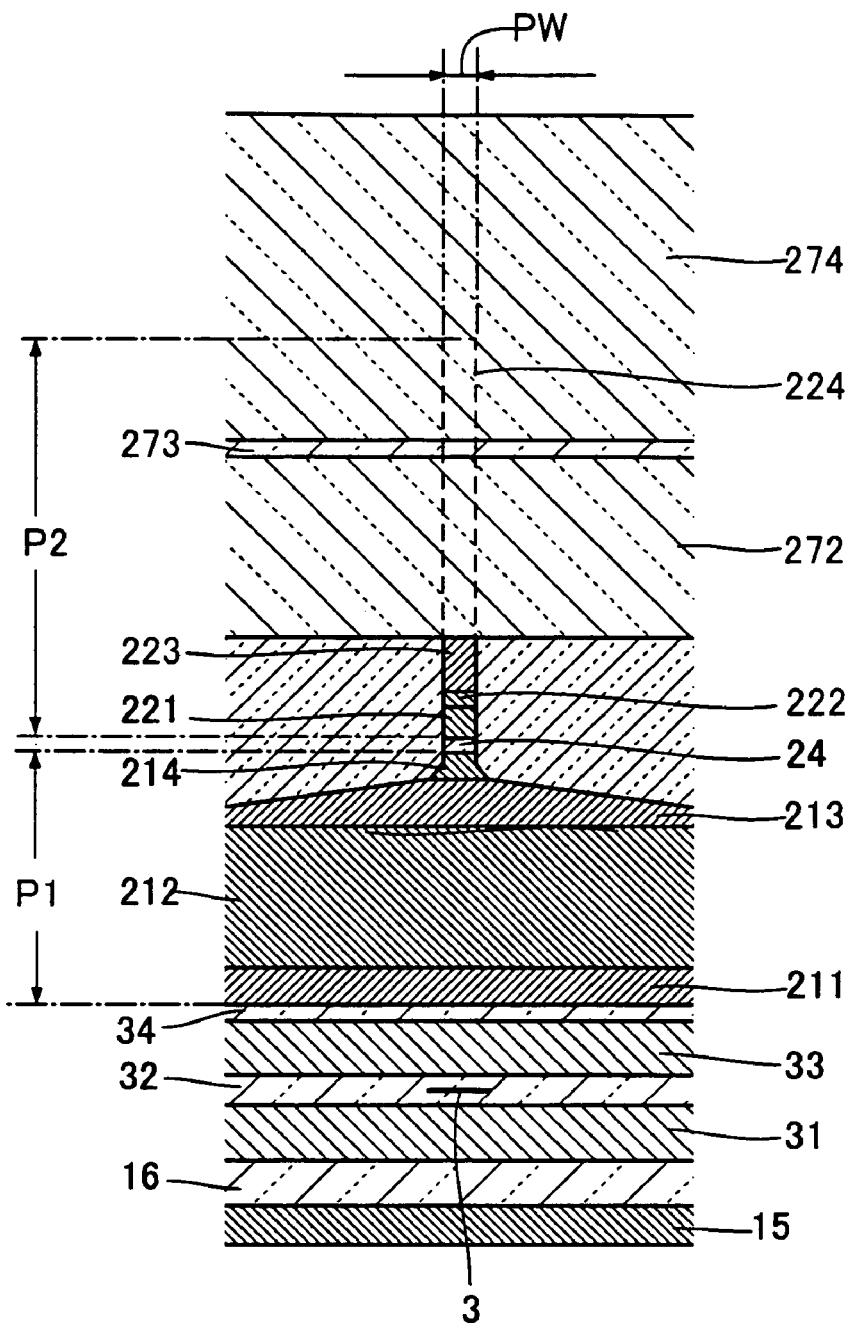
FIG. 4 is a diagram of the electromagnetic converter portion shown in FIG. 3, seen from the ABS side.

Referring to FIGS. 3 and 4, the write element 2 comprises a lower yoke 211, an upper yoke 224, a gap film 24 made of alumina or the like, a lower pole P1, an upper pole P2, lower coils 231 and 232, upper coils 233 and 234, and back gap portions (216 to 218) and (225 to 227). Representation "lower" and "upper" is a representation only in case of the illustrated embodiment and the relation between "lower" and "upper" may be reversed in some cases.

The lower yoke 211 is supported by an insulating film 34 and the surface of the yoke is substantially flattened. The insulating film 34 is made of, for example, an inorganic insulating material such as $Al_2O_3$, $SiO_2$, AlN or DLC. The upper yoke 224 and the lower yoke 211 face each other with an inner gap between them.

The lower yoke 211 and the upper yoke 224 can be made of at least one magnetic material selected from NiFe, CoFe, CoFeN, CoNiFe, FeN, FeZrN and the like. The lower yoke 211 and the upper yoke 224 are, for example, 0.25 to 3 µm in thickness. Such lower yoke 211 and upper yoke 224 can be formed by a frame plating method.

In the illustrated embodiment, it is assumed that the lower yoke 211 is made of one of CoFeN and CoNiFe. The upper yoke 224 also can be made of CoNiFe, CoFeN or the like.

The fore-end portions of the lower yoke 211 and the upper yoke 224 form parts of the lower pole P1 and the upper pole P2, which faces each other with a very thin gap film 24 between them, and a write operation is performed in the lower pole P1 and the upper pole P2. The gap film 24 is made of a non-magnetic metal film or an inorganic insulating film such as alumina.

The lower pole P1 has a structure in which a second lower pole film 212, a third upper pole film 213 and a fourth lower pole film 214 are deposited in this order on the first lower pole film 211, which is formed of an end portion of the lower yoke 211. The second lower pole film 212, the third lower pole film 213 and the fourth lower pole film 214 can be made of CoFeN or CoNiFe.

The second lower pole film 212 is adjacent to the first lower pole film 211 in front of the first coil 231 and the second coil 232, and has one surface flattened to the same level as the first coil 231 and the second coil 232.

The third lower pole film 213 is adjacent to the second lower pole film 212 and has one surface flattened to the same level as an insulating film 255, which is disposed in the vicinity of this second lower pole film.

The fourth lower pole film 214, which is the uppermost film, is adjacent to the gap film 24. In addition, the fourth lower pole film 214 has an indentation 291 and a portion reduced in film thickness by the indentation 291, at the rear of the region adjacent to the gap film 24. The end portion of the fourth lower pole film 214, forming the indentation 291, determines a throat height.

The gap film 24 is at an intermediate level in the pole length that is defined by the height of the lower pole P1 and the height of the upper pole P2.

The first and second coils 231, 232, which forms a lower coil, surround in a spiral form the back gap portion (216 to 218) and is arranged within the height of the lower pole P1 in relation to one surface of the lower yoke 211. In the illustrated embodiment, one of the first and second coils 231, 232 is fitted into the space between coil turns of the other, and the first and second coils 231, 232 are insulated from each other by an insulating film 252. The first and second coils 231, 232 are connected to each other by a first connecting conductor film 281 forming a coil-connecting conductor, so as to generate magnetic flux in the same direction.

In the illustrated embodiment, the first coil 231, which has a spiral shape, is disposed on the surface of an insulating film 251 formed on a flat surface of the lower yoke 211, and is wound in the flat form around one axis vertical to the surface of the insulating film 251. The first coil 231 is made of a conductive metal material such as Cu (copper). The insulating film 251 is made of an inorganic material such as $Al_2O_3$, $SiO_2$, AlN or DLC.

The second coil 232, which also has a spiral shape, is fitted into the space between coil turns of the first coil 231, insulated from the coil turns by an insulating film 252 and is wound in the flat form around the axis. The second coil 232 is also made of a conductive metal material such as Cu (copper). The insulating film 252 is also made of an inorganic material such as $Al_2O_3$, $SiO_2$, AlN or DLC.

The periphery of the first and second coils 231, 232 is filled up with an insulating film 253 (see FIG. 3). The insulating film 253 is also made of an inorganic material such as $Al_2O_3$, $SiO_2$, AlN or DLC.

The insulating film 252, which insulates the first coil 231 and the second coil 232 from each other, can be formed as a very thin $Al_2O_3$ film of about 0.1 µm in thickness by applying a CVD process or the like. Therefore, it is possible to maximize the sectional areas of the first coil 231 and the second coil 232 between the back gap film 216 and the poles P1, P2 and decrease the coil resistance as keeping the number of coil turns, and consequently reduce the quantity of generated heat. This makes it possible to suppress the occurrence of thermal protrusion in the poles P1, P2 during a write operation, avoid a head crash and the damage or destruction of a magnetic record on a magnetic recording medium and consequently meet the demand for a low floating height for a high recording density.

Since the second coil 232 is fitted into the space between coil turns of the first coil 231, insulated from the coil turns by the insulating film 252, high wiring density in coil conductors is achieved. This makes it possible to shorten the yoke length YL (see FIG. 3) as keeping the same number of coil turns.

The first coil 231 and the second coil 232 are connected to each other so as to generate magnetic flux in the same direction. Since the first coil 231 and the second coil 232 have the same winding direction, it is possible to generate the magnetic fluxes in the same direction by making a series-connection structure in which the inner end 281 of the first coil 231 and the outer end 283 of the second coil 232 are connected to each other by a connecting conductor 282. The outer end 286 of the first coil 231 is connected to a terminal 284 by a connecting conductor 285 and further is led outside by a lead conductor 291, connected to a takeout electrode. The inner end 287 of the second coil 232 is connected to a terminal 289 by a connecting conductor 288 and further is led outside by a lead conductor 292, connected to a takeout electrode.

Figure 5:
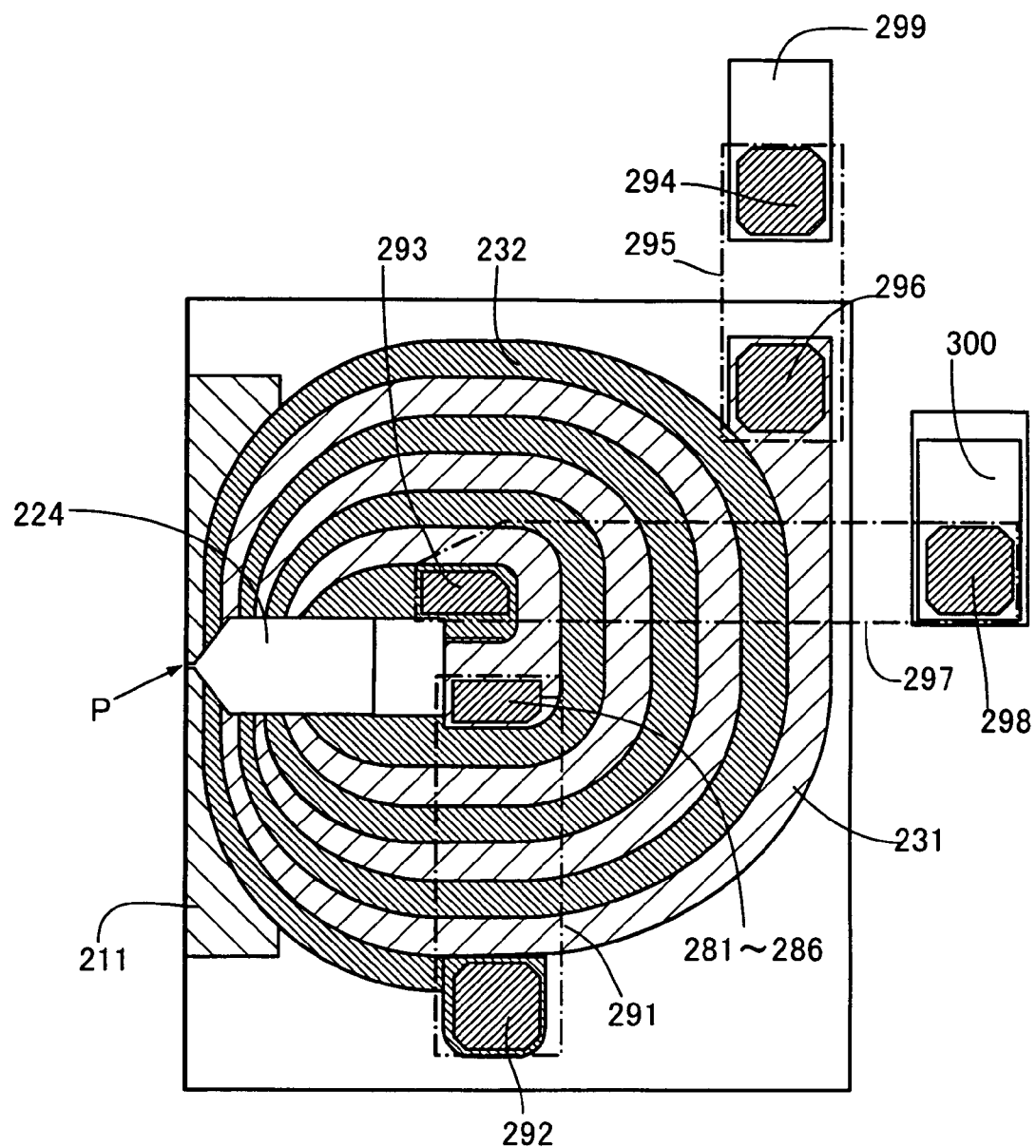
FIG. 5 is a plan view showing the coil structure of a write element in the electromagnetic converter portion shown in FIGS. 3 and 4.

Unlike the structure shown in FIG. 5, the magnetic fluxes in the same direction may be generated by connecting the first coil 231 and the second coil 232 in parallel with each other. The parallel connection provides a reduction in coil resistance though a decrease in the number of coil turns.

The upper coil comprises a third coil 233 and a fourth coil 234. The upper coils 233, 234 are disposed above the lower coils 231, 232, arranged within the height of the upper pole P2 in relation to one surface of the upper yoke 224, and surround in a spiral form a back gap portion (225 to 227). The third and fourth coils 233, 234 are disposed above the first and second coils 231, 232, insulated from the first and second coils 231, 232 by insulating films 255 to 258, and one of the third and fourth coils 233, 234 is fitted into the space between coil turns of the other, insulated from the coil turns by an insulating film 271. The third and fourth coils 233, 234 generate magnetic fluxes in the same direction as the first and second coils 231 and 232.

The first to fourth coils 231 to 234 are connected to one another by the first to sixth connecting conductor films 281 to 286. The first connecting conductor film 281, out of the first to sixth connecting conductor films 281 to 286, is the inner end of the first coil 231, and the surface of the first connecting conductor film 281 is flattened to the same level as the first coil 231, the second coil 232, the second lower pole film 212 and the first back gap film 216. The periphery of the first connecting conductor film 281, the first coil 231, the second coil 232, the second lower pole film 212 and the first back gap film 216 is filled up with an insulating film 253. The flattened surface is covered with an insulating film 254.

The second connecting conductor film 282 is adjacent to the first connecting conductor film 281. The second connecting conductor film 282 is made of the same material as the first connecting conductor film 281 and is formed on the first connecting conductor film 281 and the surface of it is flattened to the same level as the third lower pole film 213, which is adjacent to the second lower pole film 212.

The third connecting conductor film 283 is adjacent to the second connecting conductor film 282. The fourth connecting conductor film 284 is adjacent to the third connecting conductor film 283. The fifth connecting conductor film 285 is adjacent to the fourth connecting conductor film 284. The sixth connecting conductor film 286 is adjacent to the fifth connecting conductor film 285. The first connecting conductor film 281, which is the inner end of the first coil 231, and the sixth connecting conductor film 286, which is the inner end of the third coil 233, are connected by the above-described second to fifth connecting conductor films 282 to 285.

The back gap portion further comprises second to sixth back gap films 217, 218 and 225 to 227. The second back gap film 217 is adjacent to the first back gap film 216. The third back gap film 218 is adjacent to the second back gap film 217. The fourth back gap film 225 is adjacent to the third back gap film 218. The fifth back gap film 226 is adjacent to the fourth back gap film 225. The sixth back gap film 227 is adjacent to the fifth back gap film 226. The third and fourth coils 233, 234 are wound around the sixth back gap film 227.

The upper pole P2 comprises first to third upper pole films 221 to 223. The first upper pole film 221 is adjacent to the gap film 24. The inner end edge of the first upper pole film 221 nearly corresponds to the inner end of the fourth lower pole film 214, which determines a throat height TH.

The second upper pole film 222 is adjacent to the first upper pole film 221. The third upper pole film 223 is adjacent to the second upper pole film 222. The third upper pole film 223 is at a position somewhat receding from the ABS where the fore-end faces of the first and second upper pole films 221 and 222 are located, and the fore-end face of the third upper pole film 223 is closed by an insulating film 272.

In the above-described structure, the surfaces of the third lower pole film 213, the second connecting conductor film 282, the second back gap film 217 and the insulating film 255 are flattened to the same level as one another.

The surfaces of the first upper pole film 221, the fourth connecting conductor film 284, the fourth back gap film 225 and the insulating film 257 are flattened to the same level as one another.

The surfaces of the second pole film 222, the fifth connecting conductor film 285, the fifth back gap film 226 and the insulating film 258 are flattened to the same level as one another.

The surfaces of the third pole film 223, the sixth connecting conductor film 286, the sixth back gap film 227 and the insulating film 272 are flattened to the same level as the surfaces of the third coil 233 and the fourth coil 234.

The upper yoke 224 has one end adjacent to the third upper pole film 223 and the other end adjacent to the sixth back gap film 227. The upper yoke 224 is disposed on an insulating film 273, which covers the flattened surfaces of the third and fourth coils 233, 234, and the upper yoke 224 is insulated from the third and fourth coils 233, 234 by the insulating film 273. The upper yoke 224 extends backward from the ABS 52, 53, connected to the lower yoke 211 by the back gap films 216 to 218 and 225 to 227. Consequently, a thin film magnetic circuit, which goes through the lower yoke 211, the lower pole portion P1, the gap film 24, the upper pole P2, the upper yoke 224 and the back gap films 216 to 218 and 225 to 227, is completed.

A protective film 274 covers the whole write element 2. The protective film 274 is made of an inorganic material such as $Al_2O_3$ or $SiO_2$.

In the vicinity of a read element 3 there are disposed a first shield film 31, an insulating film 32 and a second shield film 33. The first shield film 31 and the second shield film 33 are made of NiFe or the like. The first shield film 31 is formed on an insulating film 16, which is made of $Al_2O_3$, $SiO_2$ or the like. The insulating film 16 is formed on the surface of the base body 15, which is made of $Al_2O_3$—TiC or the like.

The read element 3 is provided inside the insulating film 32 between the first shield film 31 and the second shield film 33. The end surface of the read element 3 is exposed in the ABS 52, 53. The read element 3 comprises a giant magnetoresistance effect element (GMR element). The GMR element can be made of a spin valve film or a ferromagnetic tunnel junction element.

Observing the whole thin film magnetic head described above, referring to FIG. 4, the end of the lower yoke 211, the second lower pole film 212 and the third lower pole film 213 spread in the track width direction of the ABS. However, the fourth lower pole film 214 has the upper end portion narrowed at both sides in the track width direction to produce a narrow track width PW. Also, the gap film 24 deposited thereon, the first upper pole film 221, the second upper pole film 222, the third upper pole film 223, and the fourth upper pole film 224 formed of the end of the upper yoke 224 have substantially the same narrow track width PW as the fourth lower pole film 214. Consequently, the narrow track width PW for high-density recording is obtained.

Next, referring to FIG. 5, the first and second coils 231, 232 are wound around the back gap film 216. Although omitted to simplify the illustration, the third and fourth coil 233, 234 are disposed on the first and second coils 231, 232 and are connected in series with the first and second coils 231, 232.

As described above, in a thin film magnetic head according to the present invention, the lower pole P1 projects from one surface of the lower yoke 211 at the medium-facing surface side. The upper yoke 224 is disposed at a distance from the lower yoke 211 and is connected to the lower yoke 211 by the back gap portion (216 to 218 and 225 to 227), which is recessed in the thin film magnetic head from the medium-facing surface. The upper pole P2 faces the lower pole P1 with the gap film 24 interposed between them and has the top surface adjacent to one surface of the upper yoke 224. Consequently, a thin film magnetic circuit going through the lower yoke 211, the lower pole P1, the gap film 24, the upper pole P2 and the back gap portion (216 to 218 and 225 to 227) is formed. The gap film 24 functions as a convert gap.

Since the lower coils 231, 232 surround in a spiral form the back gap portion (216 to 218) and the upper coils 233, 234 also surround in a spiral form the back gap portion (225 to 227), the total number of coil turns of the lower coils 231, 232 and the upper coils 233, 234 is the number of coil turns. Consequently, increase in the number of coil turns is achieved.

The lower coils 231, 232 are arranged within the height of the lower pole P1 in relation to the one surface of the lower yoke 211, and the upper coils 233, 234 are arranged within the height of the upper pole P2 in relation to the one surface of the upper yoke 224. Consequently, the height of the lower coils 231, 232 can be increased up to a dimension determined by the height of the lower pole P1. In the same way, the height of the upper coils 233, 234 can be increased up to a dimension determined by the height of the upper pole P2.

In addition, the upper coils 233, 234 are disposed above the lower coils 231, 232 and so, a coil-layered structure utilizing the space (inner gap) between the lower yoke 211 and the upper yoke 224 is obtained. The coil-layer structure, unlike the structure of coils disposed on the same plane, makes it possible to increase the width of the lower coils 231, 232 and the width of the upper coils 233, 234 while increasing the number of coil turns. And, the coil-layer structure makes it possible to shorten the yoke length YL while increasing the number of coil turns, and consequently improve the high-frequency characteristic.

As described above, since it is possible to increase the lower coils 231, 232 and the upper coils 233, 234 in height and width as increasing the total number of coil turns, these coils are necessarily increased also in sectional area. As a result, it is possible to decrease the coil resistance while increasing the number of coil turns, and consequently decrease the quantity of generated heat.

In addition, the lower coils 231, 232 are arranged within the height of the lower pole P1, the upper coils 233, 234 are arranged within the height of the upper pole P2, and the gap film 24 is at an intermediate level in the pole length that is defined by the height of the lower pole P1 and the height of the upper pole P2. As a result, it is possible to balance the height of the lower pole P1 disposed in the lower side of the gap film 24, with the height of the upper pole P2 disposed in the upper side of the gap film 24, in spite of a coil-layered structure. Consequently, in case of polishing the ABS, uniformity in polishing quantity is achieved on the lower pole P1 and the upper pole P2, which are disposed in both sides of the gap film 24. As a result, it is possible to avoid the collision between a magnetic head and a recording medium, which is caused by nonuniformity in polishing quantity. Consequently, it is possible to meet the demand for a low floating height of a slider, which is indispensable for high-density recording.

In the illustrated embodiment, the lower coils 231, 232 comprise the first coil 231 and the second coil 232. One of the first coil 231 and the second coil 232 is fitted into the space between coil turns of the other, insulated from the coil turns of the other.

The insulating film 252 between the first coil 231 and the second coil 232 can be formed as a very thin $Al_2O_3$ film of about 0.1 μm in thickness by applying CVD or the like. Therefore, it is possible to maximize sectional areas of the first and second coils 231, 232 between the back gap portion (216 to 218) and the lower pole P1, and decrease the coil resistance as keeping the number of coil turns, and consequently reduce the quantity of generated heat. This makes it possible to suppress the occurrence of thermal protrusion in the poles P1, P2 during a write operation, avoid a head crash and the damage or destruction of a magnetic record on a magnetic recording medium and consequently meet the demand for a low floating height for a high recording density.

Since one of the first coil 231 and the second coil 232 is fitted into the space between coil turns of the other, insulated from the coil turns of the other by the insulating film 252, high wiring density of coil conductor is achieved. This makes it possible to shorten the yoke length YL while keeping the same number of coil turns.

The first and second coils 231, 232 are connected to each other so as to generate magnetic flux in the same direction. Since the first and second coils 231, 232 have the same winding direction, it is possible to generate magnetic fluxes in the same direction by making a series-connection structure in which the inner end of the first coil 231 and the outer end of the second coil 232 are connected to each other. Alternatively, magnetic fluxes in the same direction may be generated by connecting the first coil 231 and the second coil 232 in parallel with each other. In this case, reduction in coil resistance is achieved though the number of coil turns decreases.

Also, one of the third coil 233 and the fourth coil 234 is fitted into the space between coil turns of the other, insulated from the coil turns of the other by the insulating film 271. The third and fourth coils 233, 234 are connected to each other so as to generate magnetic fluxes in the same direction as each other, and are further connected to the lower coils 231, 232 so as to generate magnetic fluxes in the same direction as the lower coils 231, 232. In a thin film magnetic head of this aspect, the number of coil turns is increased by the third and fourth coils 233, 234 and so, a magnetomotive force for writing is increased.

In the illustrated embodiment, the lower pole P1 comprises the plurality of lower pole films 211 to 214. The first lower pole film 211 is formed of the lower yoke 211. The second lower pole film 212 is adjacent to the first lower pole film 211 and has one surface flattened to the same level as the lower coils 231, 232. The other lower pole films 213, 214 are disposed in order adjacently to each other on the second lower pole film 212 and each of the lower pole films 213, 214 has one surface flattened to the same level as an insulating film disposed in the vicinity of this film. The fourth lower pole film 214, which is the uppermost film of the lower pole films 213, 214, is adjacent to the gap film 24.

As described above, since the second lower pole film 212 has one surface flattened to the same level as the lower coils 231, 232, it is possible to form the insulating film 254 uniform in thickness on the flattened surface. In the prior art, if the lower pole P1 is made low in height, the photoresist covering the first and second coils 231, 232 recedes in a photolithography process and the first and second coils 231, 232 are exposed and as a result, short-circuiting occurs between the first coil 231 and the second coil 232, and further between the lower pole P1 and the coils 231, 232. In the present invention, since the surfaces of the second lower pole film 212, the first coil 231 and the second coil 232 are flattened so that the insulating film 254 can be formed uniform in thickness thereon, the insulating film 254 formed on the flattened surfaces protects the first and second coils 231, 232 and so, it is possible to prevent damage to the first and second coils 231, 232 even if the height of the second lower pole film 212 (distance from the ABS toward the coils) is shortened.

And since a common insulating film can be provided onto the first and second coils 231, 232, an insulating structure on the upper surface of the first and second coils 231, 232 is simplified. Furthermore, in case of forming another component on the first and second coils 231, 232, it is possible to provide a stable base and consequently form the said component as a high-accuracy pattern.

In the illustrated embodiment, the lower pole P1 comprises a third lower pole film 213 and a fourth lower pole film 214. The third lower pole film 213 is adjacent to the second lower pole film 212. The fourth lower pole film 214 is adjacent to the third lower pole film 213, being the uppermost film in the lower pole.

The upper pole P2 also comprises a plurality of upper pole films 221 to 223. The upper pole films 221 to 223 are disposed in order adjacently to one another on the gap film 24. The upper pole film 223, which is the uppermost film of the upper pole films 221 to 223, is adjacent to the upper yoke 224.

More specifically, the upper pole P2 comprises the first to third upper pole films 221 to 223. The first upper pole film 221 is adjacent to the gap film 24, the second upper pole film 222 is adjacent to the first upper pole film 221, and the third upper pole film 223 is adjacent to the second upper pole film 222.

A thin film magnetic head of the illustrated embodiment further comprises first to sixth connecting conductor films 281 to 286, which function as a coil-connecting conductor. The first connecting conductor film 281 is formed of the inner end of the first coil 231 and has the surface flattened to the same level as the first coil 231, the second coil 232 and the second lower pole film 212.

The second connecting conductor film 282 is made of the same material as the first connecting conductor film 281, and is formed on the surface of the first connecting conductor film 281, and has the surface flattened to the same level as the third lower pole film 213 that is adjacent to the second lower pole film 212. The second connecting conductor film 282 may be made of a material different from the first connecting conductor film 281.

The third connecting conductor film 283 is adjacent to the second connecting conductor film 282, the fourth connecting conductor film 284 is adjacent to the third connecting conductor film 283, the fifth connecting conductor film 285 is adjacent to the fourth connecting conductor film 284, and the sixth connecting conductor film 286 is adjacent to the fifth connecting conductor film 285.

The first back gap film 216 is made of the same material as the second lower pole film 212, and is disposed on one surface of the lower yoke 211, and has the surface flattened to the same level as the first coil 231, the second coil 232 and the second lower pole film 212.

The second back gap film 217 is made of the same material as the third lower pole film 213, and is disposed on the first back gap film 216, and has the surface flattened to the same level as the third lower pole film 213.

The third back gap film 218 is adjacent to the second back gap film 217. The fourth back gap film 225 is adjacent to the third back gap film 218. The fifth back gap film 226 is adjacent to the fourth back gap film 225. The sixth back gap film 227 is adjacent to the fifth back gap film 226.

According to the above-described structure, since the first to sixth connecting conductor films 281 to 286 forming the coil connection conductor and the first to sixth back gap films 216 to 218 and 225 to 227 forming the back gap portion (216 to 218 and 225 to 227) can be formed on the same flattened surfaces by specific processes required for the respective films, easy fabrication is achieved.

More specifically, the surfaces of the third lower pole film 213, the second connecting conductor film 282 and the second back gap film 217 are flattened to the same level as one another. The surfaces of the fourth lower pole film 214, the third connecting conductor film 283 and the third back gap film 218 are flattened to the same level as one another.

The surfaces of the first upper pole film 221, the fourth connecting conductor film 284 and the fourth back gap film 225 are flattened to the same level as one another. The surfaces of the second upper pole film 222, the fifth connecting conductor film 285 and the fifth back gap film 226 are flattened to the same level as one another. The surfaces of the third upper pole film 223, the sixth connecting conductor film 286 and the sixth back gap film 227 are flattened to the same level as the surfaces of the third and fourth coils 233, 234. The upper yoke 224 has one end adjacent to the third upper pole film 223 and the other end adjacent to the sixth back gap film 227.

According to the above-described structure, since the first to sixth connecting conductor films 281 to 286, the first to sixth back gap films 216 to 218 and 225 to 227, the lower pole films 212 to 214 and the upper pole films 221 to 223 can be formed on the same flattened surfaces by specific processes required for the respective films, easy fabrication is achieved.

In the present invention, since the lower pole P1 is of a structure in which the first to fourth lower pole film 211 to 214 are adjacent to one another in order, it is possible to select magnetic materials and processes suitable for each of the first to fourth lower pole films 211 to 214, thereby obtaining a write element with a narrow track width and high write characteristics. For example, the lower pole P1 made of CoFeN (2.4 T), which is a magnetic material having a high saturation magnetic flux density, makes it possible to obtain a write element in which magnetic flux generated in the coil reaches a write pole region effectively without saturation on the way, thereby achieving a little flux loss.

In the stage of forming the upper pole P2, a great part of the lower pole P1 has already been formed, so it is possible to form the upper pole P2 with a material and process suitable for the upper pole P2. For example, the upper pole P2 is made of CoFex or FeNx, which is a HiBs material, and RIE is applied to the upper pole P2 to form an intermediate shape, using a plating layer of CoNiFe or an insulating film of alumina as a mask, and IBE is applied to obtain the final shape. This makes it possible to achieve narrower track widths than in photolithography. Specifically, it is possible to achieve track widths of 0.1 μm or less with high degree of accuracy, which are required for 150 GB/in$^2$ to 200 GB/in$^2$. Consequently, it is possible to accurately control track widths of 0.1 to 0.2 μm or less, which have been thought to be impossible in mass production up to now.

And since an upper pole P2 can be made high as a whole by using a HiBs material, the magnetic volume is increased. In case of IBE to define the track width of the upper pole P2, use of an alumina mask material significantly reduces the quantity of side etched part of the upper pole P2, so the process time of IBE is shortened. Consequently, it is possible to achieve an areal recording density of 150 GB/in$^2$ to 200 GB/in$^2$ without reducing the magnetic volume in the fore-end of the upper pole P2.

Since the second coil 232 is isolated from the second lower pole film 212 and the back gap film 216 by the insulating film 252, which can be formed as a very thin film of about 0.1 μm in thickness by applying CVD or the like, it is possible to promote shortening the yoke length YL.

The fourth lower pole film 214, which is the uppermost film of the lower pole films, has the upper region adjacent to the gap film 24 for writing. In addition, the fourth lower pole film 214 has an indentation 291 and a portion reduced in film thickness by the indentation 291, at the rear of the region adjacent to the gap film 24. The end portion of the fourth lower pole film 214, forming the indentation 291, determines the throat height TH. This structure provides a write element with a quick rise in a write current and excellent over-write characteristic.

Figure 6:
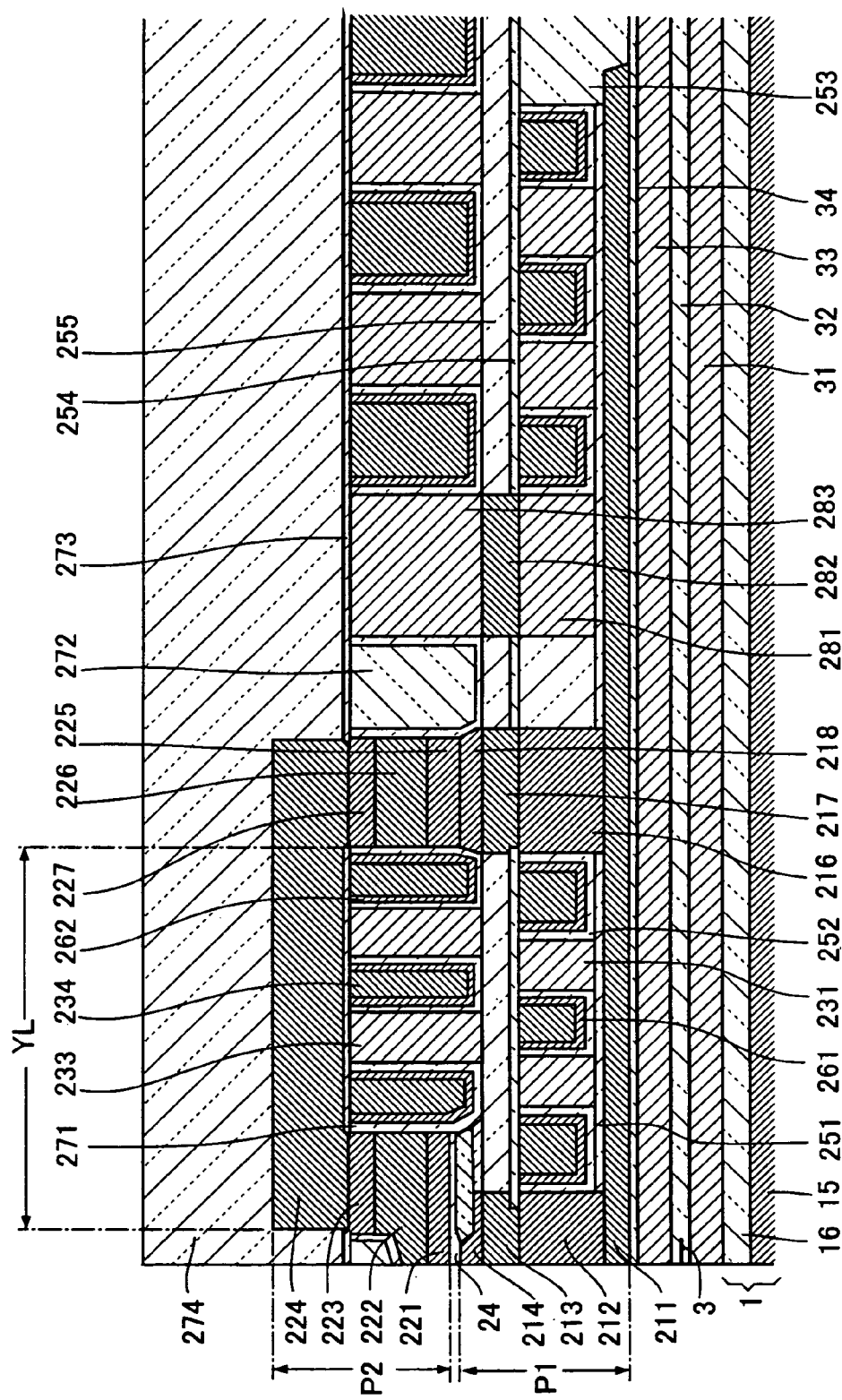
FIG. 6 is a magnified sectional view of another embodiment of an electromagnetic converter portion of a thin film magnetic head according to the present invention.
Figure 7:
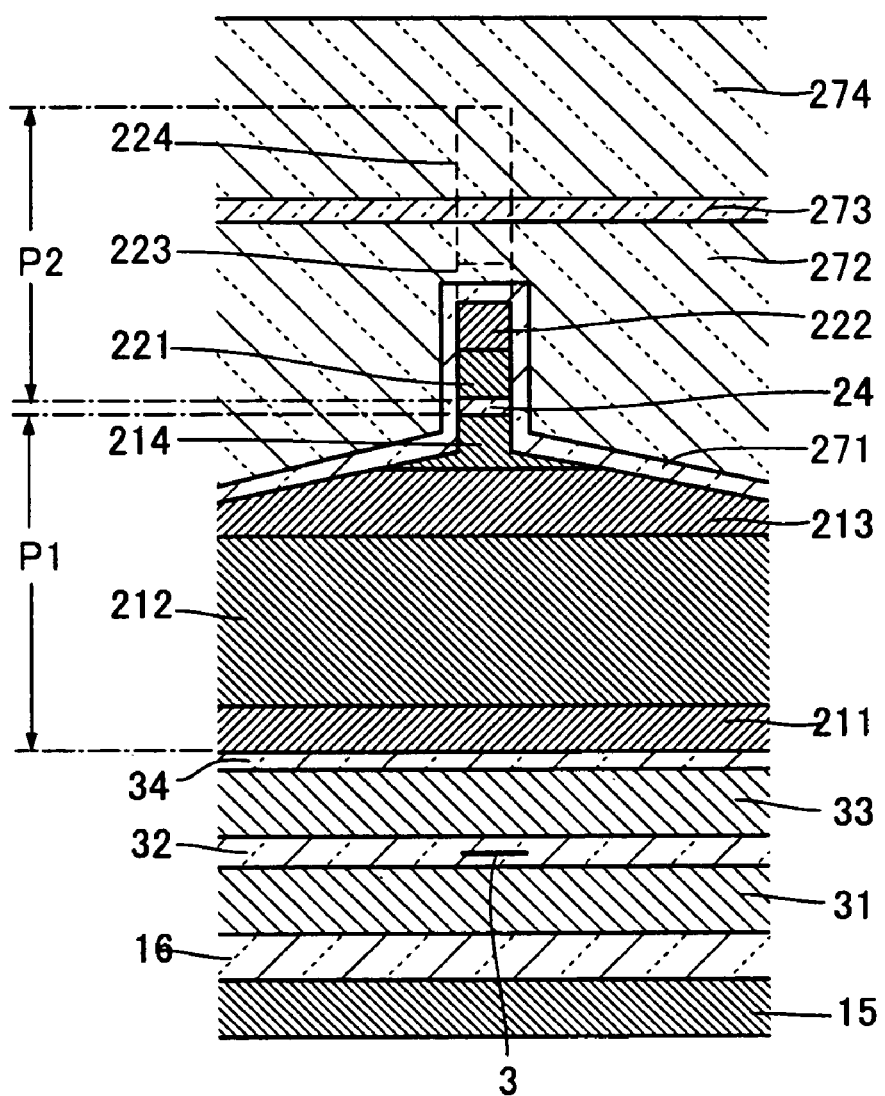
FIG. 7 is a diagram of the electromagnetic converter portion shown in FIG. 6, seen from the ABS side.

FIG. 6 is a sectional view showing another embodiment of a thin film magnetic head according to the present invention, and FIG. 7 is a diagram of the thin film magnetic head shown in FIG. 6, seen from the ABS side. In these figures, the same components as those shown in FIGS. 3 and 4 are given the same reference symbols and the duplicated description is omitted. In this embodiment, a coil-connecting conductor is composed of a first connecting conductor film 281, a second connecting conductor film 282 and a third connecting conductor film 283. The first connecting conductor film 281 has the surface flattened to the same level as a first coil 231, a second coil 232, a second lower pole film 212, a first back gap film 216 and an insulating film 253.

The second connecting conductor film 282 has the surface flattened to the same level as a third lower pole film 213, a second back gap film 217 and an insulating film 255.

The third connecting conductor film 283 has the surface flattened to the same level as a third coil 233, a fourth coil 234, a third upper pole film 223, a sixth back gap film 227 and an insulating film 272. This embodiment also provides the same function and effect as those of the embodiment shown in FIGS. 1 to 5.

2. Method for Manufacturing a Thin Film Magnetic Head (1) Embodiment 1

Embodiment 1 relating to a manufacturing method is a method for manufacturing the thin film magnetic head shown in FIGS. 1 to 5. It is notified in advance that processes illustrated in FIGS. 8 to 47 are performed on a wafer.

Figure 8:
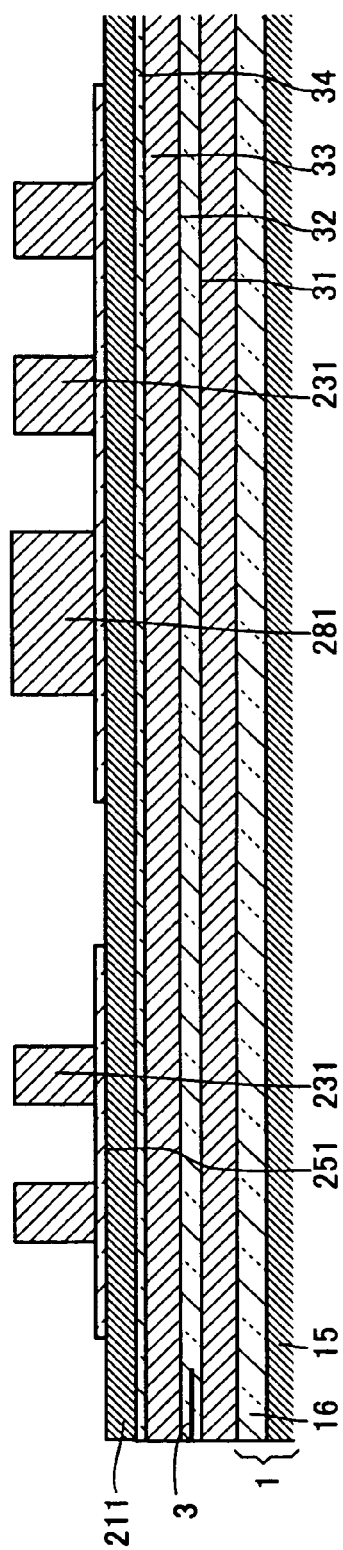
FIG. 8 is a diagram showing a process of manufacturing a thin film magnetic head having the electromagnetic converter portion shown in FIGS. 3 to 5.

Process Leading to a State of FIG. 8

Referring to FIG. 8, on an insulating film 16 deposited on a base body 15 there are formed a first shield film 31, a read element 3, an insulating film 32, a second shield film 33, an insulating film 34 and a lower yoke 211 by means of publicly known processes. In one example, an insulating film 16, which is made of alumina or the like, is deposited about 3 μm in thickness on the base body 15. Next, to form the first shield film 31, a plating method is performed, using a photoresist film as a mask, to selectively deposit permalloy about 2 to 3 μm in thickness on the insulating film 16. Next, an alumina film (not illustrated) of about 3 to 4 μm in thickness is formed thereon and then is flattened by means of a chemical mechanical polishing (hereinafter, referred to as CMP). Subsequently, an insulating film 32 to form a shield gap, a read element 3 and leads of the read element (not illustrated) are formed and an upper shield film 33 of about 1.0 to 1.5 μm in thickness is selectively formed. After that, an insulating film 34 of, for example, alumina is formed 0.3 μm in thickness.

After that, a lower yoke 211 is formed on the insulating film 34. The lower yoke 211 is made of magnetic materials such as CoNiFe (1.9 T) and CoFeN (2.4 T), and is formed 3.0 to 4.0 μm in thickness. And to form a first lower pole P1, in this embodiment, a sputtering film of FeAlN, FeN, FeCo, CoFeN, FeZrN or the like is formed 0.5 to 1.5 μm in thickness, though a plating film of NiFe (80%:20%), NiFe (45%:55%), CoNiFe or the like may be used.

Next, an insulating film 251 is formed on the flat surface of the lower yoke 211 so that the insulating film 251 has an area slightly larger than an area necessary for forming a coil. The insulating film 251 is an insulating film made of alumina and is formed about 0.2 μm in thickness. Next, a photolithography process is performed on the insulating film 251 to open a pole forming area and a backgap forming area.

Next, a seed film is formed on the surface of the insulating film 251 so that the seed film covers the surface of the insulating film 251 and the surface of the lower yoke 211. The seed film 260 is made of a material suitable for a Cu-plating ground film and is formed 50 nm to 80 nm in thickness by means of Cu-CVD.

Next, a photoresist film is formed on the seed film by means of a spin-coating method or the like, and then the photoresist film is exposed through a mask having a coil pattern, and developed. The photoresist film may be either positive photoresist or negative photoresist.

The above-mentioned exposure process and development process provide a coil forming pattern. The coil forming pattern is defined by a resist frame.

Next, a selective Cu-plating process is performed so that a first coil 231 is grown to, for example, 3 to 3.5 μm in thickness on the seed film, which is in the coil forming pattern. After that, the resist frame is removed by means of chemical etching or the like. FIG. 8 shows a state in which the resist frame has been removed.

Figure 9:
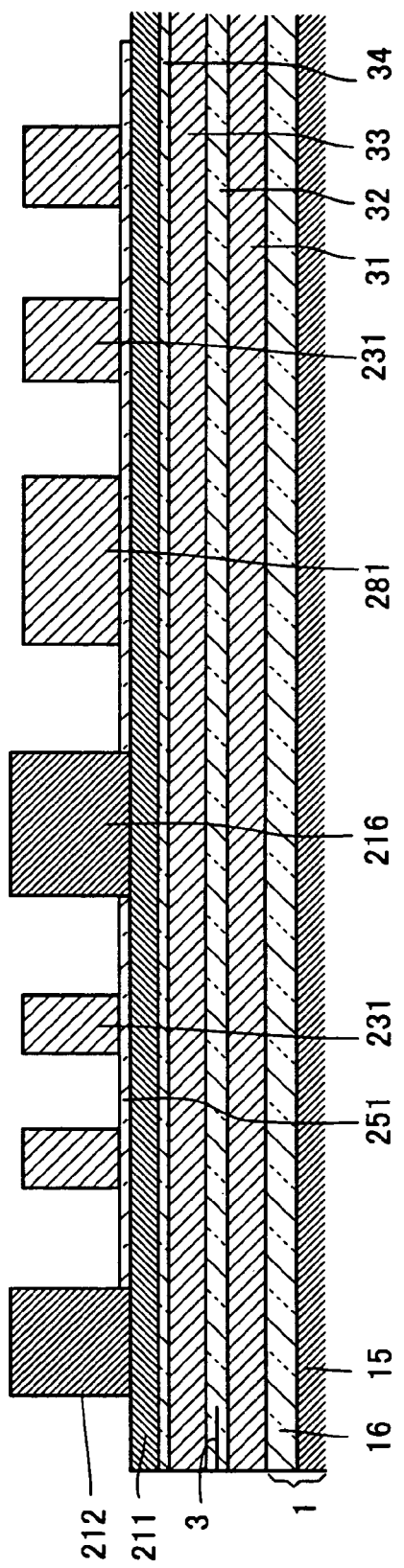
FIG. 9 is a diagram showing a process after the process shown in FIG. 8.

Process Leading to a State of FIG. 9

After the removal of the resist frame, a photolithography process for forming a pole film and a back gap film is performed and a resist frame for the pole film and the back gap film is formed.

Next, a selective plating process is performed, using the lower yoke 211 as a seed film, to grow a pole film and a back gap film on the lower yoke 211, and then the resist frame is removed by means of chemical etching or the like. Consequently, as shown in FIG. 9, a second lower pole film 212 and a first back gap film 216 are formed with a space between them on one surfece of the lower yoke 211. The second lower pole film 212 and the back gap film 216 are made of, for example, CoNiFe (2.3 T) and formed 3 to 3.5 μm in thickness.

Figure 10:
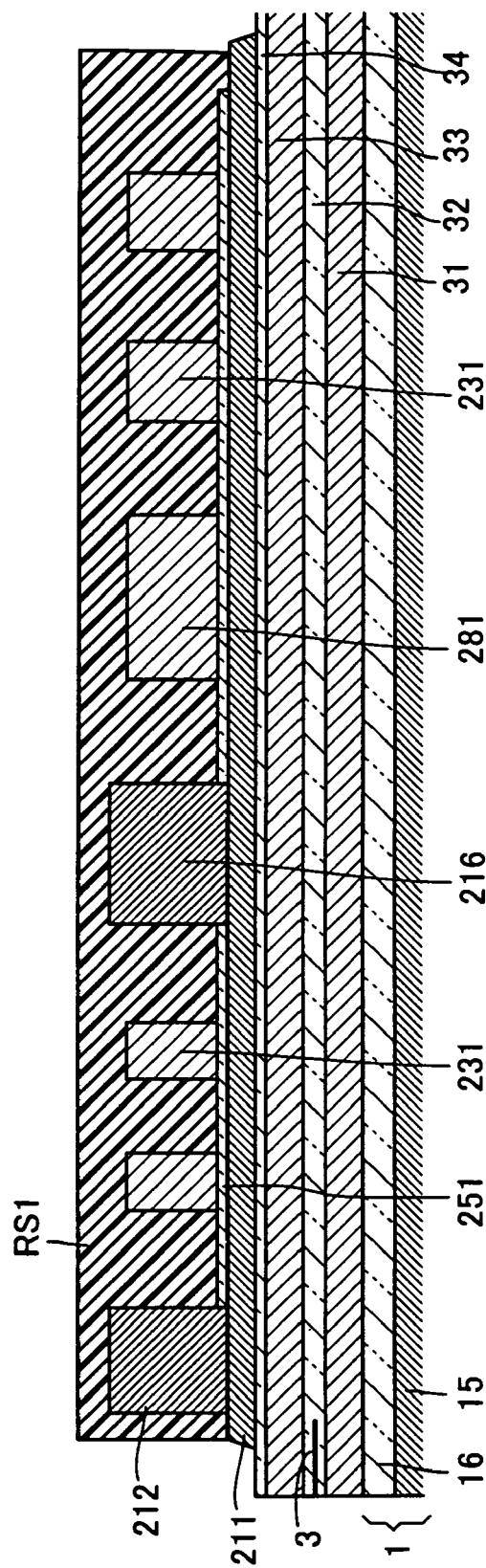
FIG. 10 is a diagram showing a process after the process shown in FIG. 9.

Process Leading to a State of FIG. 10

Next, as shown in FIG. 10, a photoresist film RS1 covering the first coil 231, the second lower pole film 212 and the back gap film 216, is formed. After that, a photolithography process is applied onto the photoresist film RS1, and then IBE is performed so as to pattern the lower yoke 211 into a prescribed pattern.

Figure 11:
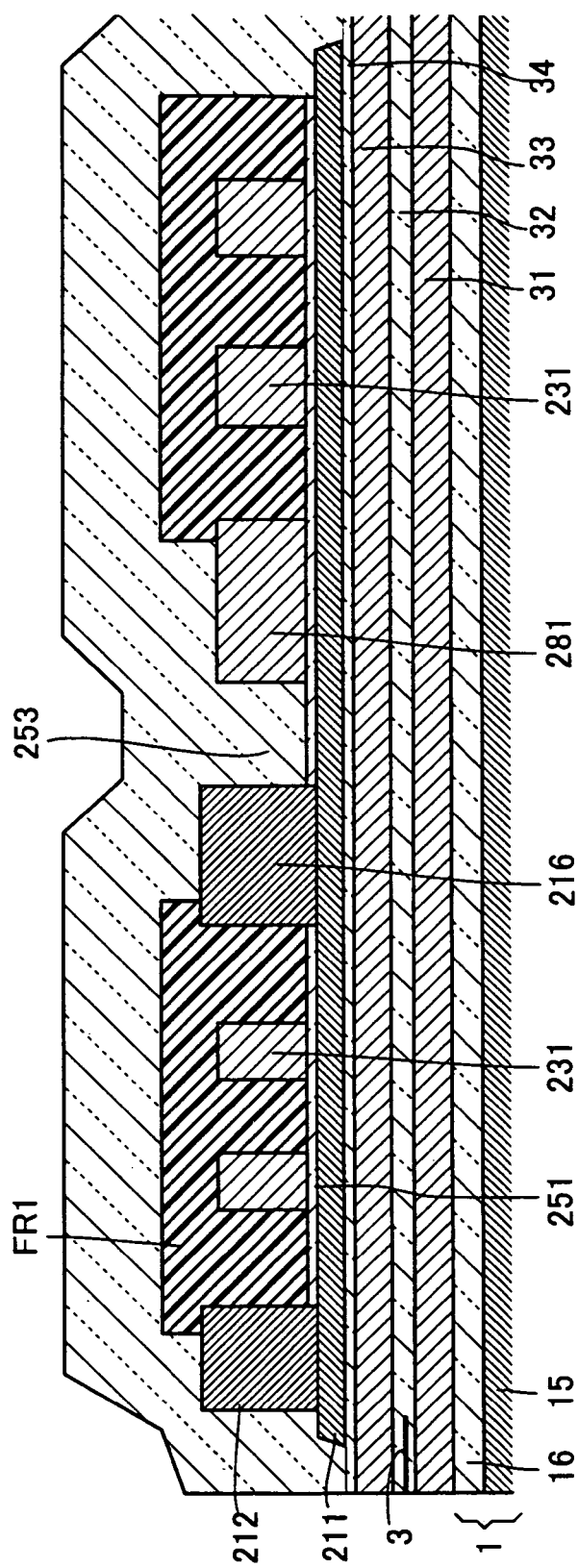
FIG. 11 is a diagram showing a process after the process shown in FIG. 10.

Process Leading to a State of FIG. 11

Next, as shown in FIG. 11, a resist cover FR1 covering the first coil 231 and the periphery of the coil is formed, and then an insulating film 253 covering the whole resist cover FR1 is deposited thereon. The insulating film 253 is made of alumina and formed 4 to 5 μm in thickness.

Figure 12:
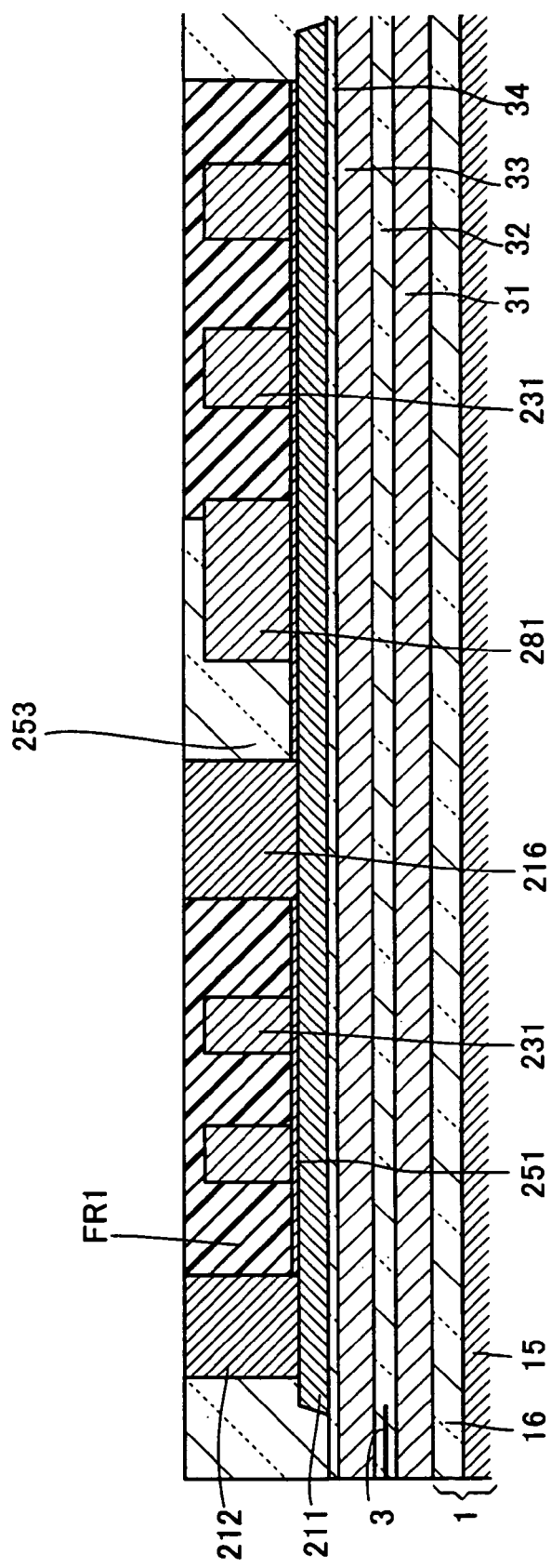
FIG. 12 is a diagram showing a process after the process shown in FIG. 11.

Process Leading to a State of FIG. 12

Next, the insulating film 253 and the resist cover FR1 are polished and flattened by CMP. FIG. 12 shows a state in which the CMP process has been performed. The CMP is continued to expose the second lower pole film 212 and the first back gap film 216. The second lower pole film 212 and the first back gap film 216 are reduced to 3.5 to 4.0 μm in film thickness at the end of the CMP. The first coil 231 is not exposed.

Figure 13:
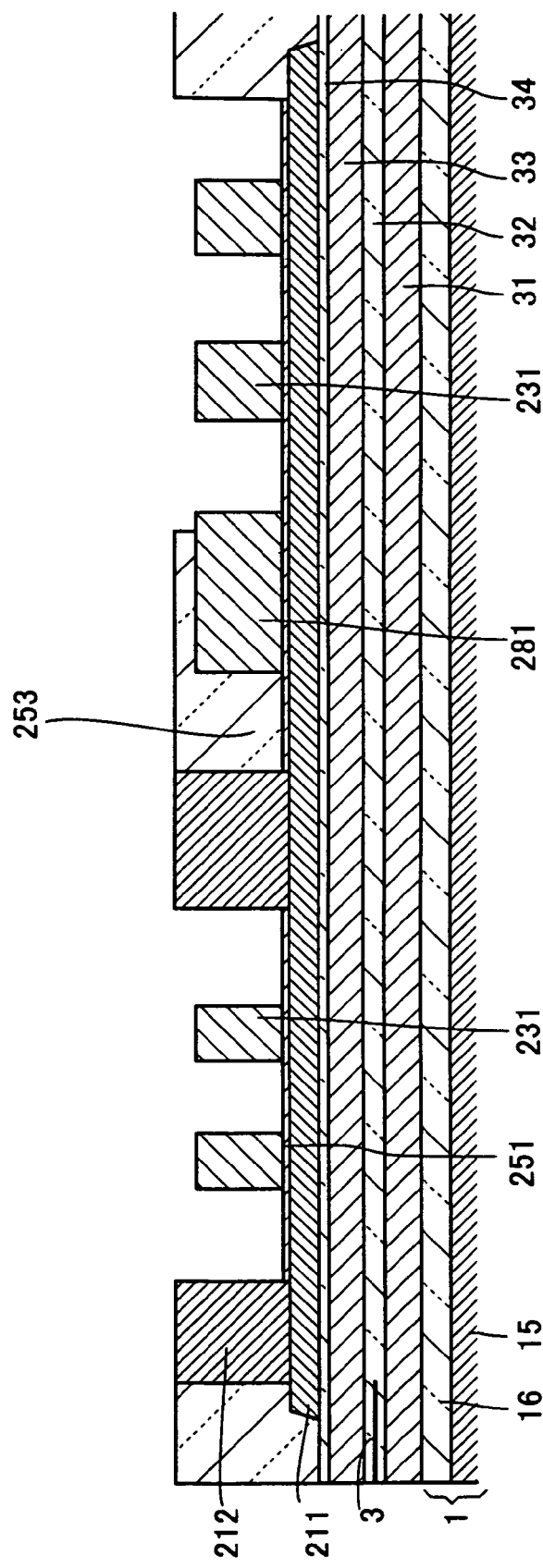
FIG. 13 is a diagram showing a process after the process shown in FIG. 12.

Process Leading to a State of FIG. 13

Next, the resist cover FR1 is removed by means of chemical etching or the like.

Figure 14:
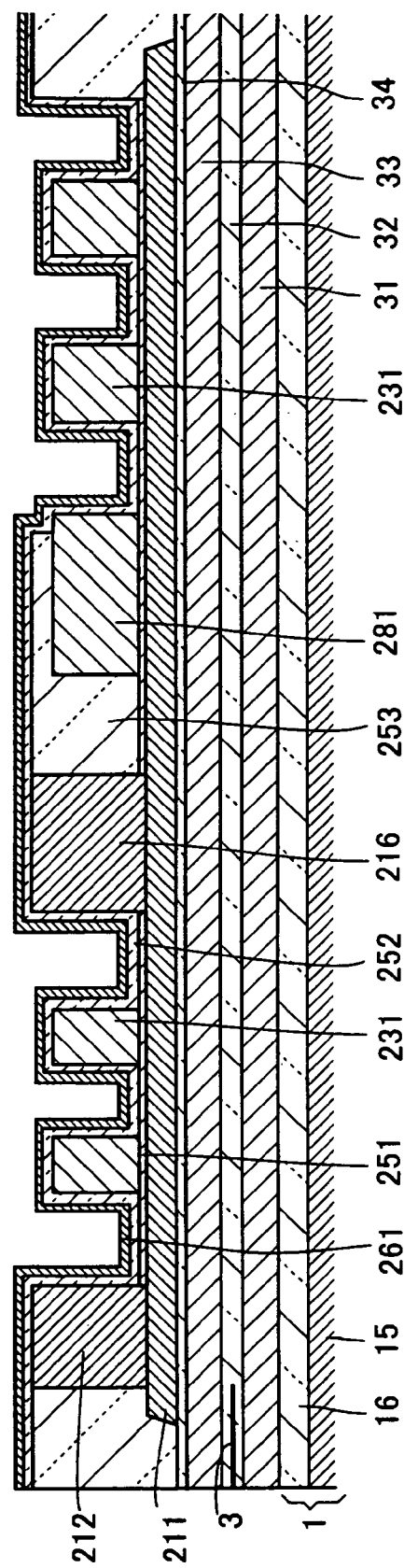
FIG. 14 is a diagram showing a process after the process shown in FIG. 13.

Process Leading to a State of FIG. 14

Next, an insulating film 252 is deposited on the surfaces and side surfaces of the insulating films 251, 253, the first coil 231, the second lower pole film 212 and the first back gap film 216. The insulating film 252 is, specifically, formed about 0.1 to 0.15 µm in thickness by means of $Al_2O_3$-CVD with high-purity alumina.

Next, a seed film 261 is deposited 50 nm to 80 nm in thickness on the surface of the insulating film 252 by means of sputtering or Cu-CVD.

Figure 15:
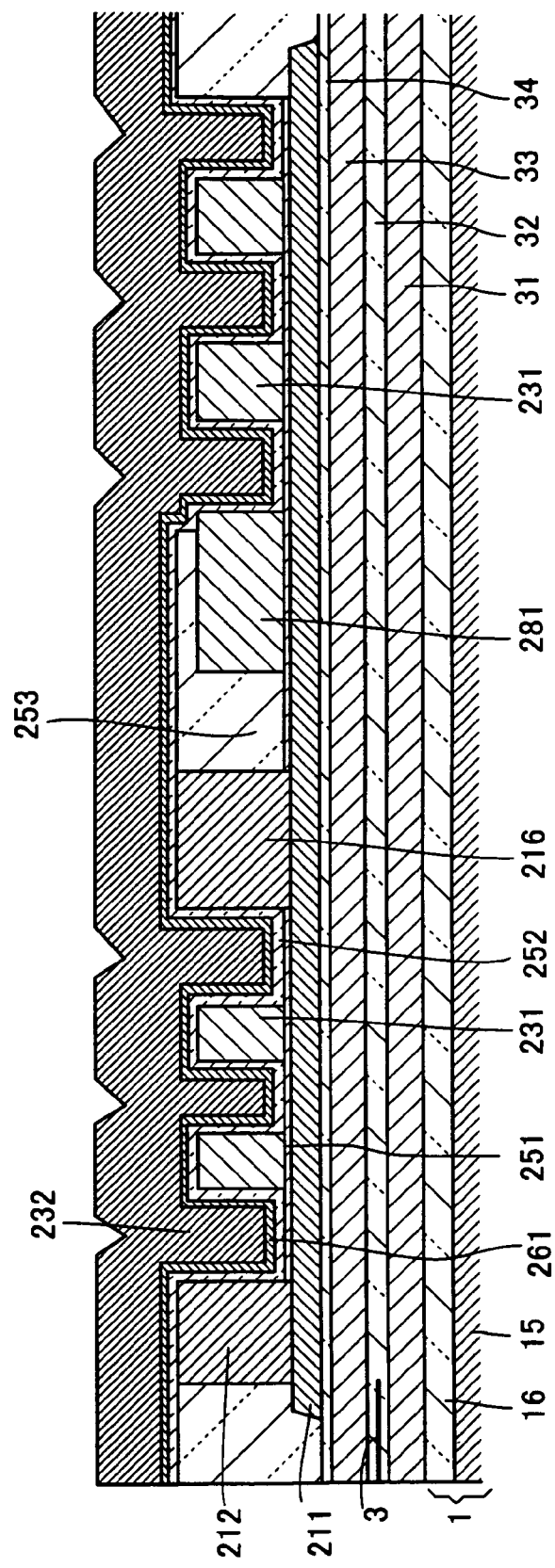
FIG. 15 is a diagram showing a process after the process shown in FIG. 14.

Process Leading to a State of FIG. 15

Next, as shown in FIG. 15, a plating film 232 to be a second coil is formed, for example, 3 to 4 µm in thickness on the seed film 261. The plated film 232 comprises Cu as its main constituent.

The seed film 261, which is formed by Cu-CVD, is a Cu-CVD film with excellent step coverage, which is deposited accurately according to the projections and indentations of the first coil 231. Consequently, even if the space between the coil turns of the first coil 231 is a long and narrow space, the plating film 232 to be a second coil is formed in the space without making a key hole.

Since a deposition gas required in Cu-CVD is expensive and Cu-CVD has excellent step coverage, Cu-CVD is, in the present invention, used only for forming the seed film 261 in an uniform thickness in the long and narrow space and a necessary thickness is ensured by means of plating.

Figure 16:
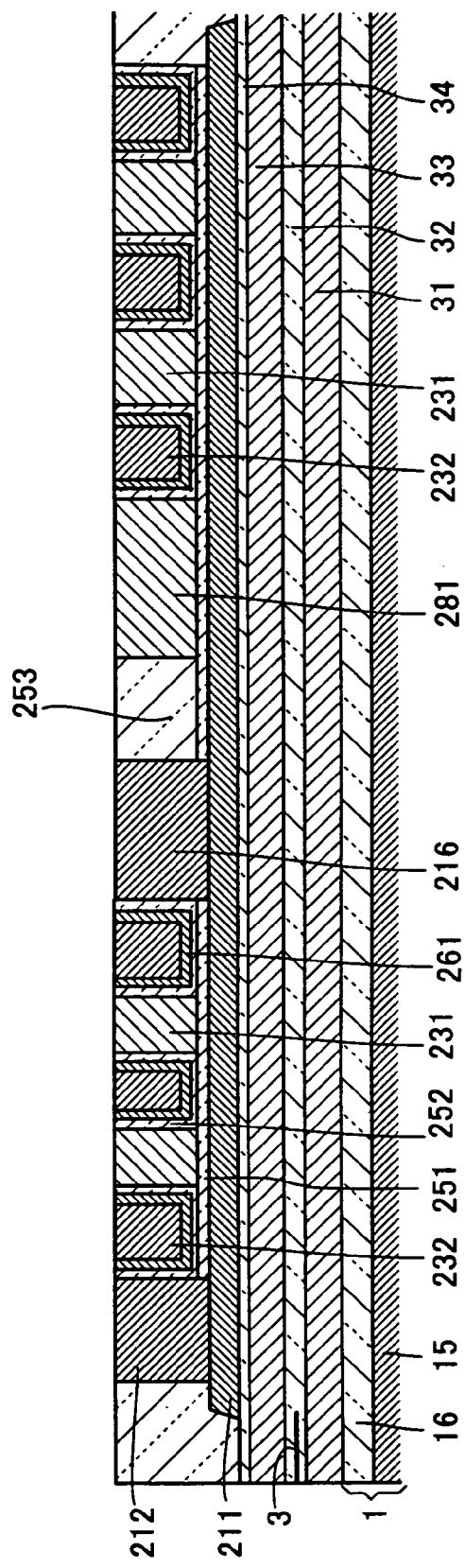
FIG. 16 is a diagram showing a process after the process shown in FIG. 15.

Process Leading to a State of FIG. 16

Next, as shown in FIG. 16, the plating film 232 is polished and flattened by CMP. Alumina-based slurry is used in the CMP. Consequently, the second coil 232 in the flat spiral pattern is formed, insulated from the first coil 231 by the insulating film 252. In the CMP, the surfaces of the second lower pole film 212, the first back gap film 216 and the insulating film 253 are also polished to be in the same plane as the surface of the first and second coils 231, 232. In the CMP, the second lower pole film 212, the first back gap film 216, the insulating film 253, the first coil 231 and the second coil 232 are adjusted to be 2.5 to 3.0 µm in film thickness.

Hereupon, an edge of the second lower pole film 212 and an edge of the second coil 232 are located close to each other with the insulating film 252 of $Al_2O_3$-CVD between them and so, they are close to the ABS 52, 53 (see FIG. 3). Consequently, the loss of magnetic flux is reduced and so, a write head with excellent over-write characteristic is obtained.

Figure 17:
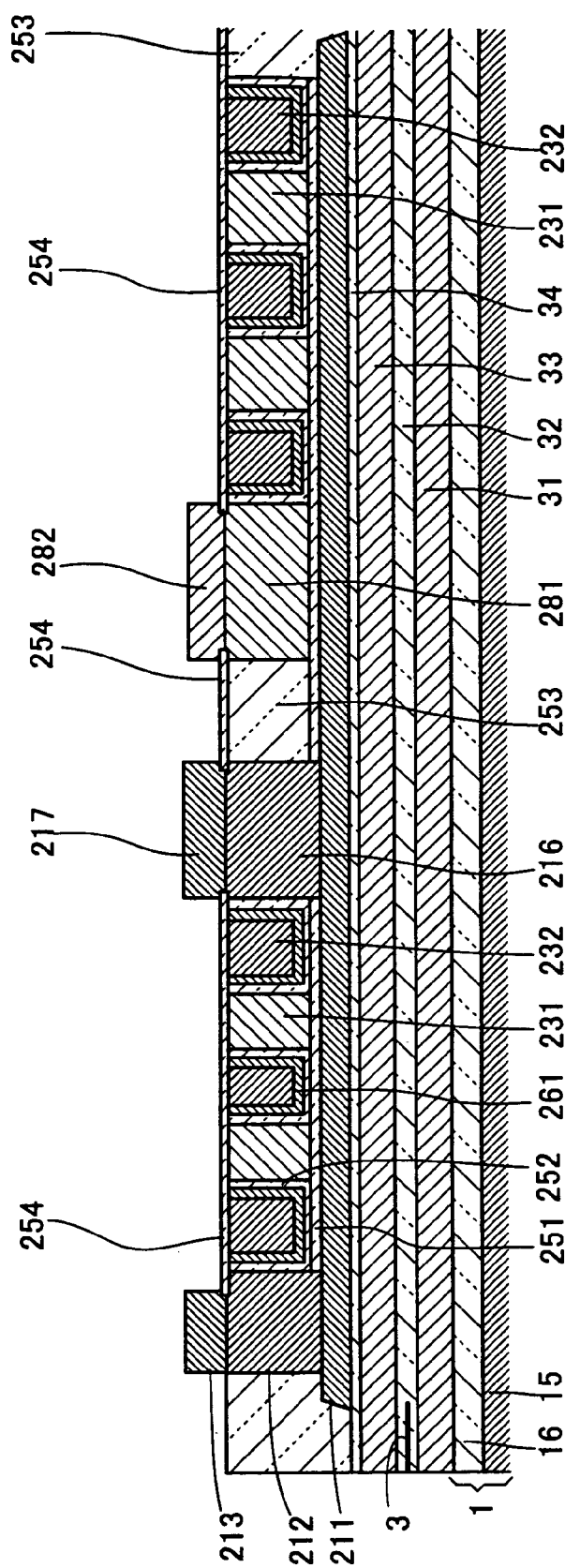
FIG. 17 is a diagram showing a process after the process shown in FIG. 16.

Process Leading to a State of FIG. 17

Next, as shown in FIG. 17, an insulating film 254 covering the surfaces of the first coil 231 and the second coil 232 is deposited thereon. The insulating film 254 is made of $Al_2O_3$ and formed, for example, 0.2 to 0.3 µm in thickness. Openings of the insulating film 254 are formed directly over the second lower pole film 212, the first back gap film 216 and the first connecting conductor film 281. And a second connecting conductor film 282, which is to be a jumper wire for electrically connecting the first coil 231 and the second coil 232, is formed on the first connecting conductor film 281 through an opening. The second connecting conductor film 282 is formed 0.5 to 1.0 µm in thickness. A third pole film 213 and a second back gap film 217 are formed respectively in the openings formed directly over the second lower pole film 212 and the first back gap film 216.

A material forming the second connecting conductor film 282 is preferably Cu but may be the same material as the third lower pole film 213. The third pole film 213 may be a plating film of NiFe, CoNiFe, CoFe or the like and in the embodiment, the third pole film 213 is made of CoNiFe (1.9 to 2.3 T) and formed 1 to 2 µm in thickness.

Figure 18:
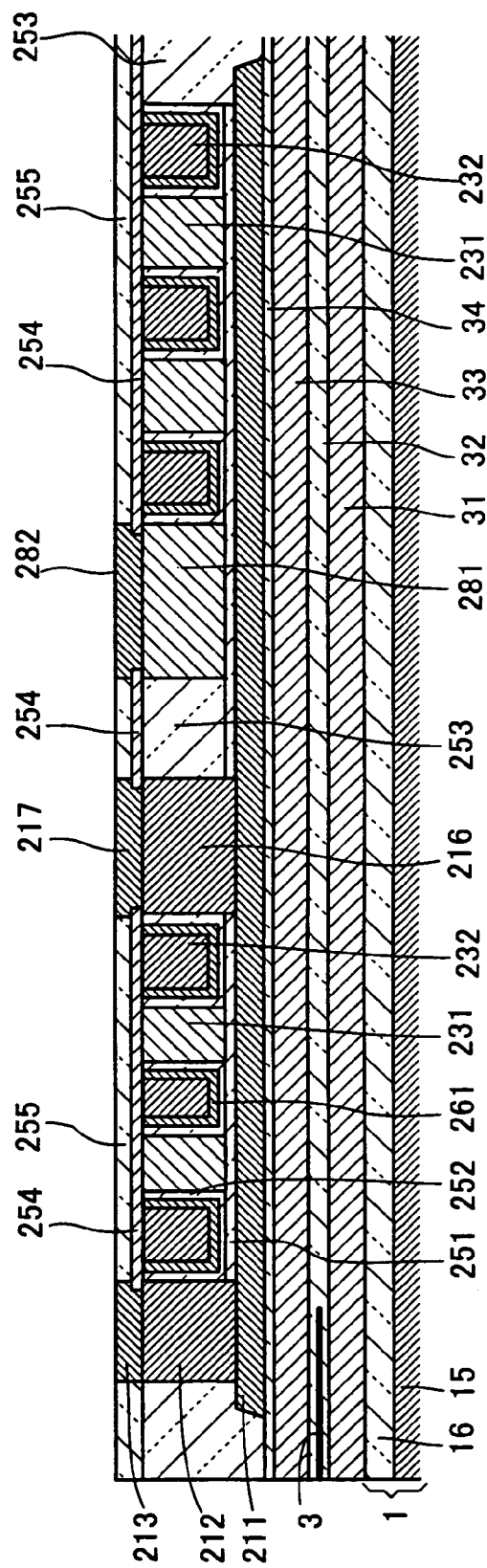
FIG. 18 is a diagram showing a process after the process shown in FIG. 17.

Process Leading to a State of FIG. 18

Next, an insulating film 255 of $Al_2O_3$ is formed, for example, 1 to 1.5 µm thick on the surface where the third lower pole film 213 and the back gap film 217 have been formed. After that, the insulating film 255 is polished by CMP to be 0.5 µm thick in a finished state.

Figure 19:
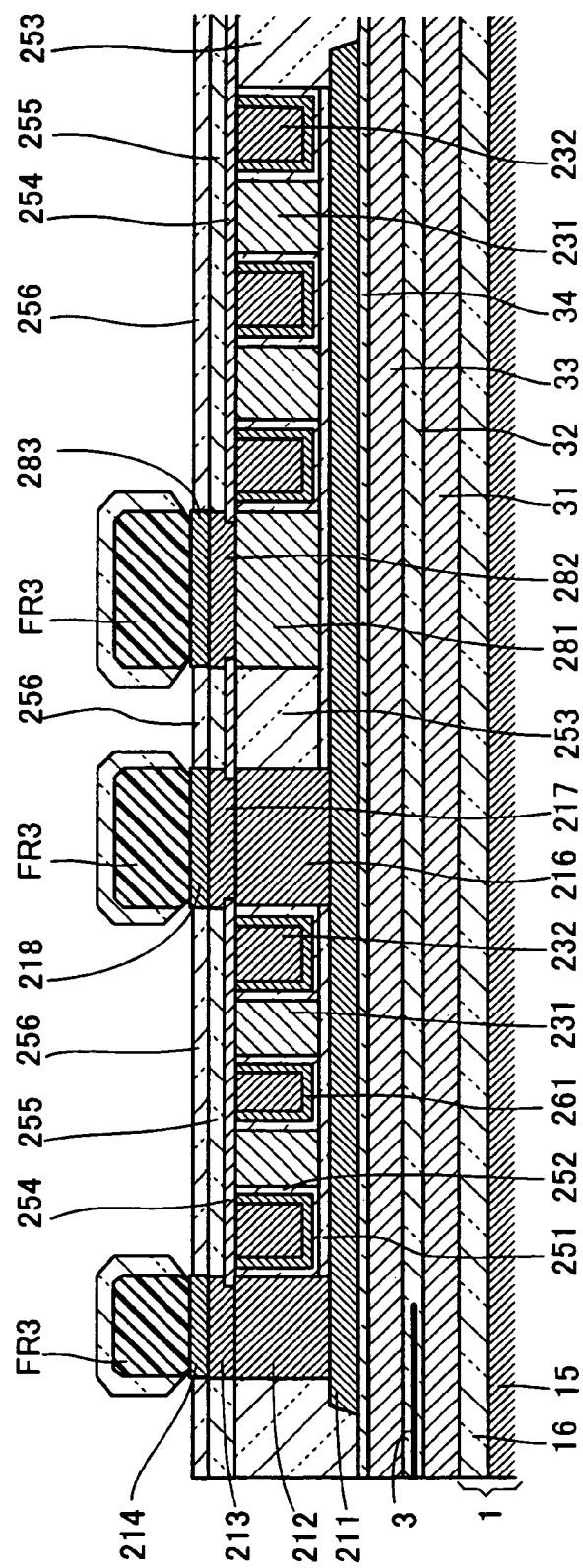
FIG. 19 is a diagram showing a process after the process shown in FIG. 18.

Process Leading to a State of FIG. 19

Next, a sputtering film for a fourth lower pole film 214 is formed on the third lower pole film 213, and then a plating pattern made of NiFe or CoNiFe is formed on the sputtering film. The sputtering film is made of a CoFeN (2.4 T) film of 0.3 to 0.5 µm in thickness. It is possible to use a sputtering film of FeAlN, FeN, FeCo, FeZrN or the like other than the sputtering film of CoFeN.

Next, a fourth lower pole film 214, a third back gap film 218 and a third connecting conductor film 283 are formed respectively on the polished surfaces of the third lower pole film 213, the second back gap film 217 and the second connecting conductor film 282. The fourth lower pole film 214, the third back gap film 218 and the third connecting conductor film 283 are formed, for example, 0.5 µm in thickness. The fourth lower pole film 214 can be made of CoFeN.

Next, a resist mask FR3 is formed on the fourth lower pole film 214, the third back gap film 218 and the third connecting conductor film 283 by means of a photolithography process, and then an insulating film 256 is deposited thereon by means of sputtering or the like. The resist mask FR3 is T-shaped so as to be easily lifted off.

Figure 20:
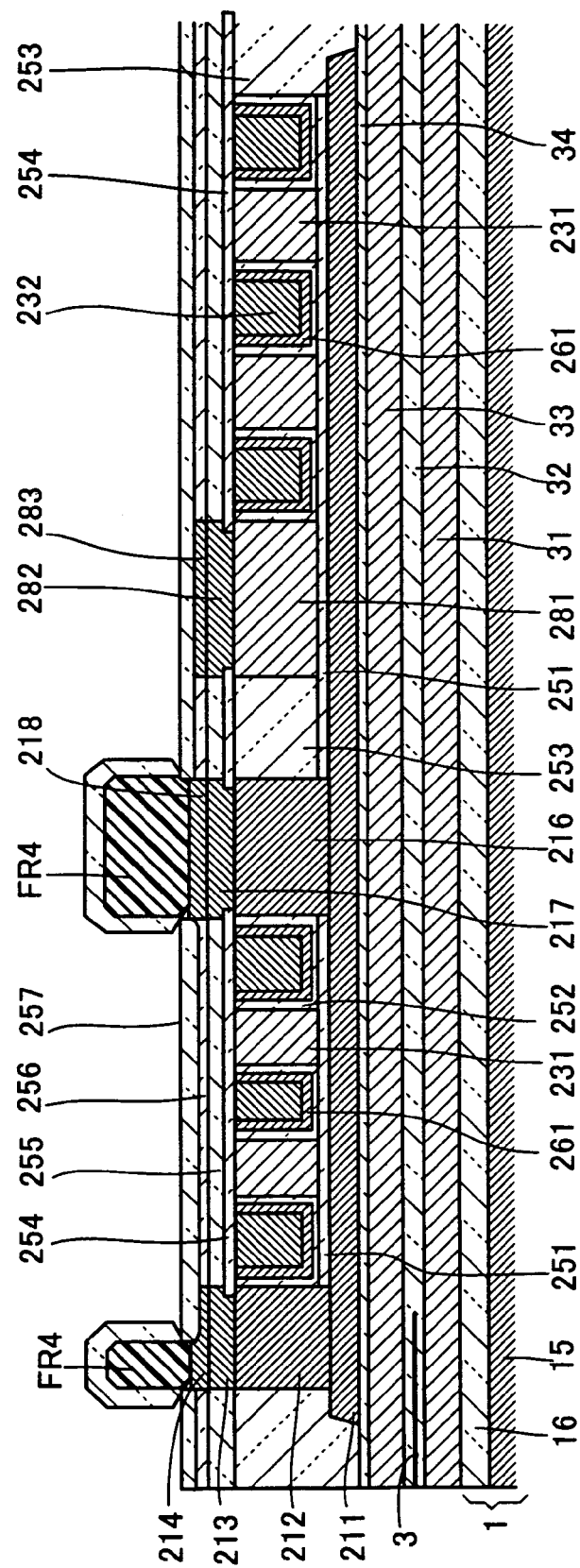
FIG. 20 is a diagram showing a process after the process shown in FIG. 19.

Process Leading to a State of FIG. 20

After the resist mask FR3 is lifted off, a resist mask FR4 is formed on the fourth lower pole film 214, the third back gap film 218 and the third connecting conductor film 283. The resist mask FR4 on the fourth lower pole film 214 is shaped so as not to cover the rear part of the fourth lower pole film 214.

Next, IBE with the resist mask FR4 is performed, so that a part of the fourth lower pole film 214 of CoFeN is etched to be, for example, 0.2 to 0.3 µm in height. Next, sputtering is performed so that an insulating film 257 of $Al_2O_3$ is deposited and self-aligned thereon to be 0.2 to 0.3 µm in thickness.

Figure 21:
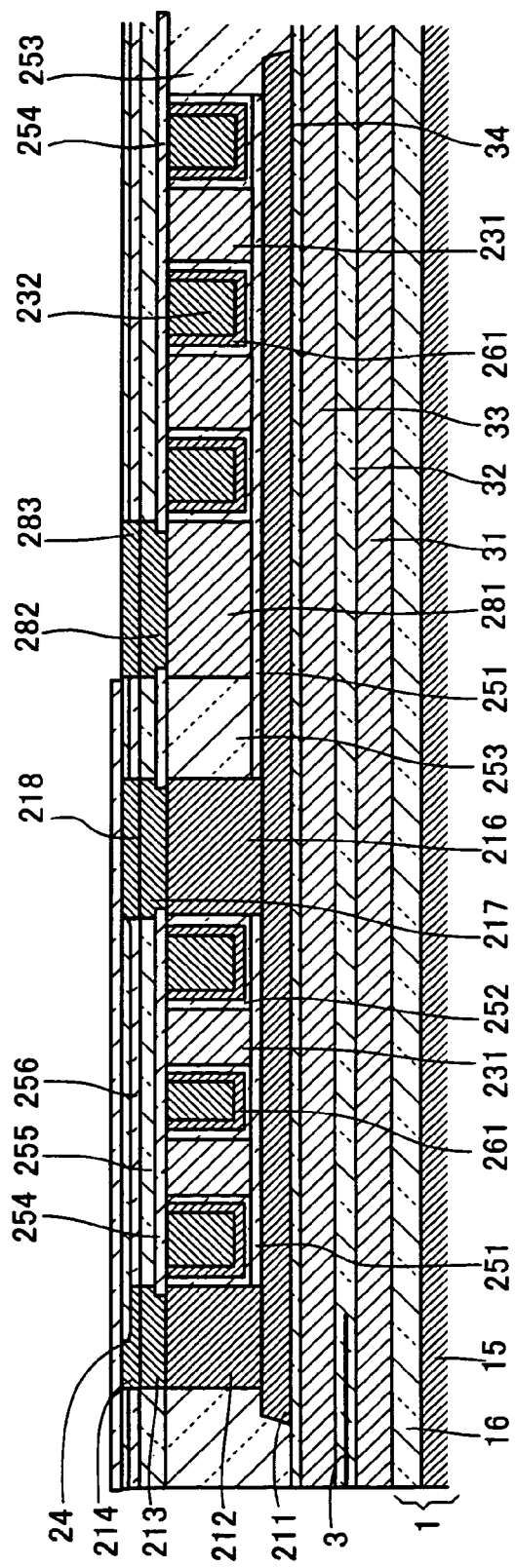
FIG. 21 is a diagram showing a process after the process shown in FIG. 20.

Process Leading to a State of FIG. 21

Next, the resist mask FR4 is lifted off, and then CMP with a sight degree is performed on the surface so as to flatten the fourth lower pole film 214 and the insulating film 257. After that, a gap film 24 is formed 0.08 to 0.1 µm in thickness. The gap film 24 is made of a non-magnetic material such as $Al_2O_3$, Ru, NiCu or Ta.

Figure 22:
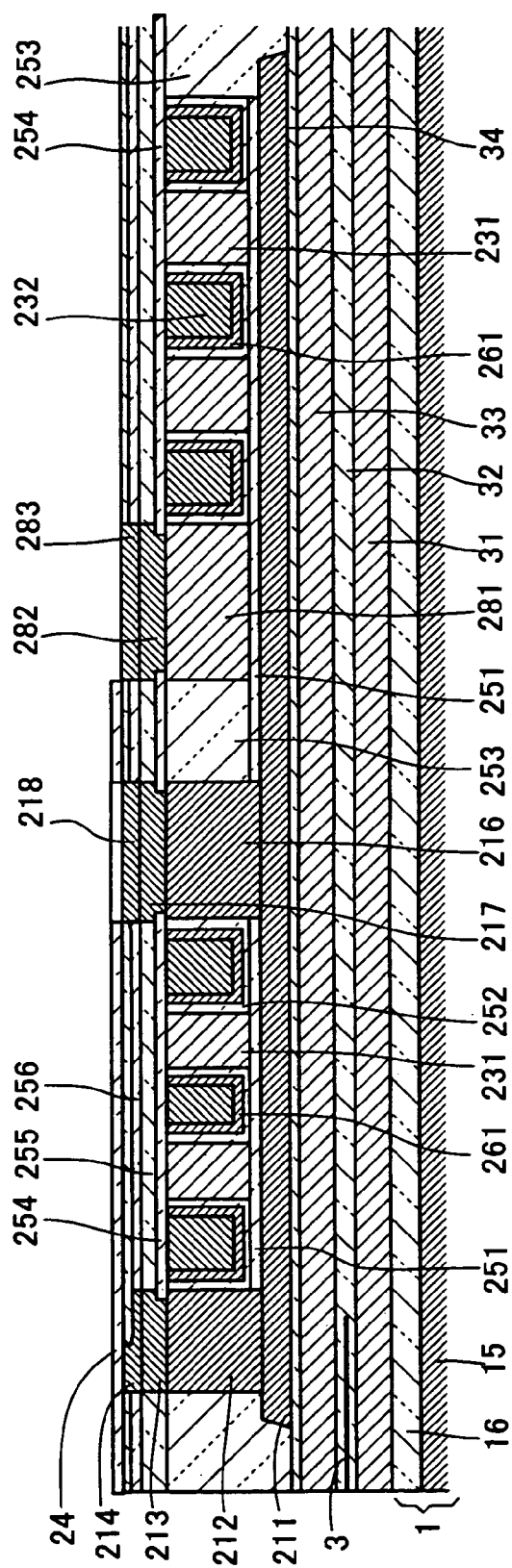
FIG. 22 is a diagram showing a process after the process shown in FIG. 21.
Figure 23:
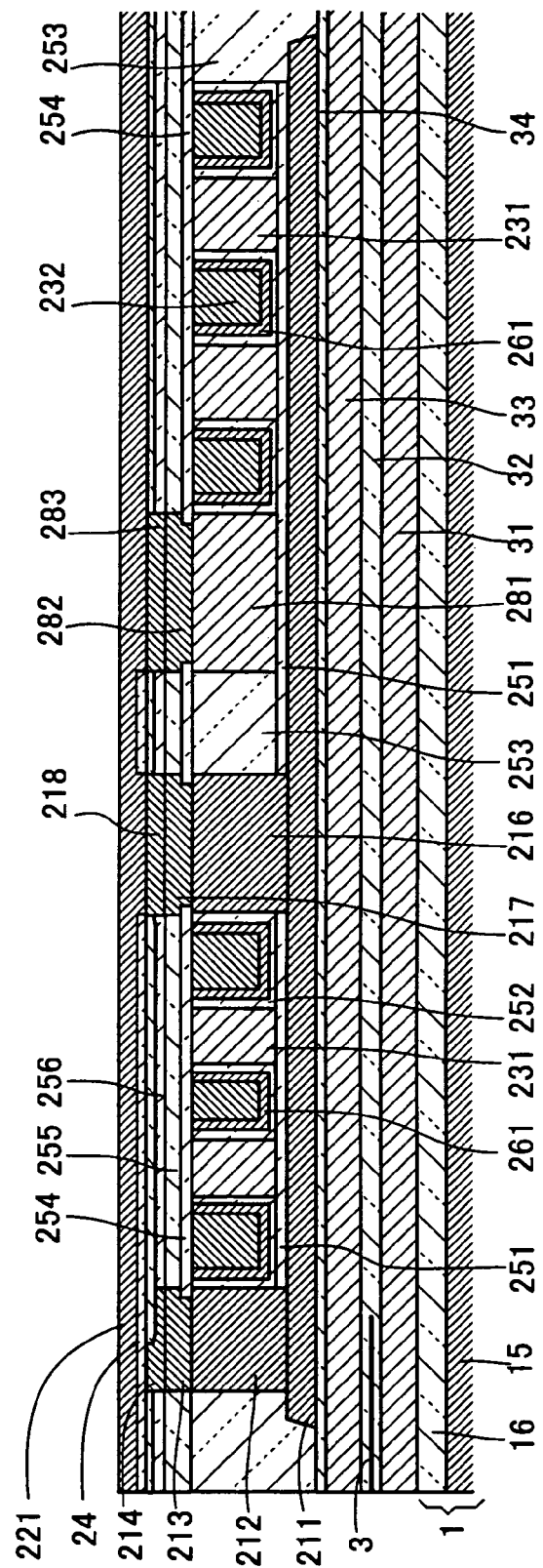
FIG. 23 is a diagram showing a process after the process shown in FIG. 22.

Process Leading to States of FIGS. 22 and 23

Next, as shown in FIG. 22, an opening of the gap film 24 is formed on the third gap film 218. After that, as shown in FIG. 23, a sputtering film of a HiBs material such as FeAlN, FeN, FeCo, CoFeN or FeZrN, is formed 0.1 to 0.5 µm in thickness, which is to be a first upper pole film 221.

Figure 24:
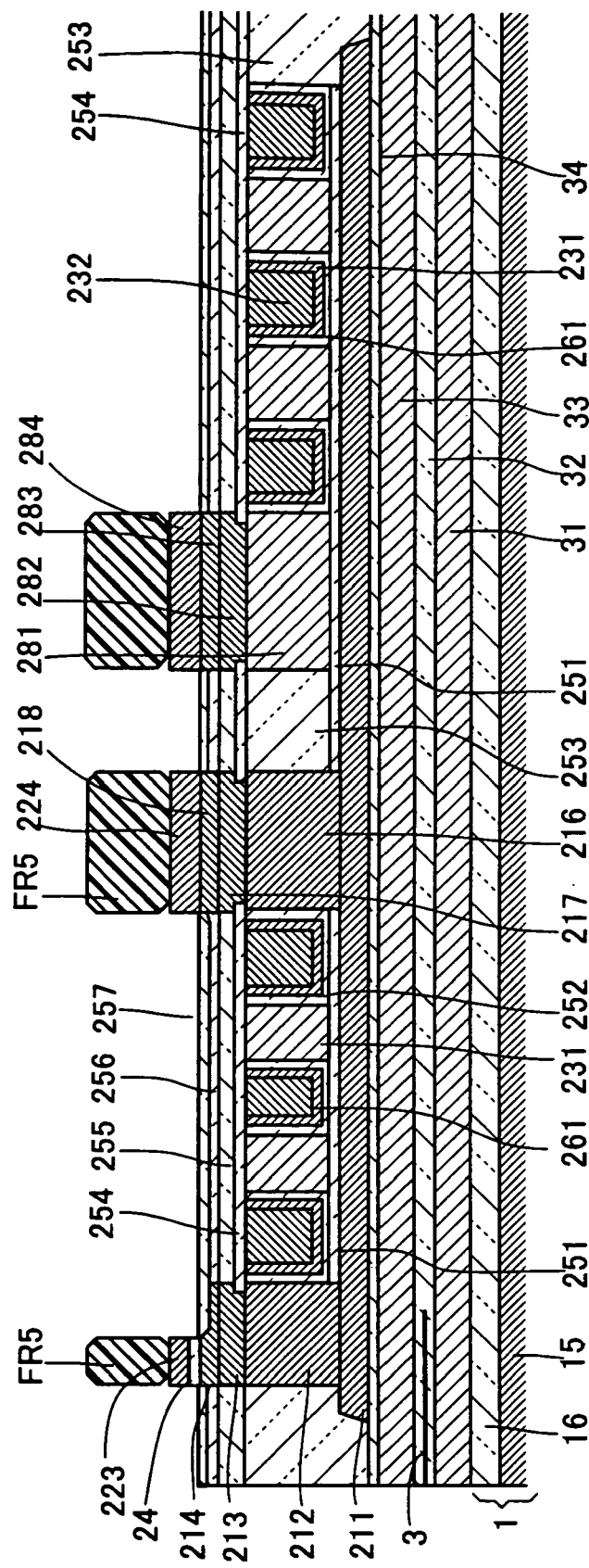
FIG. 24 is a diagram showing a process after the process shown in FIG. 23.

Process Leading to a State of FIG. 24

Next, a resist cover FR5 is formed on the surface of the first upper pole film 221 by means of a photolithography process. The resist cover FR5 is formed so as to be located above the fourth lower pole film 214, the third back gap film 218 and the third connecting conductor film 283. Next, the first upper pole film 221 is etched using the resist cover FR5 as a mask. The etching is IBE or RIE. Consequnetly, the first upper pole film 221, the fourth back gap film 224 and the fourth connecting conductor film 284, which are patterned into prescribed shapes, are formed as shown in FIG. 24.

Figure 25:
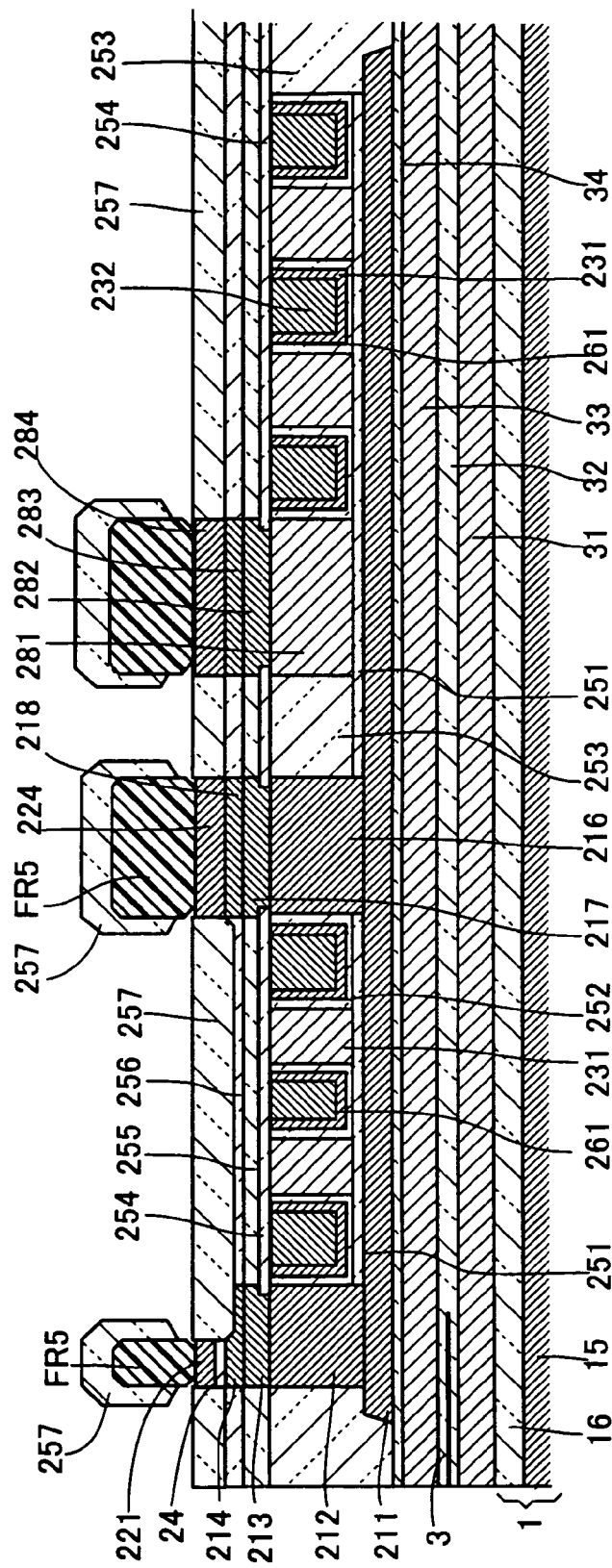
FIG. 25 is a diagram showing a process after the process shown in FIG. 24.

Process Leading to a State of FIG. 25

Next, as shown in FIG. 25, an insulating film 257 of $Al_2O_3$ is deposited on the etched parts by means of sputtering or the like. The insulating film 257 is deposited, for example, 0.2 to 0.6 μm in thickness. After that, the resist cover FR5 is removed by a lift-off method.

Figure 26:
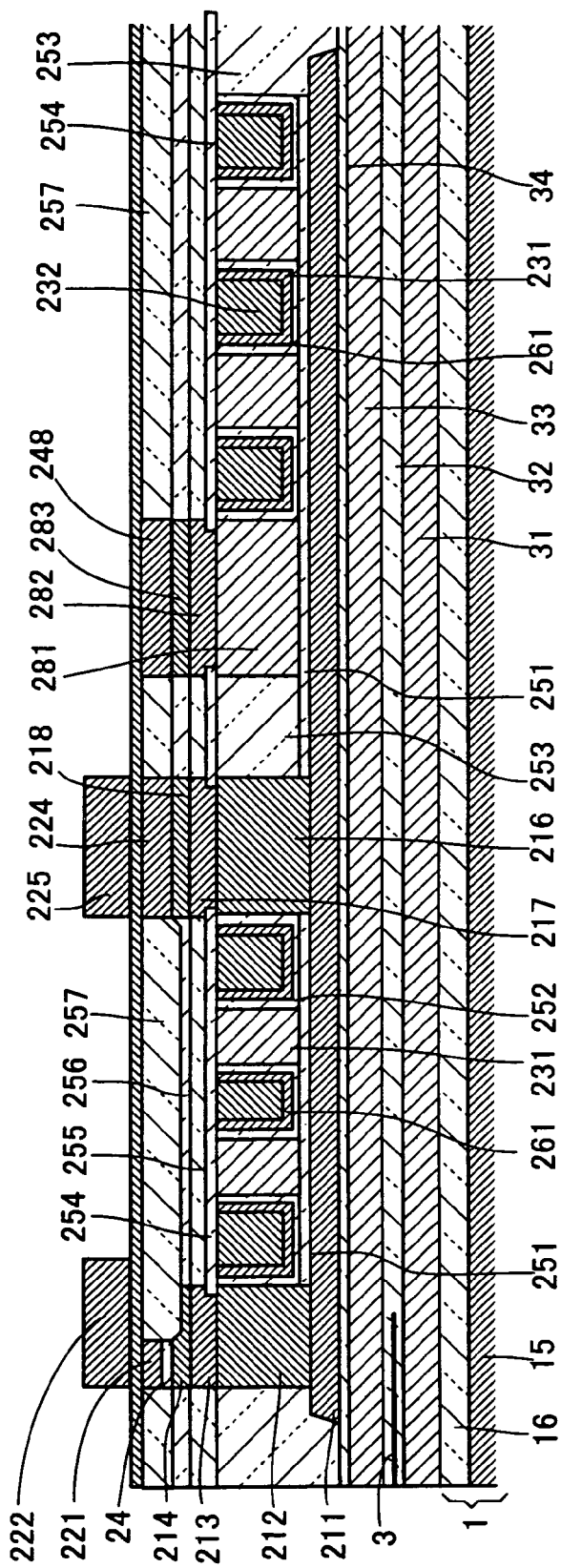
FIG. 26 is a diagram showing a process after the process shown in FIG. 25.
Figure 27:
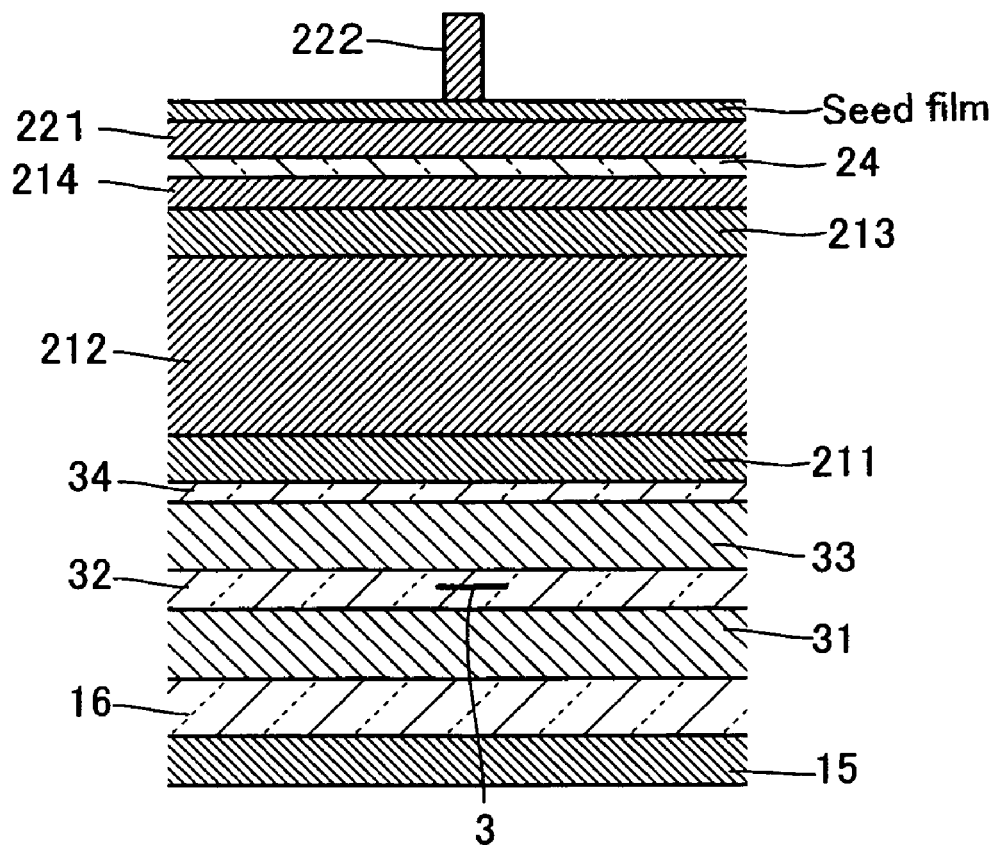
FIG. 27 is a diagram showing a process after the process shown in FIG. 26.

Process Leading to a State of FIGS. 26 and 27

Next, the surfaces of the insulating film 257, the first upper pole film 221, the fourth back gap film 224 and the fourth connecting conductor film 284 are polished by CMP to be more completely flattened.

Next, a seed film of, for example, 0.1 μm in thickness is formed on the flattened surfaces by means of sputtering, and then a photolithography process is performed on the seed film to form a resist frame thereon. And by a selective plating process, CoFeN (2.4 T) is deposited 3 to 4 μm in thickness to form a second upper pole film 222 and a fifth back gap film 225 as shown in FIG. 26.

Figure 28:
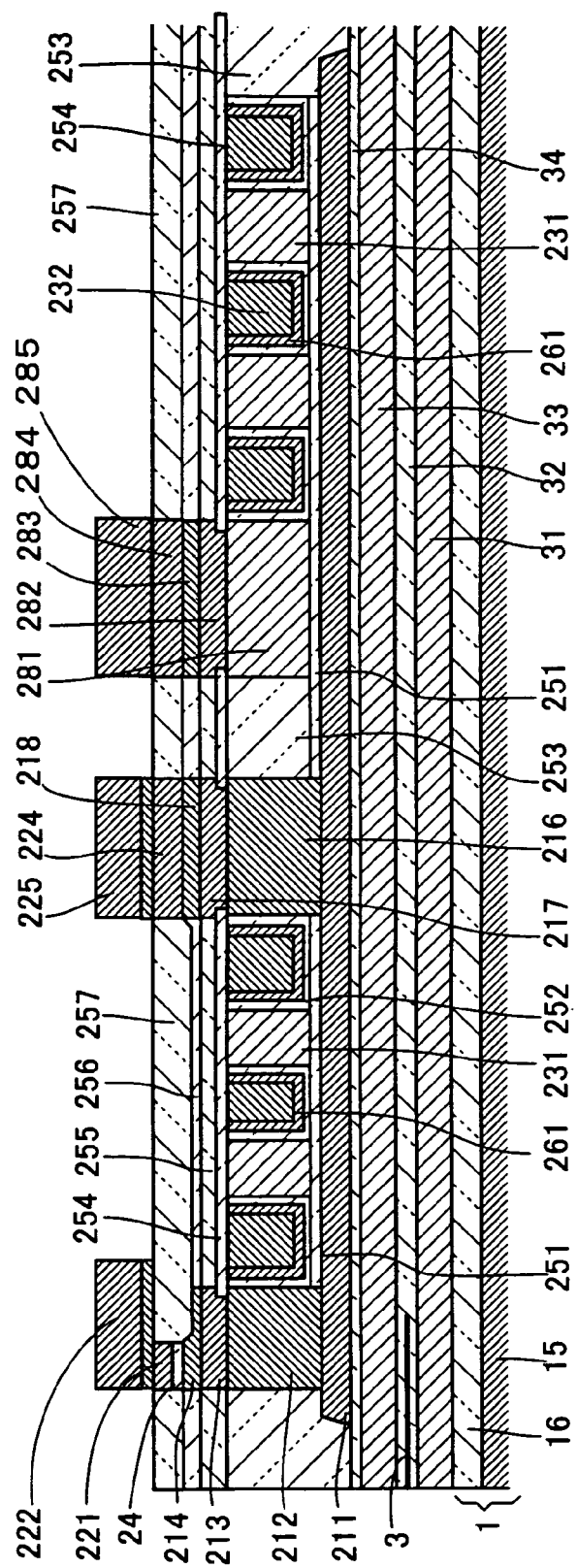
FIG. 28 is a diagram showing a process after the process shown in FIG. 27.

Process Leading to a State of FIG. 28

Next, the seed film is removed by means of ion milling or the like. At this stage, the fourth lower pole film 214, the gap film 24, the first upper pole film 221 and the second upper pole film 222 may be patterned by ion milling. After that, a fifth connecting conductor film 285 is formed by a selective Cu-plating process.

Figure 29:
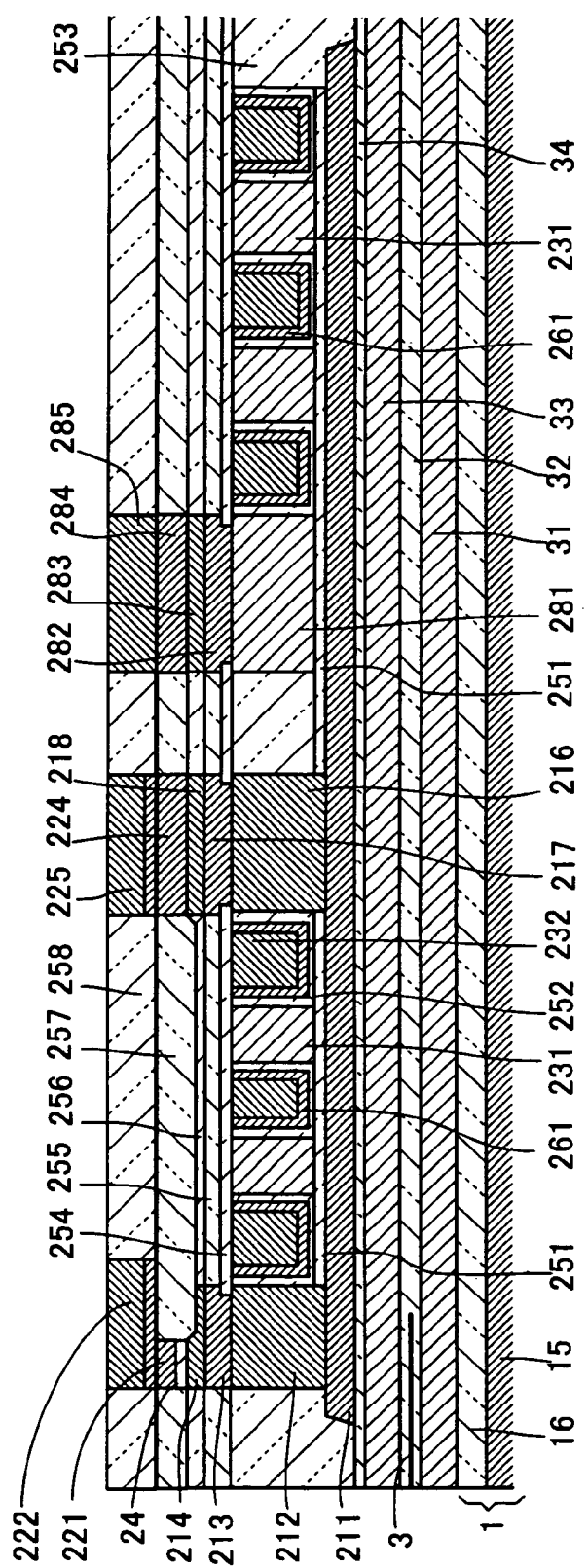
FIG. 29 is a diagram showing a process after the process shown in FIG. 28.
Figure 30:
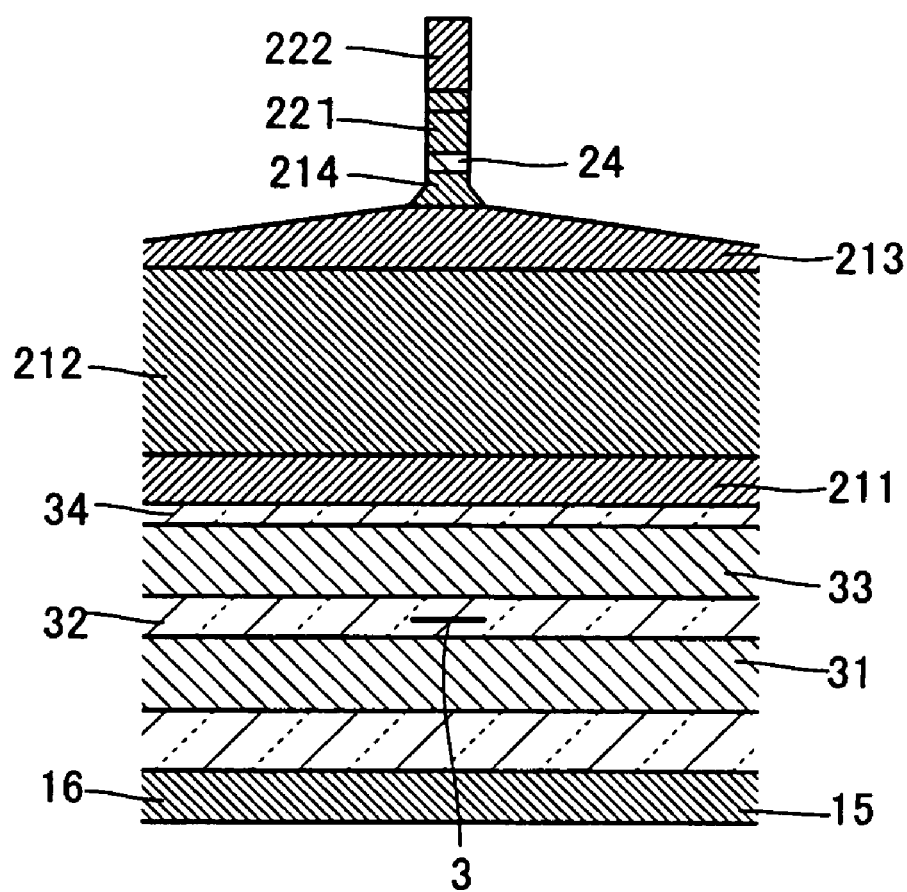
FIG. 30 is a diagram showing a process after the process shown in FIG. 29.

Process Leading to a State of FIGS. 29 and 30

Next, an insulating film 258 of alumina is deposited 2 to 4 μm in thickness by means of sputtering or the like, and then the surface of the insulating film 258 is polished by CMP. This CMP is performed so that the surfaces of the insulting film 258, the second upper pole film 222, the fifth back gap film 225 and the fifth connecting conductor film 285 form an uniform and flat surface.

Figure 31:
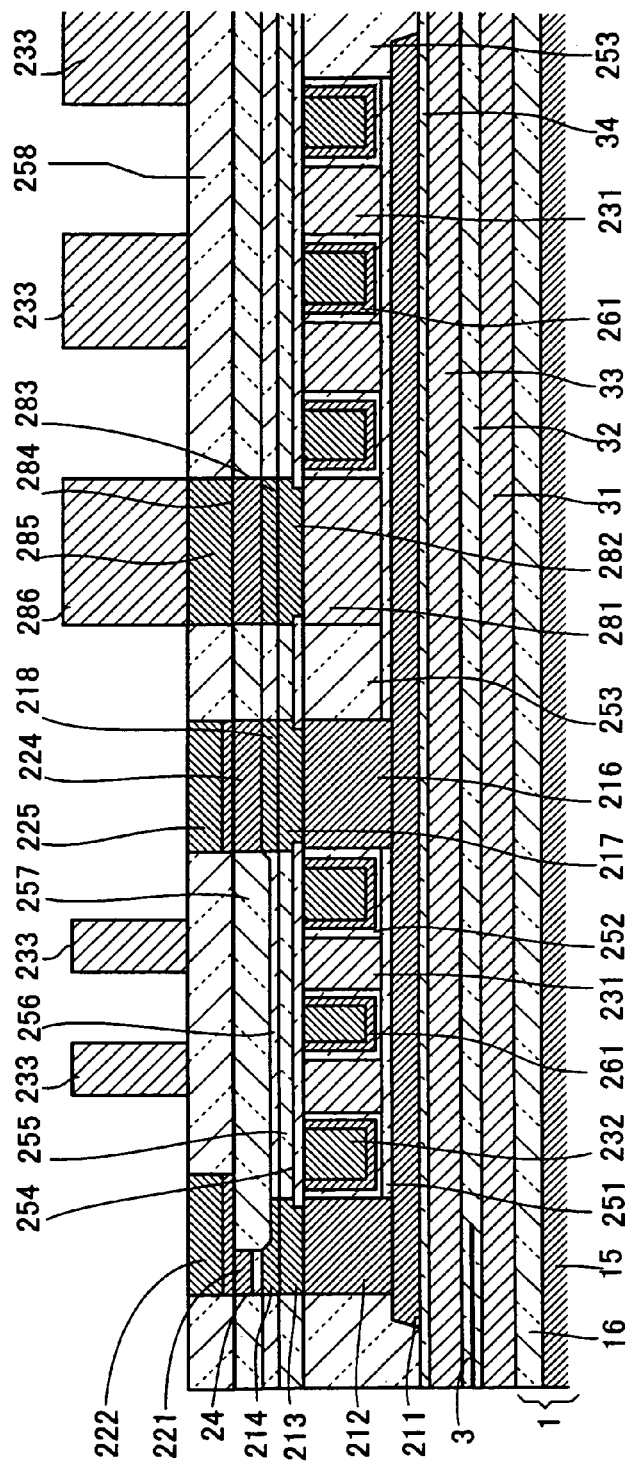
FIG. 31 is a diagram showing a process after the process shown in FIG. 30.

Process Leading to a State of FIG. 31

Next, a selective Cu-plating process is performed on the surface of the insulating film 258 so that a third coil 233 is grown to, for example, 3 to 3.5 μm in thickness. In the process of forming the third coil 233, a sixth connecting conductor film 286 is formed on the fifth connecting conductor film 285 by a selective Cu-plating process.

The third coil 233 is formed by substantially the same process as that of the first coil 231. Specifically, a seed film is formed on the surface of the insulating film 258. The seed film is made of a material suitable for a Cu-plating ground film and is formed 50 to 80 nm in thickness by means of Cu-CVD.

Next, a photoresist film is formed on the seed film by means of a spin-coating method or the like, and then the photoresist film is exposed through a mask having a coil pattern, and developed. The photoresist film may be either of positive photoresist and negative photoresist.

Next, a selective Cu-plating process is performed to form the third coil 233. After that, the resist frame is removed by means of chemical etching or the like. FIG. 31 shows a state in which the resist frame has been removed.

Figure 32:
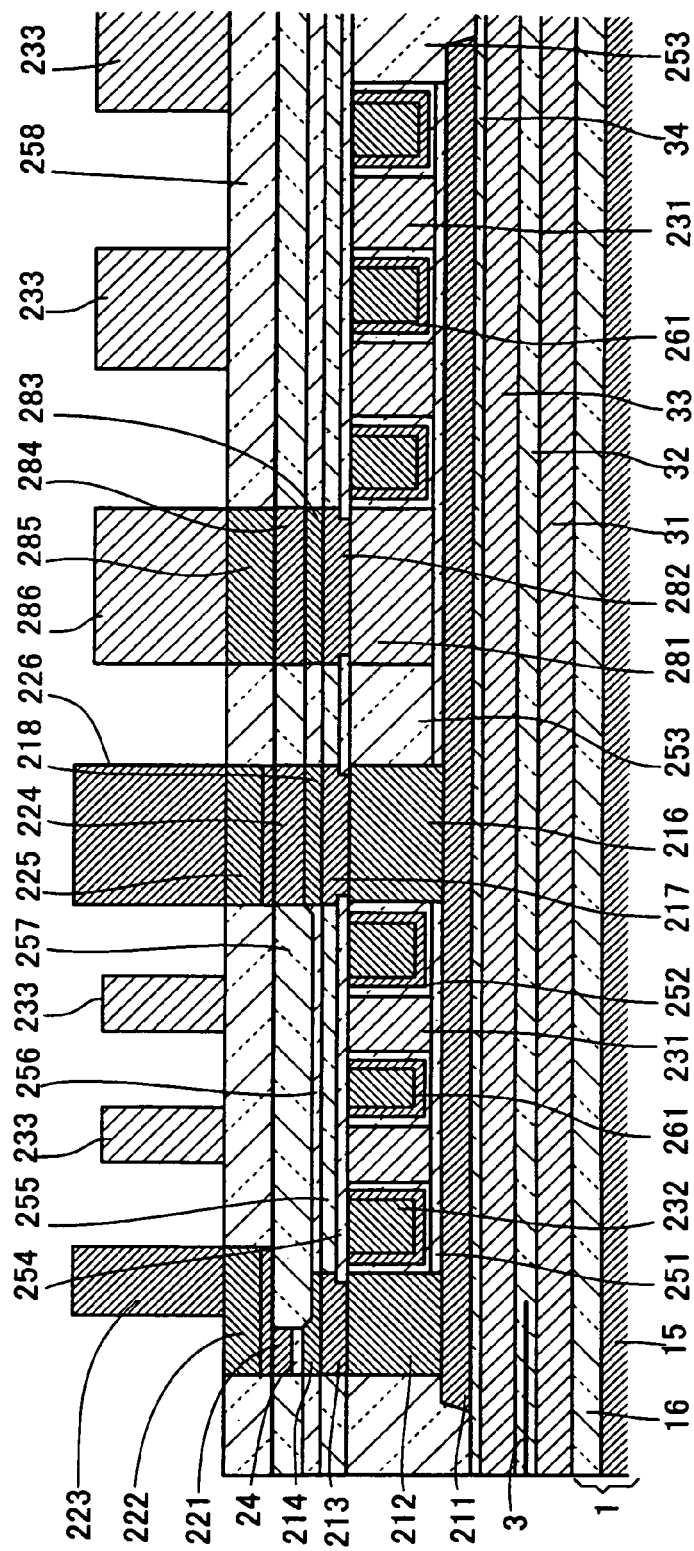
FIG. 32 is a diagram showing a process after the process shown in FIG. 31.

Process Leading to a State of FIG. 32

Next, a selective plating process is performed, using the second upper pole film 222 and the fifth back gap film 225 as seed films, to grow a third upper pole film 223 and a sixth back gap film 226. The third upper pole film 223 and the sixth back gap film 226 are made of, for example, CoNiFe (2.3 T) and formed 3.5 to 4.0 μm in thickness.

Figure 33:
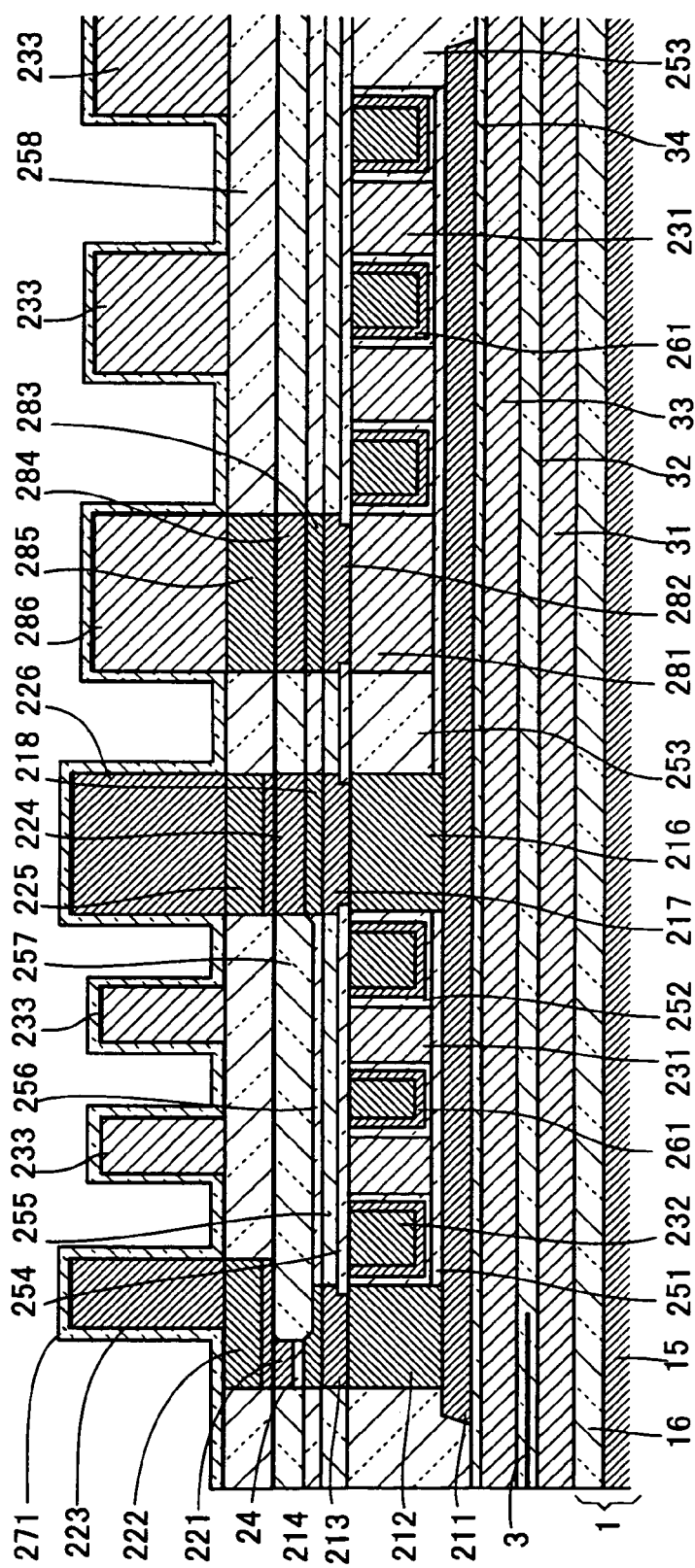
FIG. 33 is a diagram showing a process after the process shown in FIG. 32.

Process Leading to a State of FIG. 33

Next, an insulating film 271 is deposited on the surfaces and side surfaces of the insulating film 258, the third coil 233, the third upper pole film 223 and the sixth back gap film 226. The insulating film 271 is, specifically, formed about 0.1 to 0.15 μm in thickness by means of $Al_2O_3$-CVD with high-purity alumina.

Figure 34:
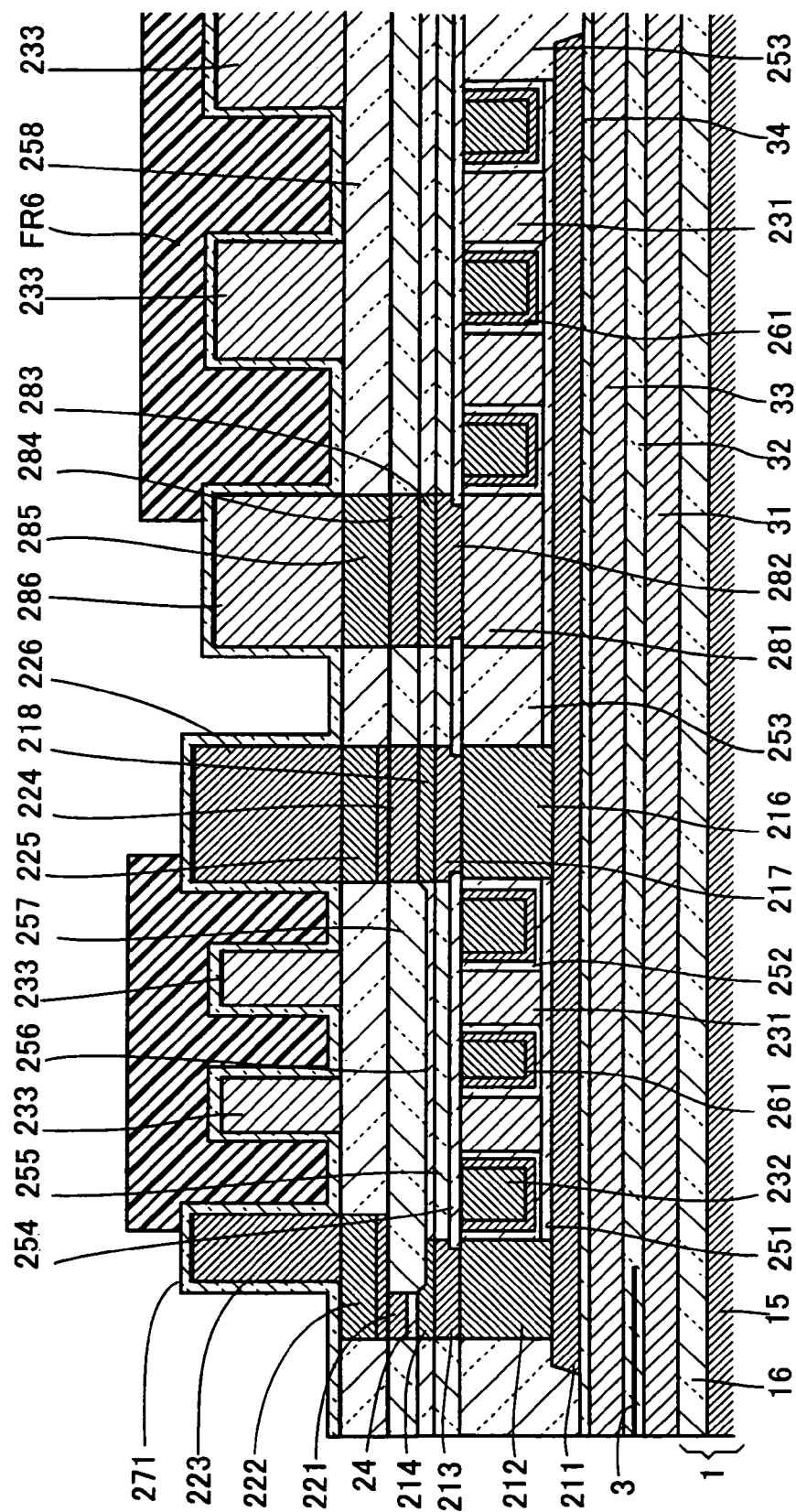
FIG. 34 is a diagram showing a process after the process shown in FIG. 33.

Process Leading to a State of FIG. 34

Next, a photoresist film covering the third coil 233, the third upper pole film 223, the sixth back gap film 226 and the sixth connecting conductor film 286, is formed. After that, a photolithography process is applied onto the photoresist film so that a resist cover FR6 covering the third coil 233 and the periphery of the coil is formed as shown in FIG. 34.

Figure 35:
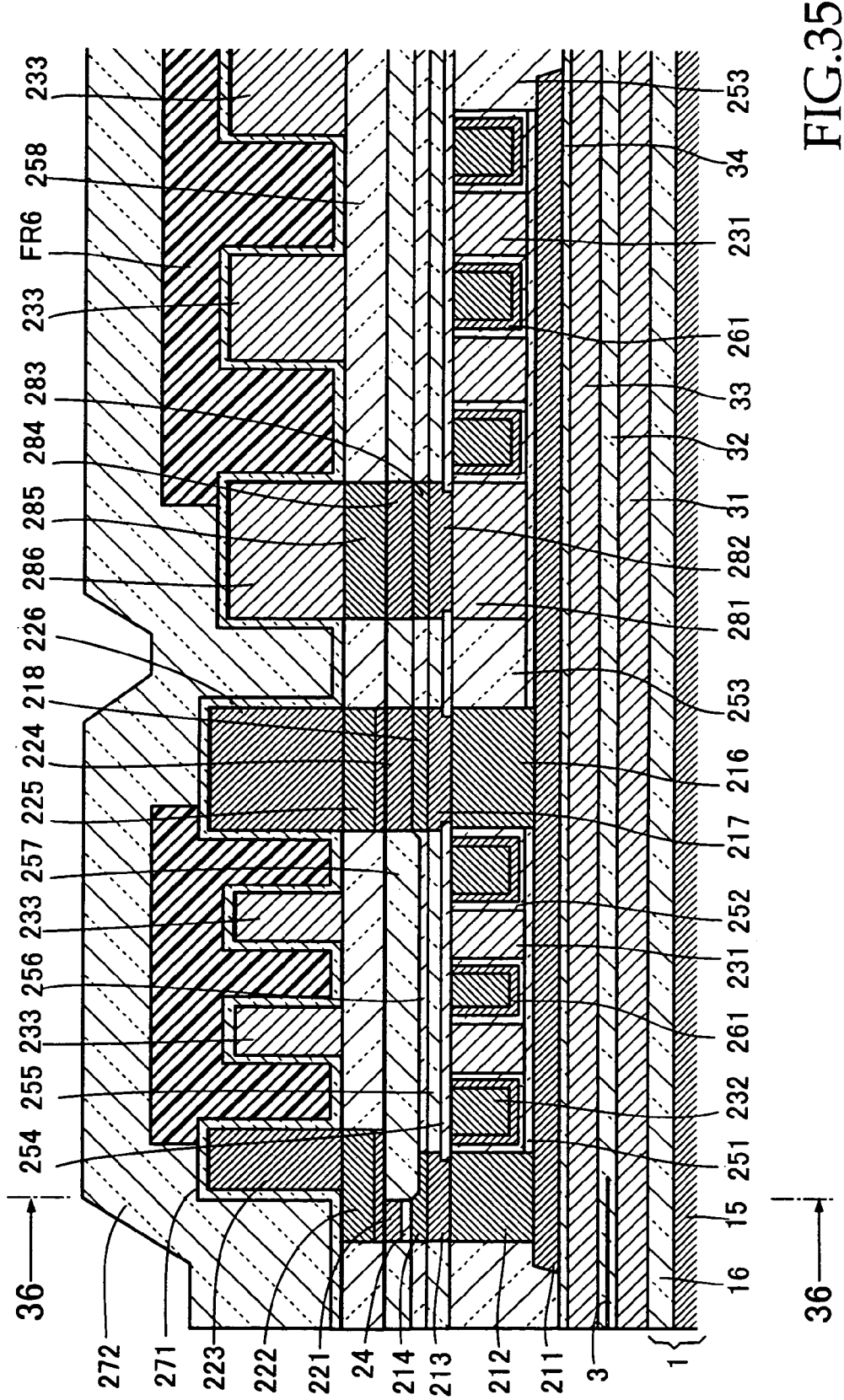
FIG. 35 is a view of a write element obtained by the process shown in FIG. 34, seen from the ABS side.
Figure 36:
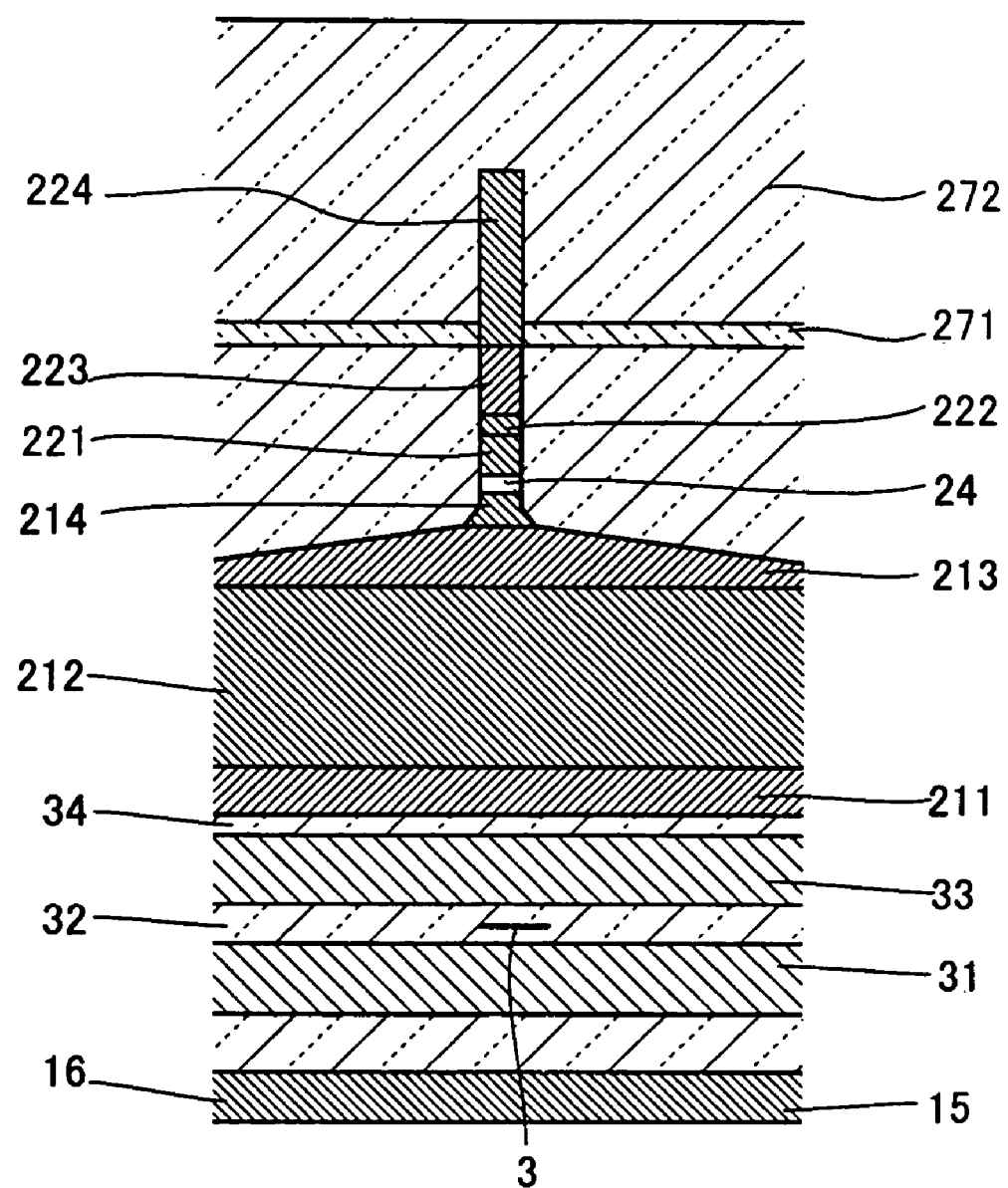
FIG. 36 is a sectional view of FIG. 35 taken along line 36—36.

Process Leading to a State of FIGS. 35 and 36

Next, as shown in FIGS. 35 and 36, an insulating film 272 covering the whole resist cover FR6 is deposited thereon. The insulating film 272 is formed 3 to 5 μm in thickness.

Figure 37:
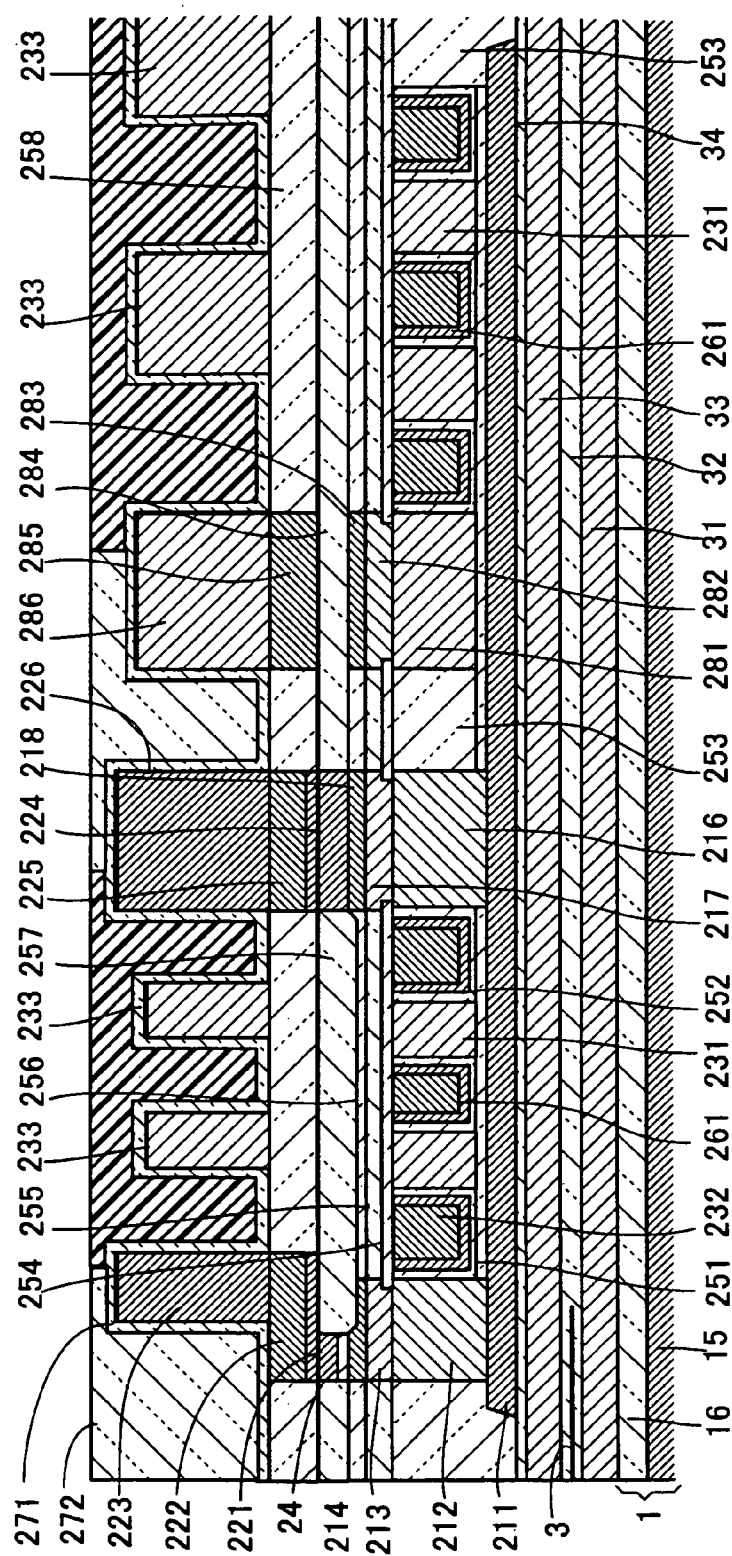
FIG. 37 is a diagram showing a process after the process shown in FIGS. 35 and 36.

Process Leading to a State of FIG. 37

Next, the insulting film 272 and the resist cover FR6 are polished and flattened by CMP. Alumina-based slurry is used in the CMP. FIG. 37 shows a state in which the CMP process has been performed.

Figure 38:
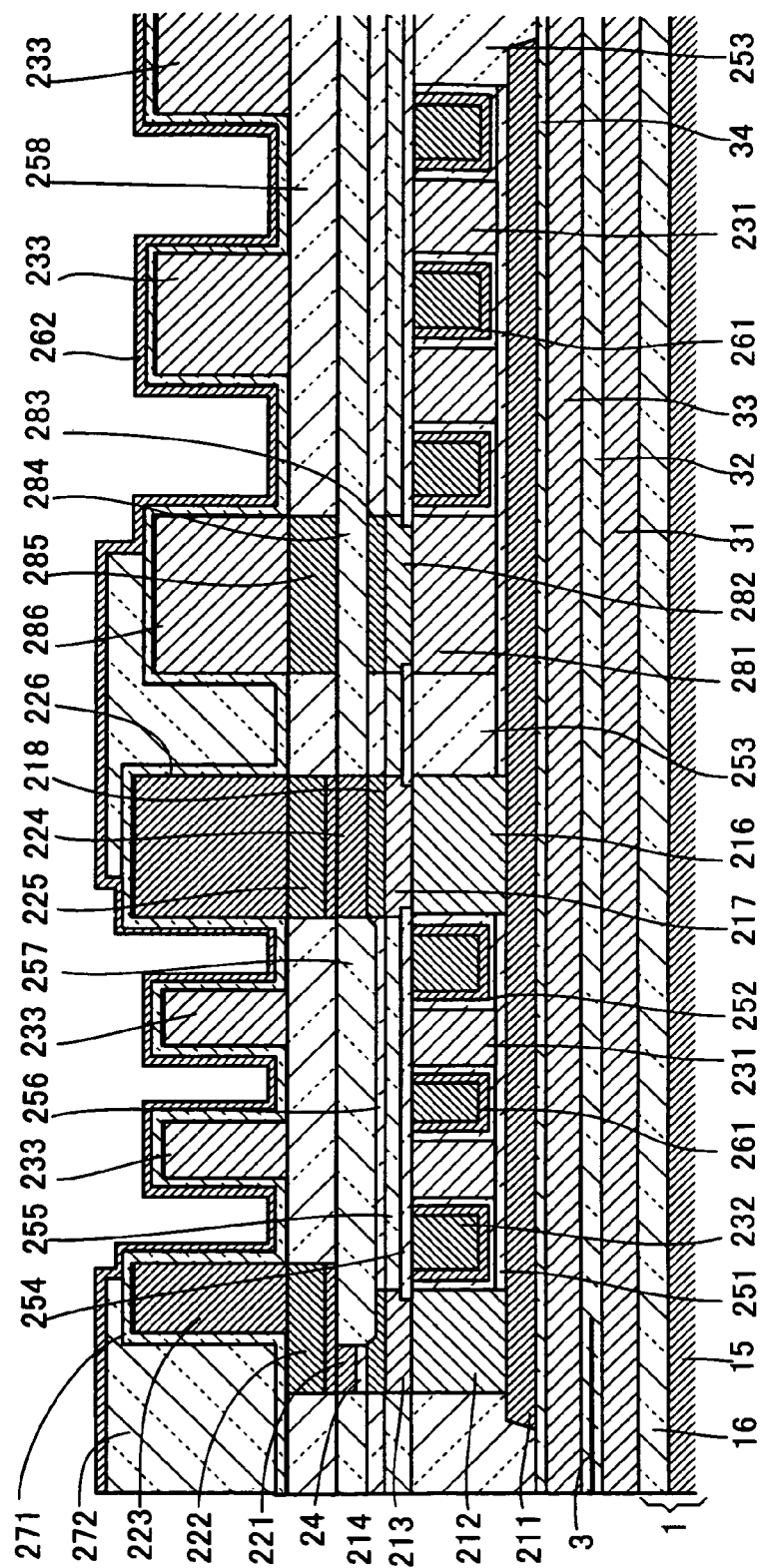
FIG. 38 is a diagram showing a process after the process shown in FIG. 37.

Process Leading to a State of FIG. 38

Next, the resist cover FR6 is removed and then a seed film 262 is deposited 0.05 to 0.1 μm in thickness on the surfaces and side surfaces of the third coil 233, the third upper pole film 223, the sixth back gap film 226, the sixth connecting conductor film 286 and the insulating film 272 by means of Cu-CVD.

Figure 39:
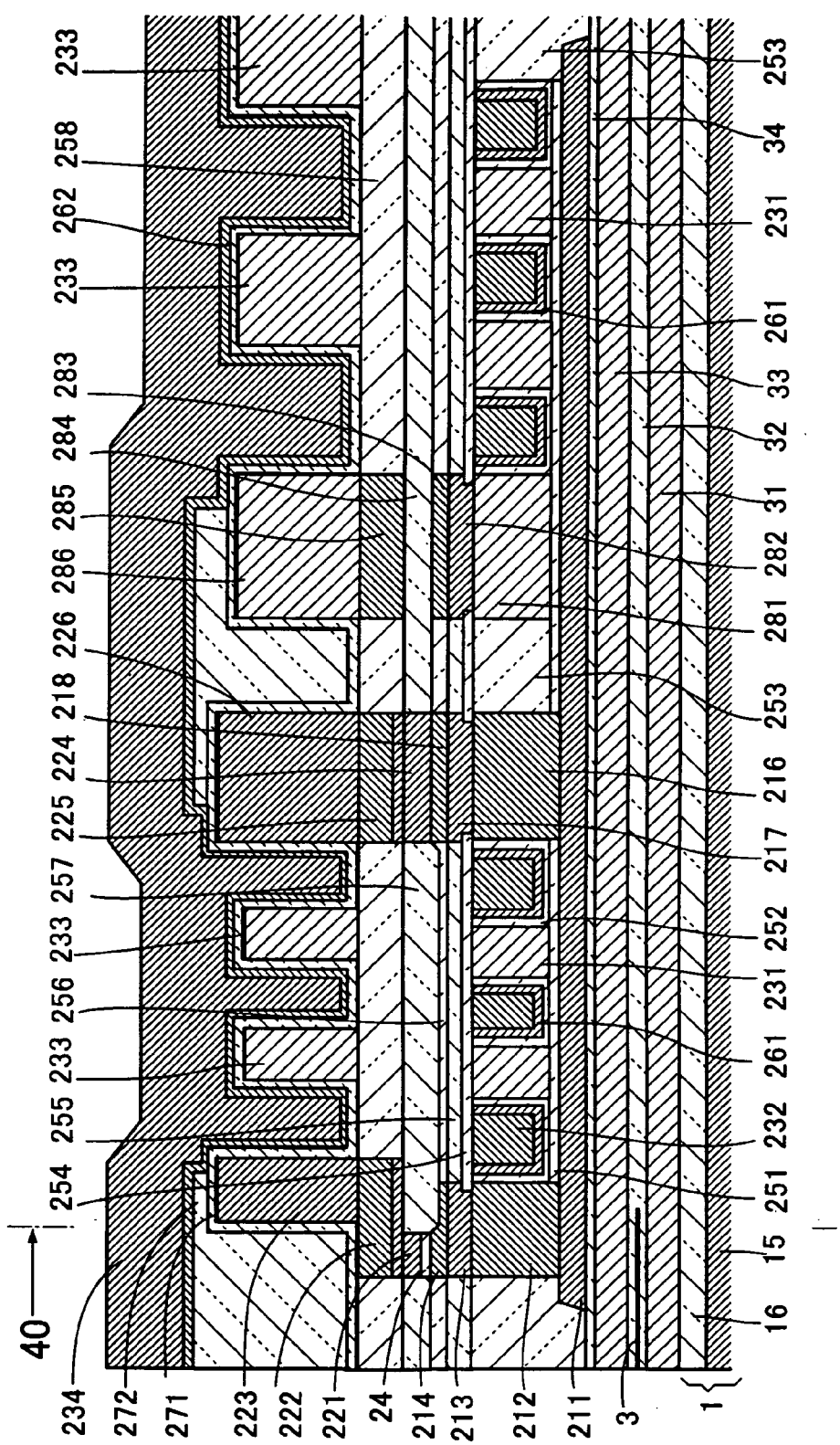
FIG. 39 is a diagram showing a process after the process shown in FIG. 38.
Figure 40:
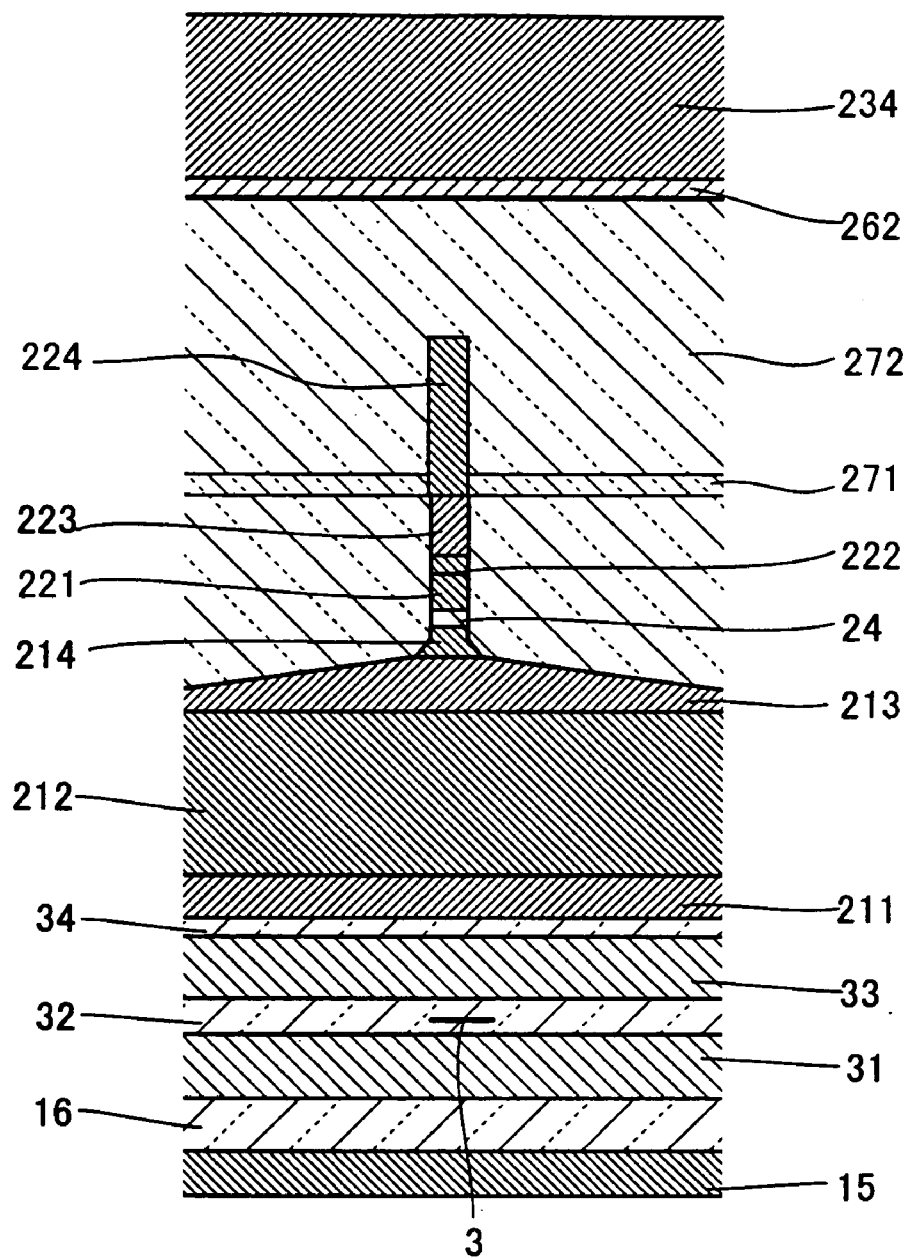
FIG. 40 is a sectional view of FIG. 39 taken along line 40—40.

Process Leading to a State of FIGS. 39 and 40

Next, as shown in FIGS. 39 and 40, a plating film 234 to be a fourth coil is formed, for example, 3 to 4 μm in thickness on the seed film 262. The plating film 234 comprises Cu as its main constituent.

Figure 41:
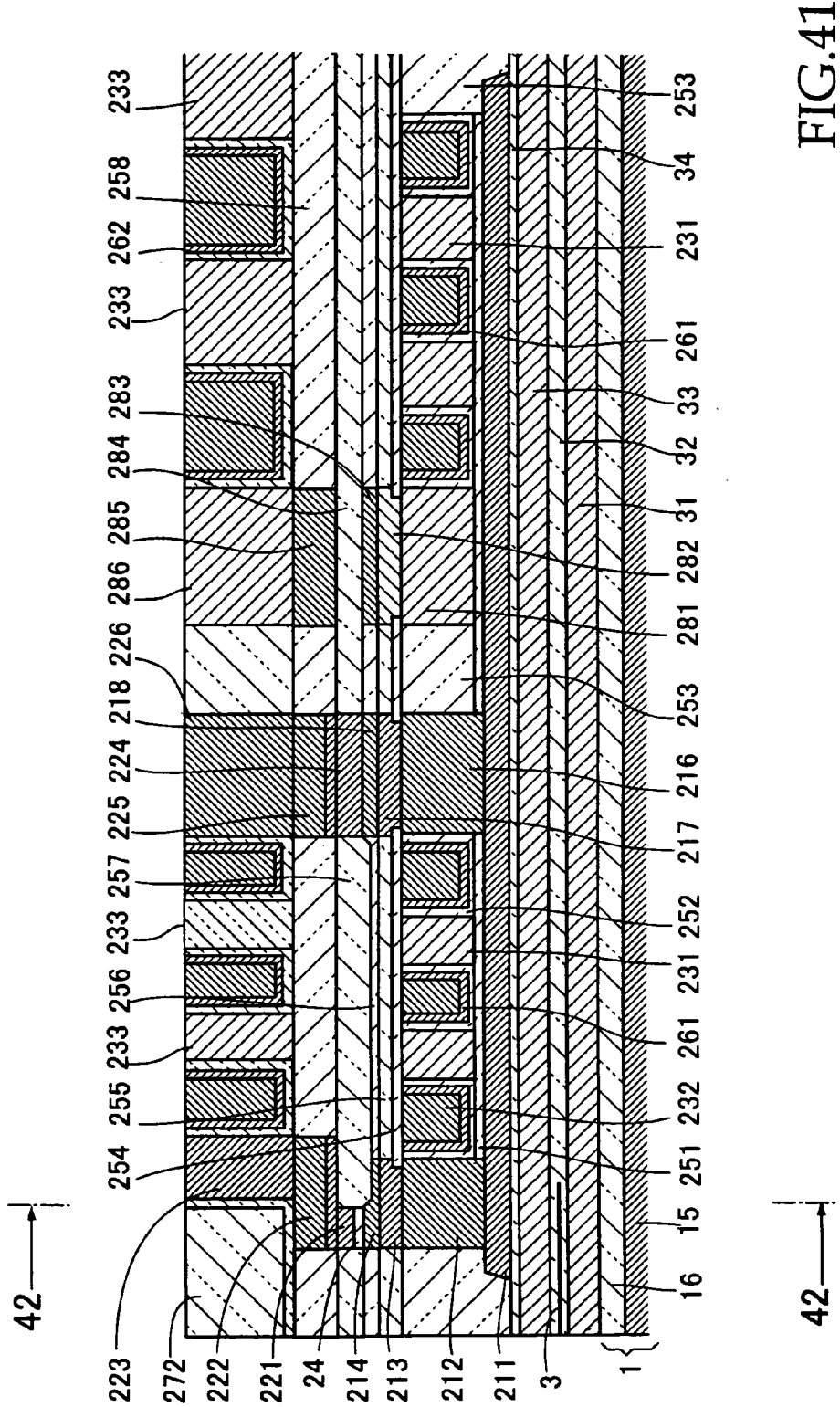
FIG. 41 is a diagram showing a process after the process shown in FIGS. 39 and 40.
Figure 42:
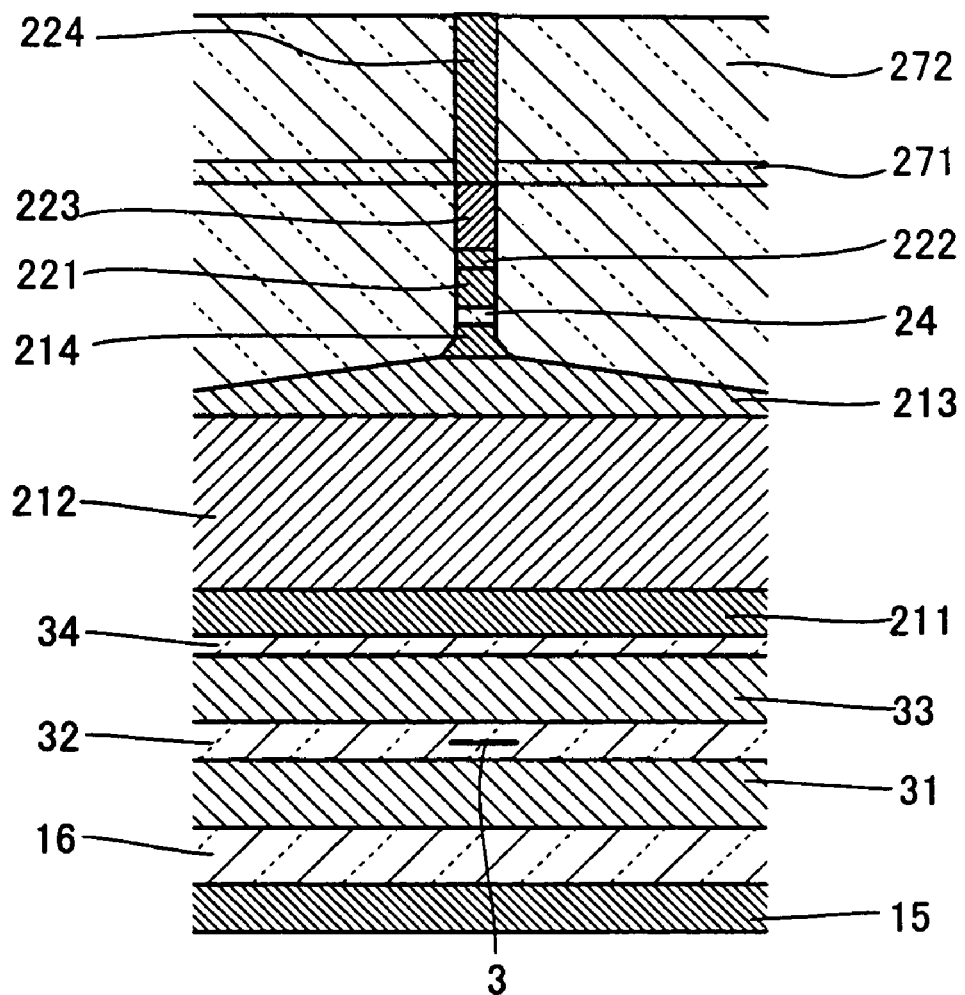
FIG. 42 is a sectional view of FIG. 41 taken along line 42—42.

Process Leading to a State of FIGS. 41 and 42

Next, as shown in FIGS. 41 and 42, the plating film 234 is polished and flattened by CMP. Alumina-based slurry is used in the CMP. Consequently, a fourth coil 234 in the flat spiral pattern is formed, insulated from the third coil 233 by the insulating film 271. In the CMP, the surfaces of the third upper pole film 223, the sixth back gap film 226, the sixth connecting conductor film 286 and the insulating film 272 are also polished to be in the same plane as the third coil 233 and the fourth coil 234. The third coil 233 and the fourth coil 234 are adjusted to be 2.0 to 3.0 μm in thickness.

Figure 43:
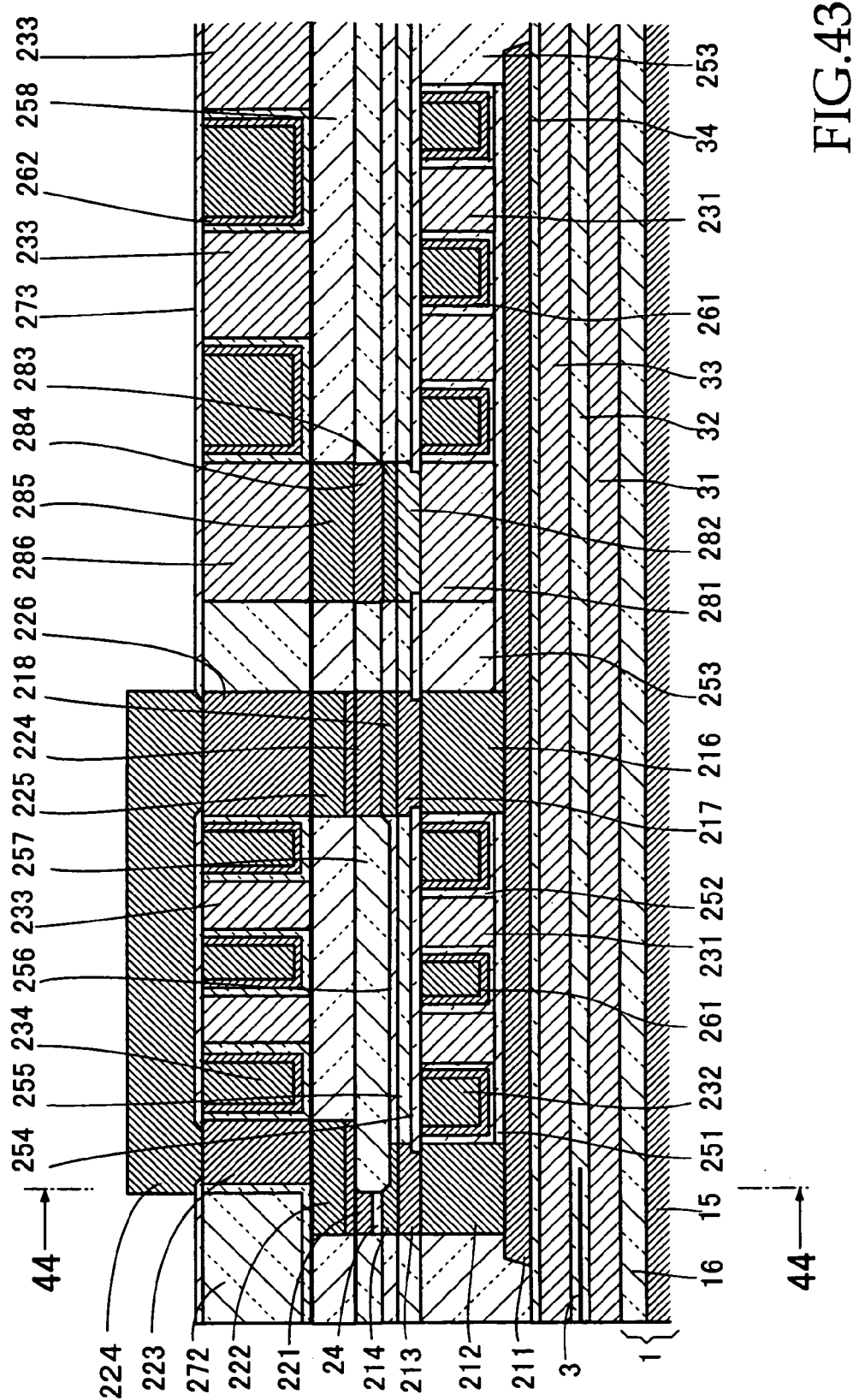
FIG. 43 is a diagram showing a process after the process shown in FIGS. 41 and 42.
Figure 44:
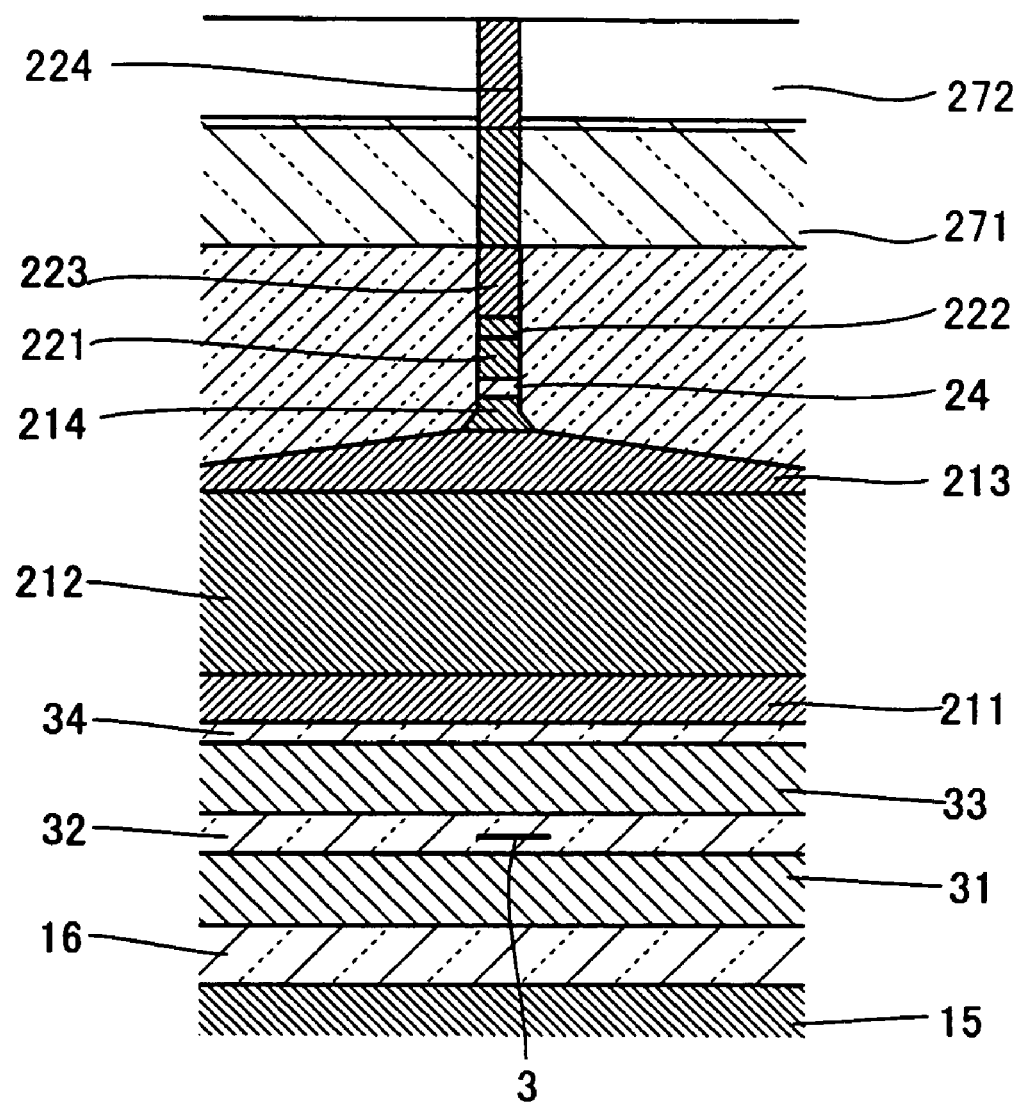
FIG. 44 is a sectional view of FIG. 43 taken along line 44—44.

Process Leading to a State of FIGS. 43 and 44

Next, an insulating film 273 covering the surfaces of the third coil 233 and the fourth coil 234 is deposited thereon. The insulating film 273 is made of $Al_2O_3$ and formed, for example, 0.2 μm in thickness.

Next, partial openings of the insulating film 273 are formed directly over the sixth back gap 226 and the third upper pole film 223, and an upper yoke 224 is formed on the surface of the insulating film 273 so as to connect the sixth back gap 226 and the third upper pole film 223. The upper yoke 224 is formed as a plating pattern of NiFe, CoNiFe or the like by a frame plating method.

Figure 45:
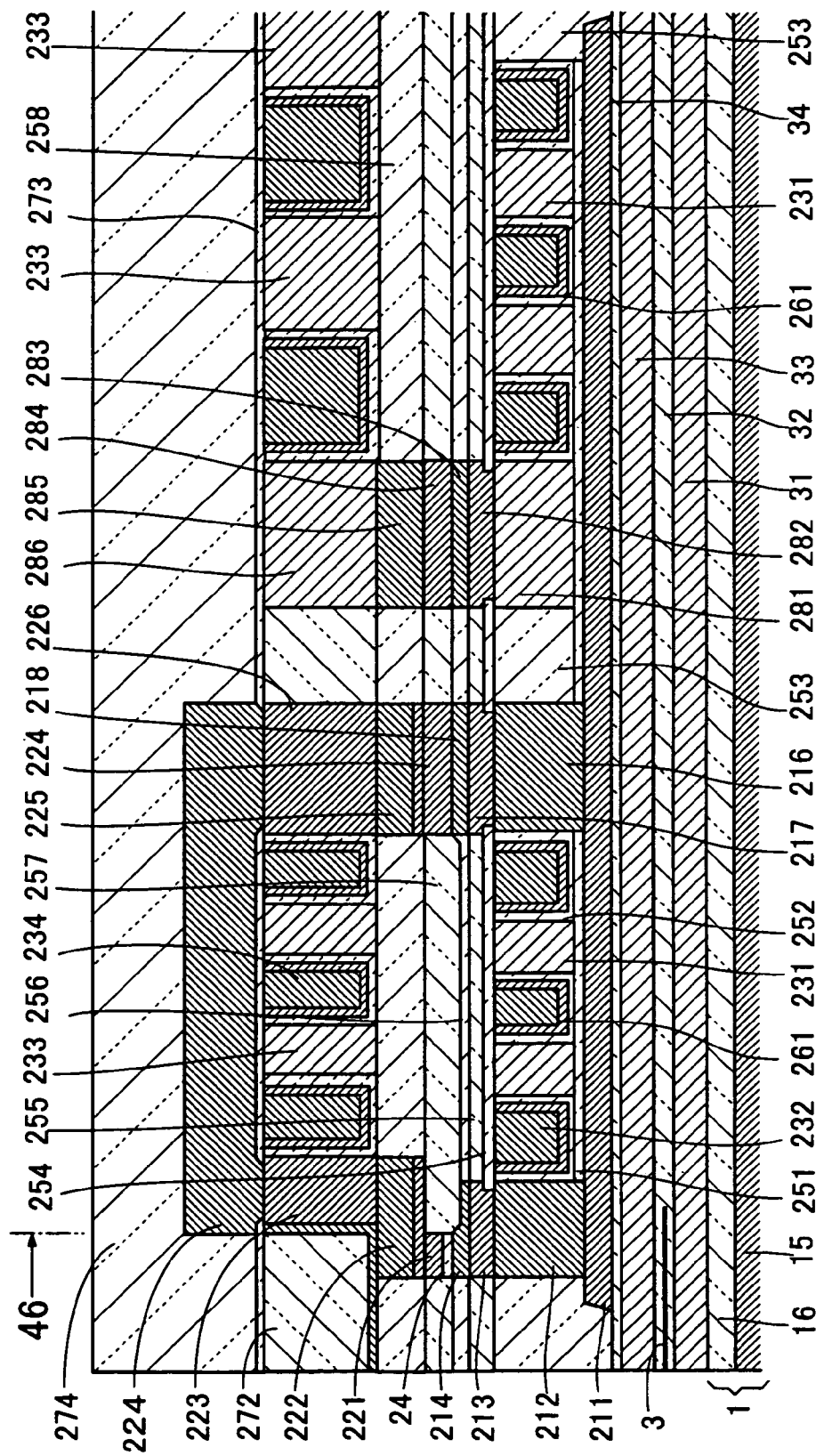
FIG. 45 is a diagram showing a process after the process shown in FIGS. 43 and 44.
Figure 46:
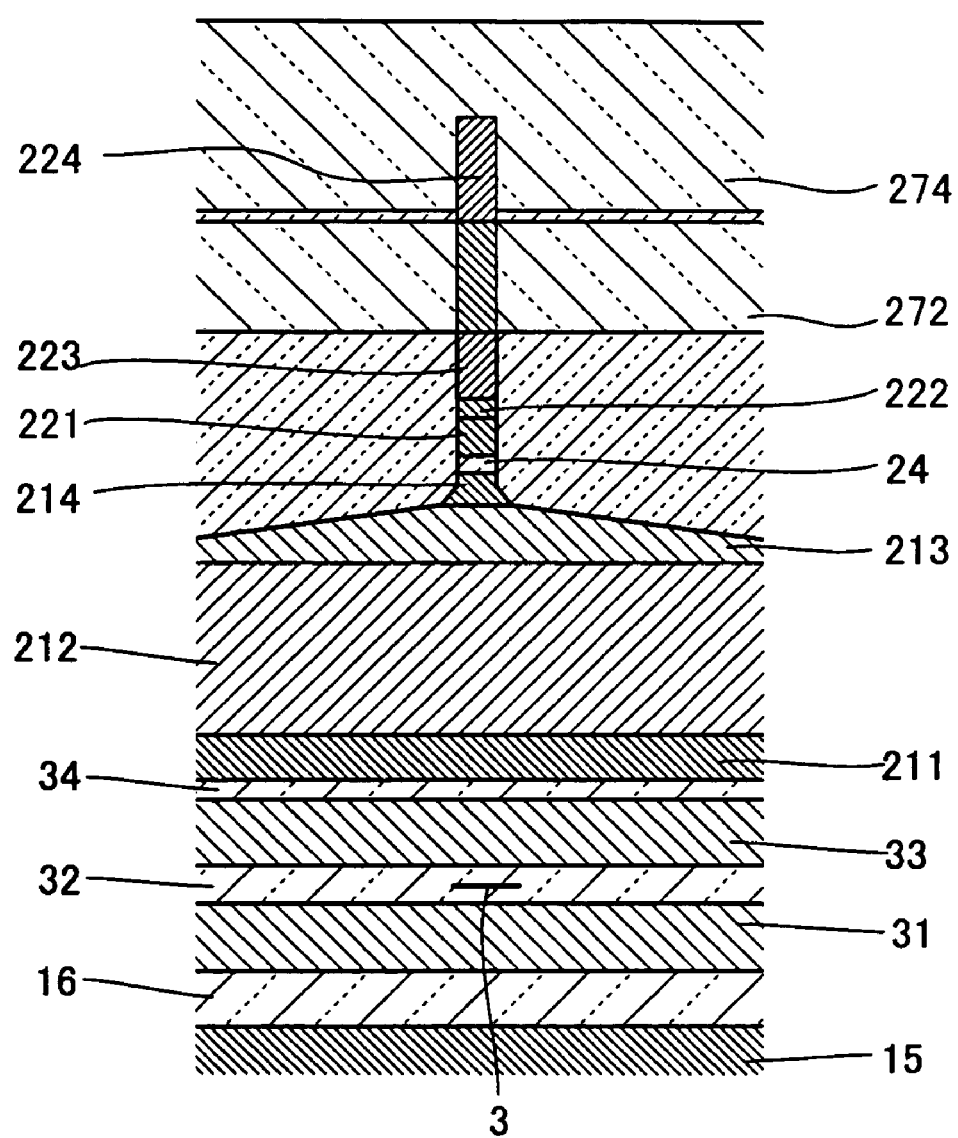
FIG. 46 is a sectional view of FIG. 45 taken along line 46—46.
Figure 47:
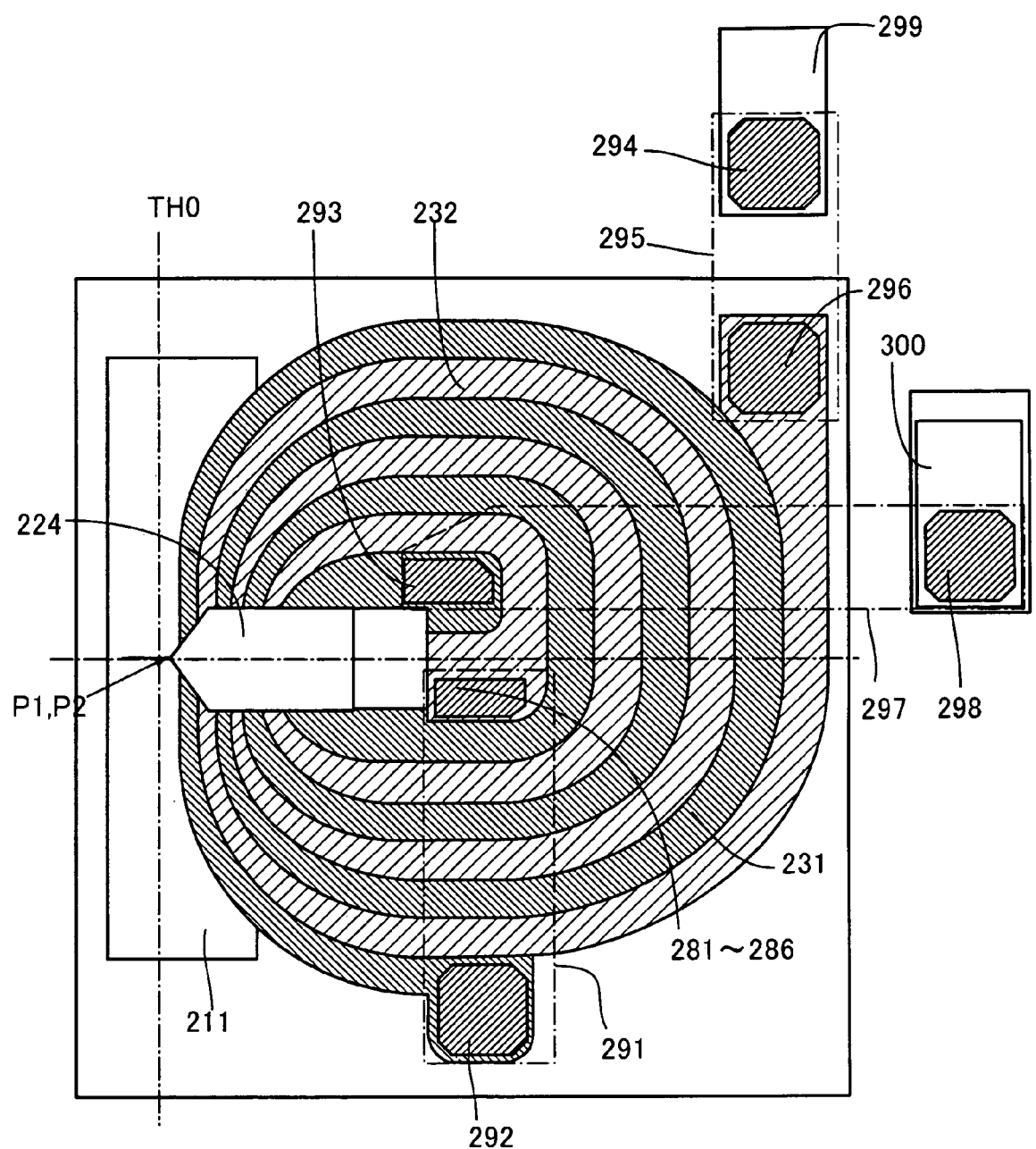
FIG. 47 is a diagram showing a process after the process shown in FIGS. 45 and 46.

Process Leading to States of FIGS. 45, 46 and 47

Next, as shown in FIGS. 45 and 46, a protective film 274 is deposited 20 to 40 μm in thickness thereon. Referring to FIG. 47, there is the throat height zero point TH0 in the intermediate portion of the lower yoke 211, polishing is continued to the throat height zero point, and the polished surface at the point is to be the ABS.

The first and second coils 231, 232 surround the back gap films. The third and fourth coils 233, 234 are disposed above the first and second coils 231, 232, and are connected in series with the first and second coils 231, 232 (see FIGS. 45 and 46).

As shown in FIGS. 45 and 46, the first and second coils 231, 232 are arranged within the height of the second to fourth lower pole films 212 to 214 of the lower pole, and the third and fourth coils 233, 234 are arranged within the height of the first to third upper pole films 221 to 223 of the upper pole, and the gap film 24 is at an intermediate level in the pole length that is defined by the height of the second to fourth lower pole films 212 to 214 and the height of the first to third upper pole films 221 to 223. As a result, it is possible to balance the height of the lower pole disposed in the lower side of the gap film 24 with the height of the upper pole disposed in the upper side of the gap film 24, in spite of a coil-layered structure. Consequently, in case of polishing the ABS, uniformity in polishing quantity is achieved on the lower pole and the upper pole, which are disposed in both sides of the gap film 24. As a result, it is possible to avoid the collision between a magnetic head and a recording medium, which is caused by nonuniformity in polishing quantity. Consequently, it is possible to meet the demand for a low floating height of a slider, which is indispensable for high-density recording.

(2) Embodiment 2

Embodiment 2 is a method for manufacturing a thin film magnetic head shown in FIGS. 6 and 7, and is illustrated in FIGS. 48 to 79. It is notified in advance that processes illustrated in FIGS. 48 to 79 are also performed on a wafer.

Figure 48:
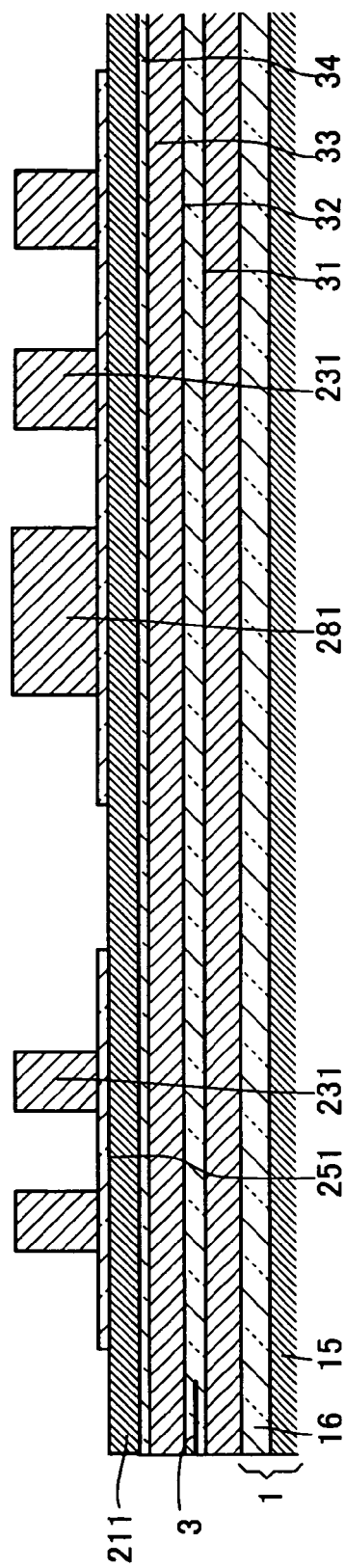
FIG. 48 is a diagram showing a process after the process shown in FIGS. 46 and 47.
Figure 49:
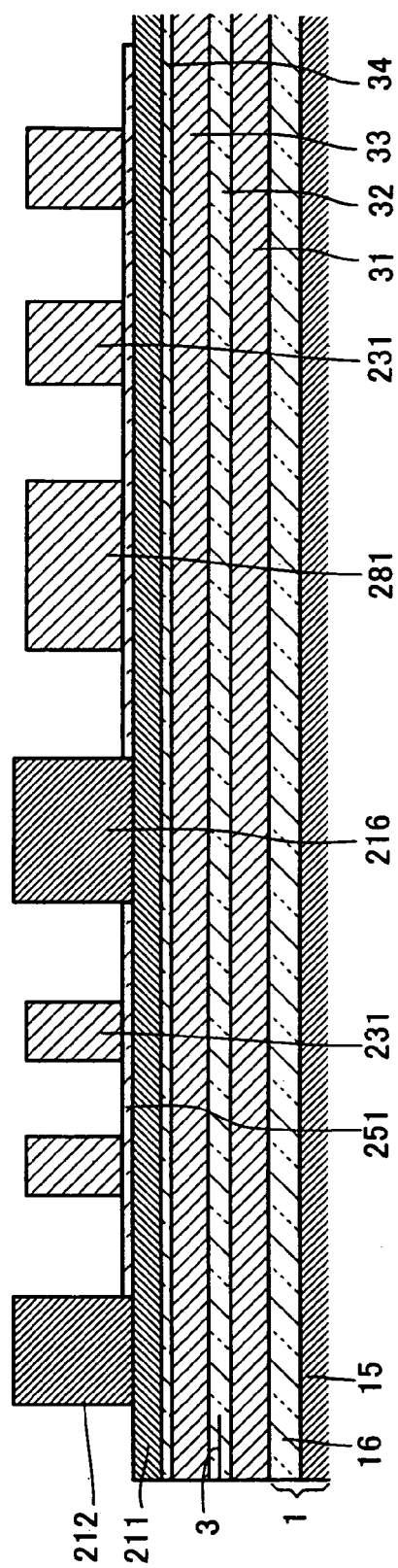
FIG. 49 is a diagram showing a process of manufacturing a thin film magnetic head having the electromagnetic converter portion shown in FIGS. 6 and 7.
Figure 50:
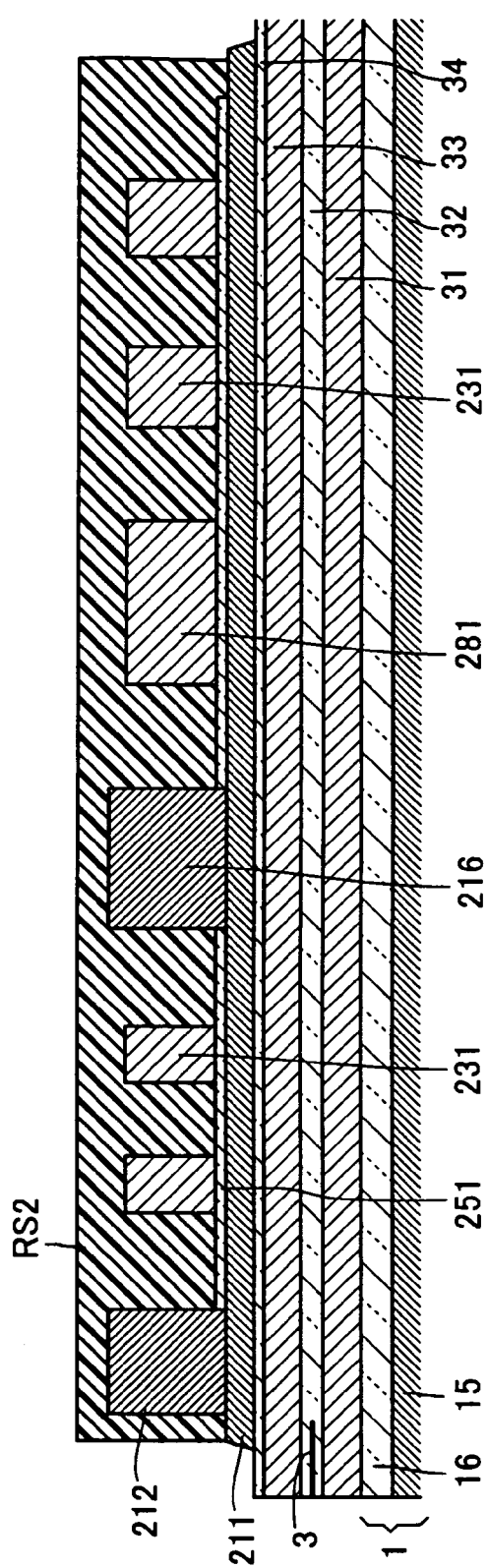
FIG. 50 is a diagram showing a process after the process shown in FIG. 49.

Processes Leading to States of FIGS. 48 to 50

The processes leading to states of FIGS. 48 to 50 are substantially the same as the processes shown in FIGS. 8 to 10 in embodiment 1, and detailed description is omitted.

Figure 51:
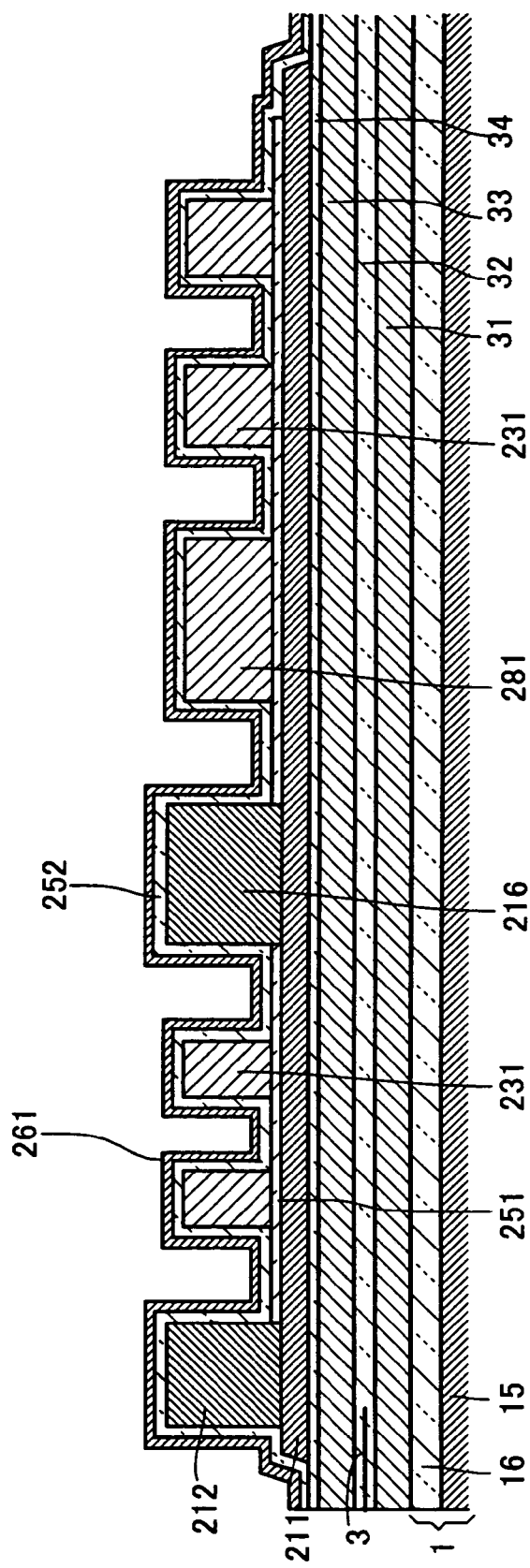
FIG. 51 is a diagram showing a process after the process shown in FIG. 50.

Process Leading to a State of FIG. 51

A photolithography process is applied onto a photoresist film RS2 in FIG. 50, and then IBE is performed so as to pattern a lower yoke 211 into a prescribed pattern. After that, the photoresist film RS2 is removed.

Next, an insulating film 252 is deposited on the surfaces and side surfaces of an insulating film 251, a first coil 231, a second lower pole film 212, a first back gap film 216 and a first connecting conductor film 281. The insulating film 252 is, specifically, formed about 0.1 to 0.15 μm in thickness by means of $Al_2O_3$-CVD with high-purity alumina.

Next, a seed film 261 is deposited 50 to 80 nm in thickness on the surface of the insulating film 252 by means of sputtering or Cu-CVD.

Figure 52:
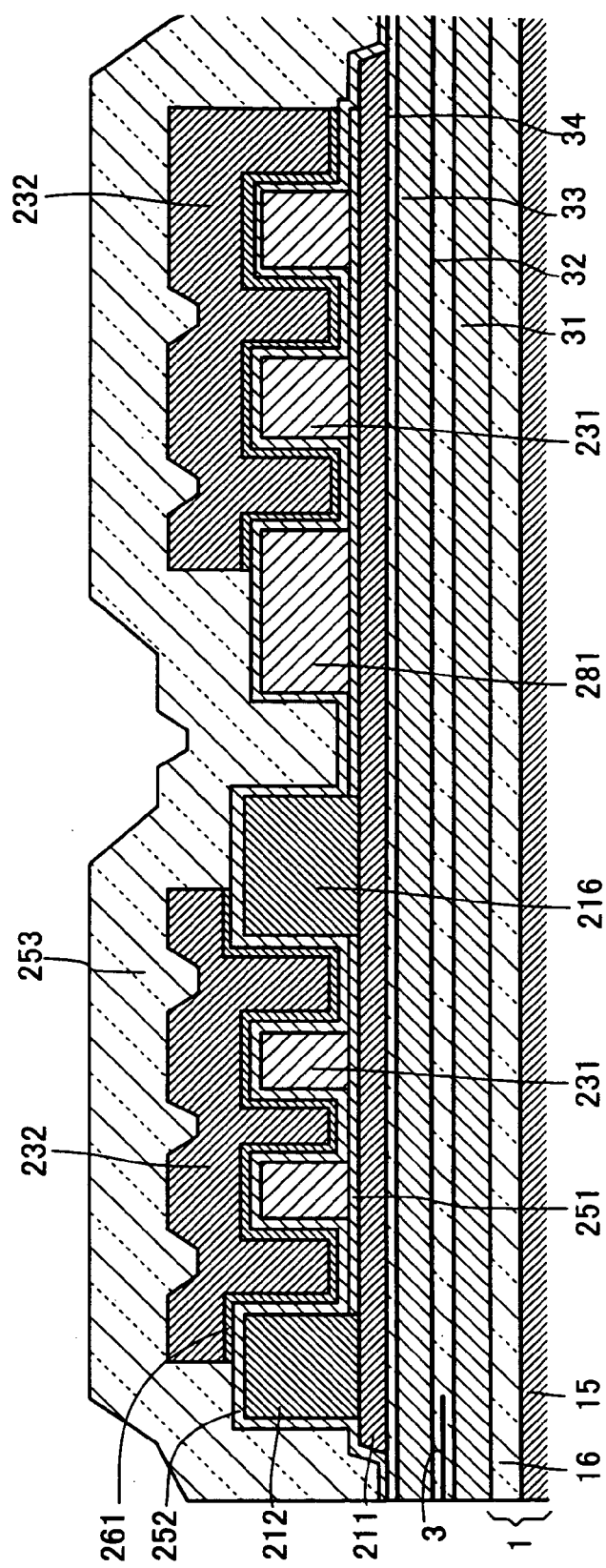
FIG. 52 is a diagram showing a process after the process shown in FIG. 51.

Process Leading to a State of FIG. 52

Next, as shown in FIG. 52, a plating film 232 to be a second coil is formed, for example, 3 to 4 μm in thickness on the seed film 261 by means of a frame plating method. The plating film 232 comprises Cu as its main constituent and is formed by a selective plating method. Parts of the seed film not covered with the plating film 232, are removed by means of wet etching with dilute hydrochloric acid, dilute sulfuric acid, copper sulfate or the like, or dry etching such as ion milling.

The seed film 261, which is formed by Cu-CVD, is a Cu-CVD film with excellent step coverage, which is deposited accurately according to the projections and indentations of the first coil 231. Consequently, even if the space between the coil turns of the first coil 231 is a long and narrow space, the plating film 232 to be a second coil 232 is formed in the space without making a key hole.

Since a deposition gas required in Cu-CVD is expensive and Cu-CVD has excellent step coverage, Cu-CVD is, in the present invention, used only for forming the seed film 261 in an uniform thickness in the long and narrow space and a necessary thickness is ensured by means of plating.

Hereupon, an edge of the second lower pole film 212 and an edge of the second coil 232 are located close to each other with the insulating film 252 of $Al_2O_3$-CVD between them and so, they are close to the ABS. Consequently, the loss of magnetic flux is reduced and so, a write head with excellent over-write characteristic is obtained.

After that, an insulating film 253 of $Al_2O_3$ is formed so as to cover the plating film 232 and the areas not covered with the plating film 232. The insulating film 253 is formed as a sputtering film of 4 to 6 μm in thickness.

Figure 53:
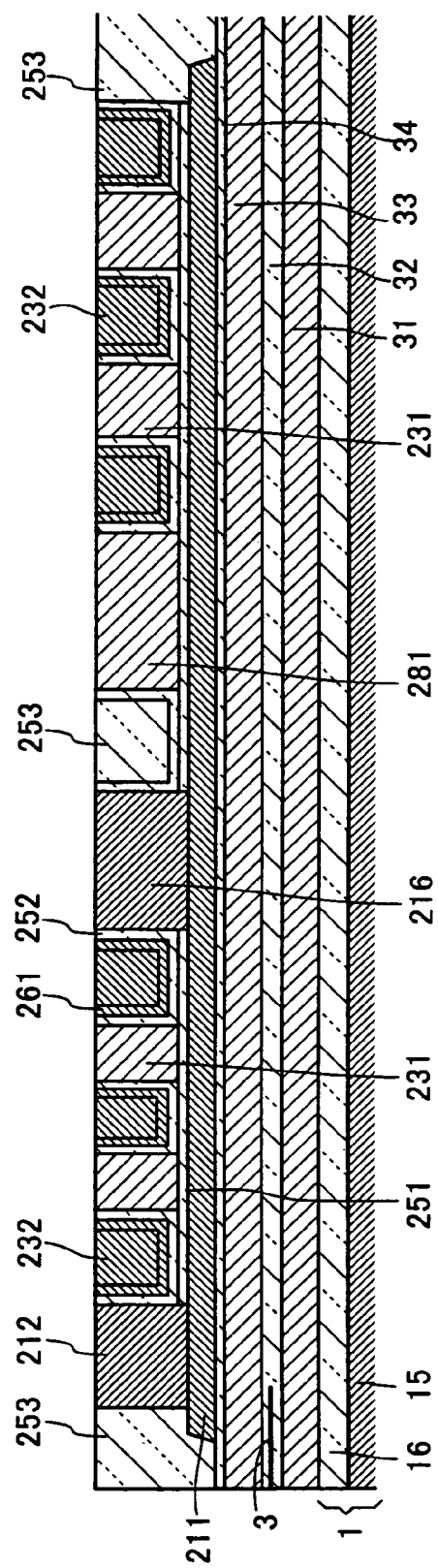
FIG. 53 is a diagram showing a process after the process shown in FIG. 52.

Process Leading to a State of FIG. 53

In a process leading from the state of FIG. 52 to a state of FIG. 53, the insulating film 253 and the plating film 232 are polished and flattened by CMP. Consequently, the second coil 232 in the flat spiral pattern is formed, insulated from the first coil 231 by the insulating film 252. In the CMP, the surfaces of the second lower pole film 212, the first connecting conductor film 216 and the insulating film 252 are also polished to be in the same plane as the surface of the first and second coils 231, 232.

Figure 54:
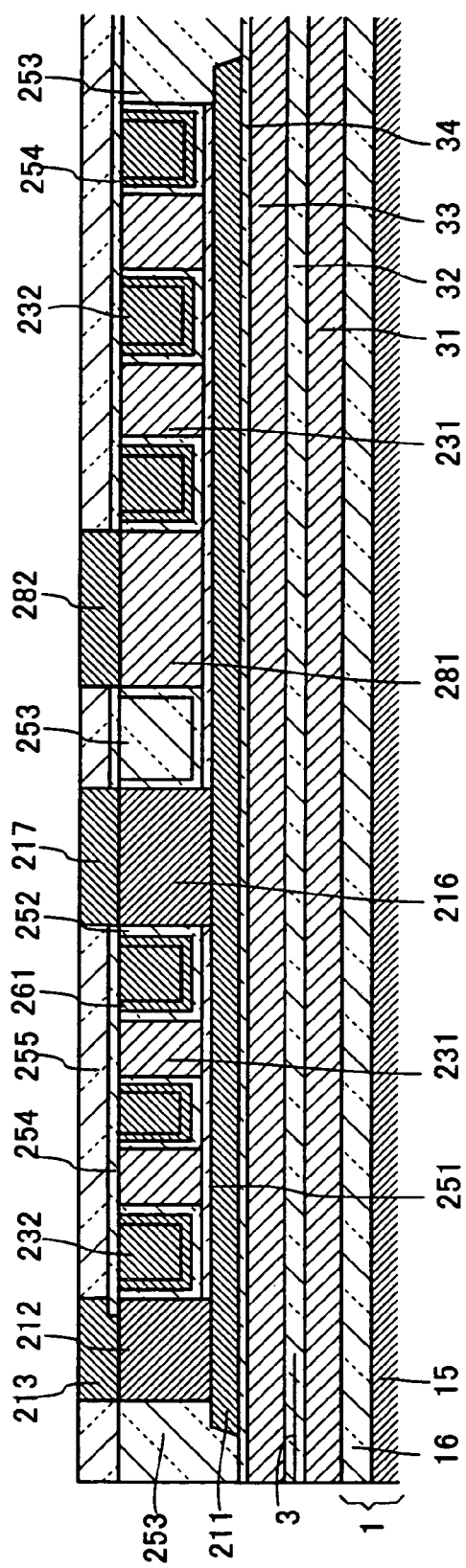
FIG. 54 is a diagram showing a process after the process shown in FIG. 53.

Process Leading to a State of FIG. 54

In a process leading from the state of FIG. 53 to a state of FIG. 54, an insulating film 254 covering the surface of the first and second coils 231, 232 is deposited thereon. The insulating film 254 is made of $Al_2O_3$ and formed, for example, 0.2 to 0.3 μm in thickness.

Next, RIE or ion milling is applied onto the insulating film 254 to form openings in the insulating film 254, which are for a third lower pole film 213, a second back gap film 217 and a second connecting conductor film 282. After that, plating is performed to form the third lower pole film 213, the second back gap film 217 and the second connecting conductor film 282. Each of the third lower pole film 213, the second back gap film 217 and the second connecting conductor film 282 is a plating film of CoFe or CoNiFe (2.1 to 2.3 T) and has a thickness of, for example, 1 to 2 μm.

Next, an insulating film 255 of $Al_2O_3$ is deposited, for example, 1 to 2 μm thick on the surface where the third lower pole film 213 and the second back gap film 217 have been formed. After that, the surfaces of the insulating film 255, the third lower pole film 213 and the second back gap film 217 are polished by CMP.

Figure 55:
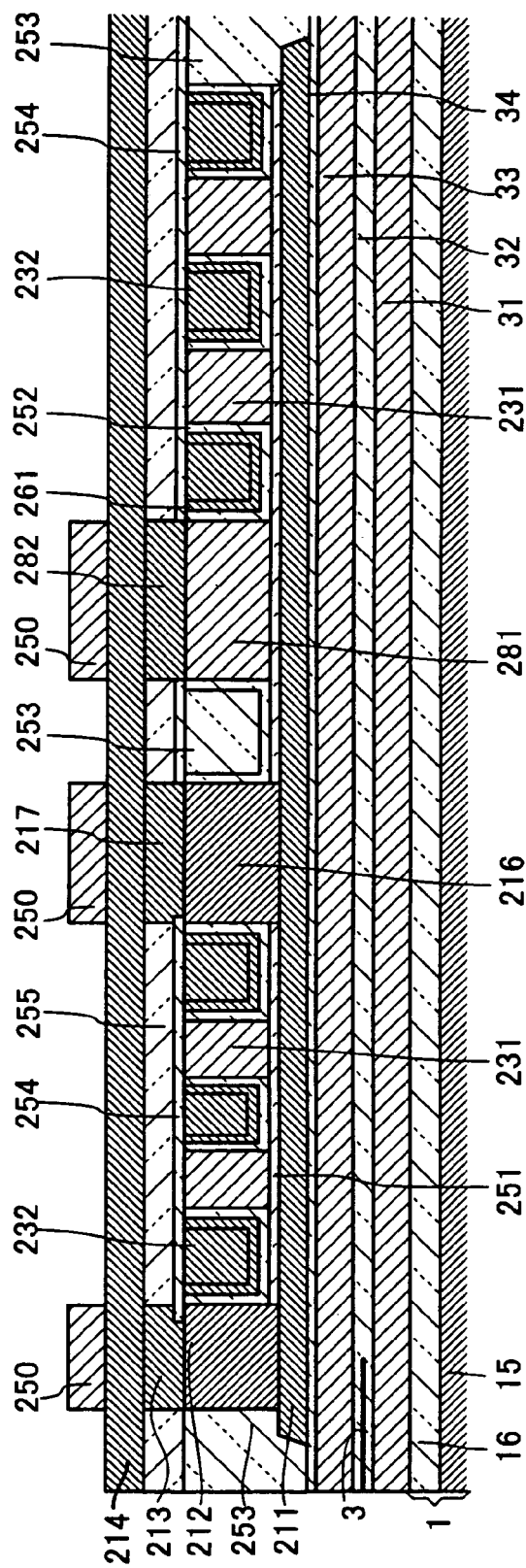
FIG. 55 is a diagram showing a process after the process shown in FIG. 54.
Figure 56:
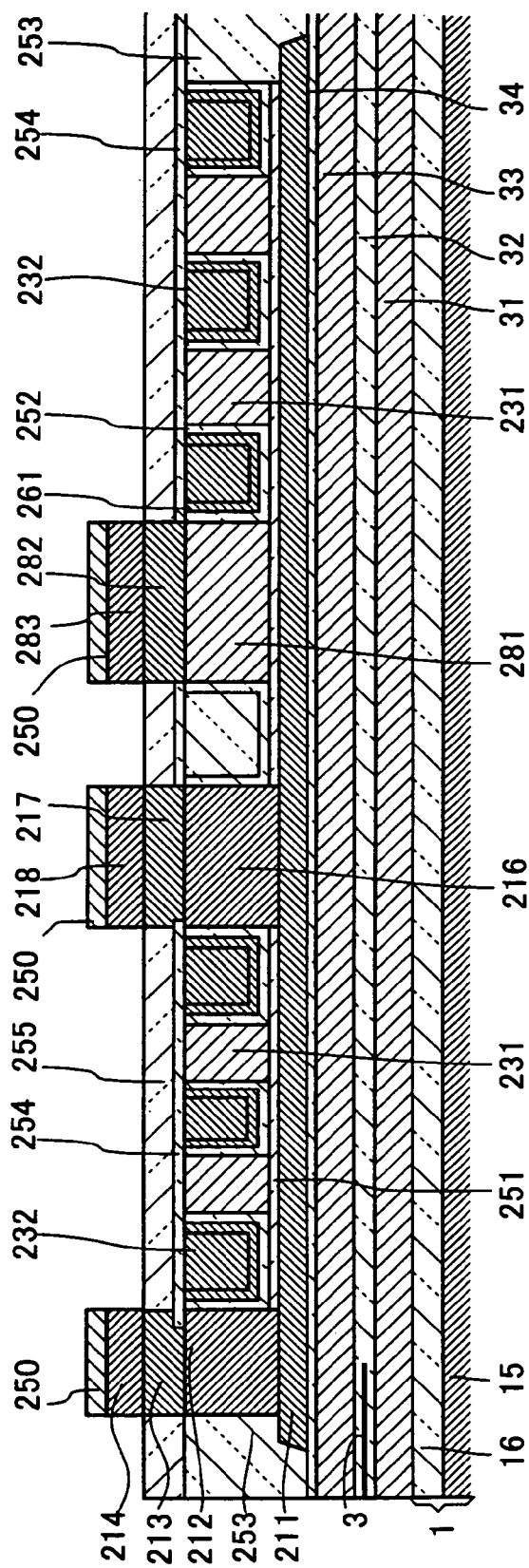
FIG. 56 is a diagram showing a process after the process shown in FIG. 55.

Process Leading to States of FIGS. 55 and 56

In a process leading from the state of FIG. 54 to a state of FIG. 55, a magnetic film 214 to be a fourth lower pole film is formed, for example, 0.5 to 1.0 μm in thickness on the polished surfaces of the insulating film 255, the third lower pole film 213 and the second back gap film 217. The magnetic film 214 can be made of a plating film of CoFeN (2.4 T) or a sputtering film of FeAlN, FeN, FeCo or FeZrN.

After that, a mask 250, which is a pattern-plating film of NiFe or CoNiFe, is formed on the third lower pole film 213 and the second back gap film 217. And the magnetic film 214 is patterned by means of IBE with the mask 250. Consequently, a fourth lower pole film 214 and a third back gap film 218 are formed as shown in FIG. 56.

For patterning the magnetic film 214 by the mask 250 made of a pattern-plating film, ion beams are used and the irradiation angles are 0 degree and 75 degrees. This makes it possible to selectively pattern the fourth lower pole film 214, which is made of a HiBs material.

Other methods may be used to pattern the magnetic film 214. For example, RIE is applied onto the magnetic film 214 at a high temperature of 50 to 300 C under a halogen-based gas atmosphere such as $Cl_2$ or $BCl_3+Cl_2$, so that the magnetic film 214 is etched to 80% of its film thickness. The temperature in the RIE process is preferably 50 C or higher, more preferably 200 to 250 C. This temperature range provides a high-accuracy pattern.

And, an etching profile can be accurately controlled by introducing $O_2$ into a $Cl_2$-based gas. Specifically, mixing $O_2$ with a $BCl_3+Cl_2$ gas makes it possible to completely remove a deposit of a residual boron gas and so, extremely accurate control over the etching profile is achieved.

Moreover, the use of an etching gas obtained by mixing a $CO_2$ gas with a $Cl_2$ gas, a $BCl_3+Cl_2$ gas, an $O_2$-mixed $Cl_2$ gas, or $O_2$-mixed $BCl_3+Cl_2$ gas, increases the etching rate of RIE, and the selection ratio with a mask material is improved by the extent as large as 30 to 50%.

After a part of the magnetic film 214 (about 80% part) is etched away as described above, additional IBE is applied onto the remaining part of the magnetic film 214. This IBE is applied at an irradiation angle of, for example, 40 to 70 degrees.

As described above, by patterning the magnetic film 214 with the mask 250 made of a pattern-plating film of NiFe or CoNiFe, the fourth lower pole film 214 with high accuracy is formed. Consequently, a throat height, which is determined by the fourth lower pole film 214, is controlled with high accuracy. For example, the throat height can be controlled to be 0.1 to 0.5 µm or 0.2 to 0.7 µm with grate freedom. Consequently, a thin film magnetic head with a quick rise of a write current and excellent over-write characteristic is obtained.

Moreover, since the throat height is determined by the fourth pole piece 214 of a thick HiBs material, write magnetic flux for giving a magnetic record to a medium can be concentrated at a pole end as reducing halfway leakage magnetic flux. Consequently, problems such as side erase or side write can be solved.

Figure 57:
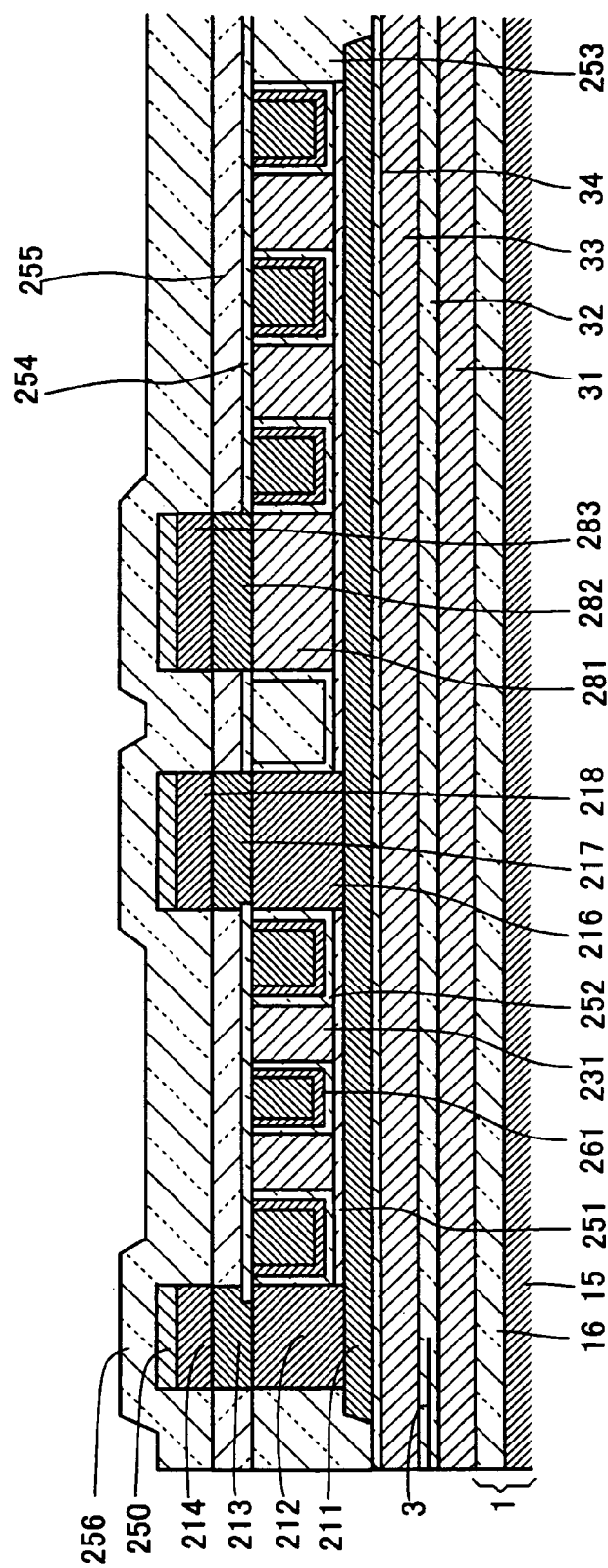
FIG. 57 is a diagram showing a process after the process shown in FIG. 56.
Figure 58:
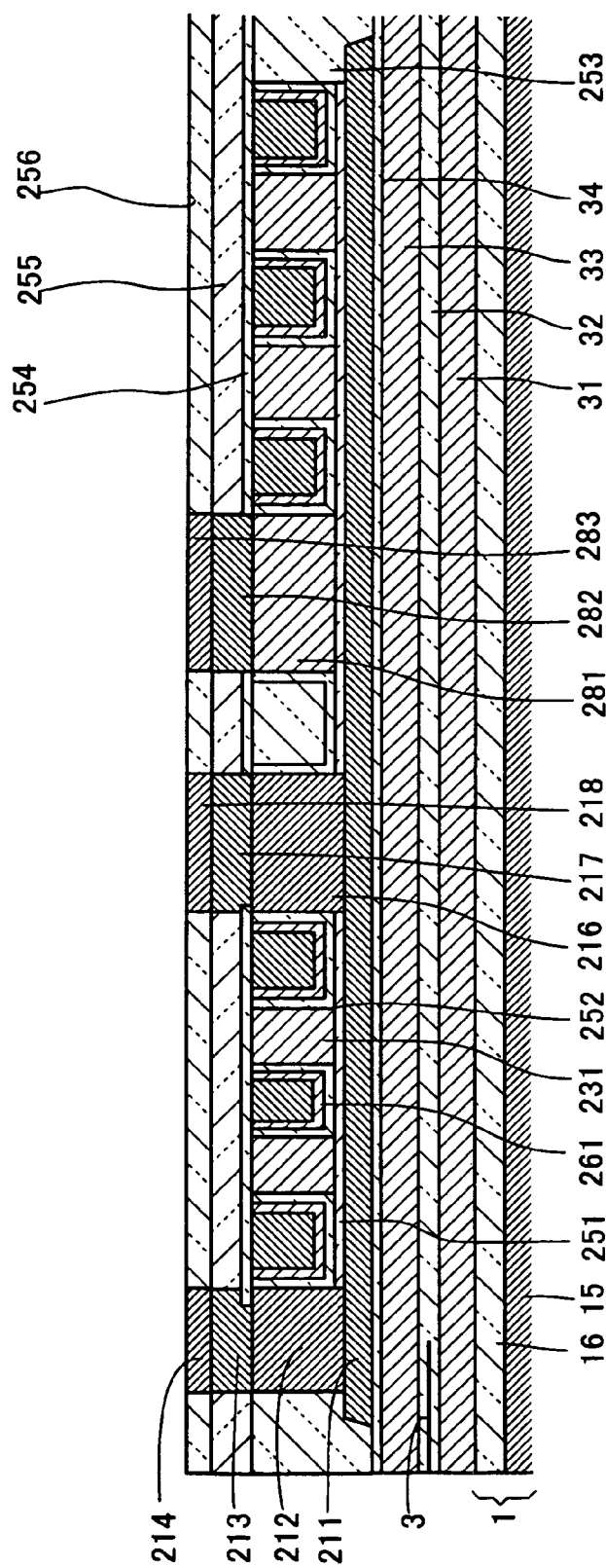
FIG. 58 is a diagram showing a process after the process shown in FIG. 57.

Process Leading to States of FIGS. 57 and 58

In a process leading from the state of FIG. 56 to a state of FIG. 57, an insulating film 256 of $Al_2O_3$ is deposited by means of sputtering or the like. After that, the surfaces of the insulating film 256, the fourth lower pole film 214, the third back gap film 218 and the third connecting conductor film 283 are polished and flattened by CMP as shown in FIG. 58.

Figure 59:
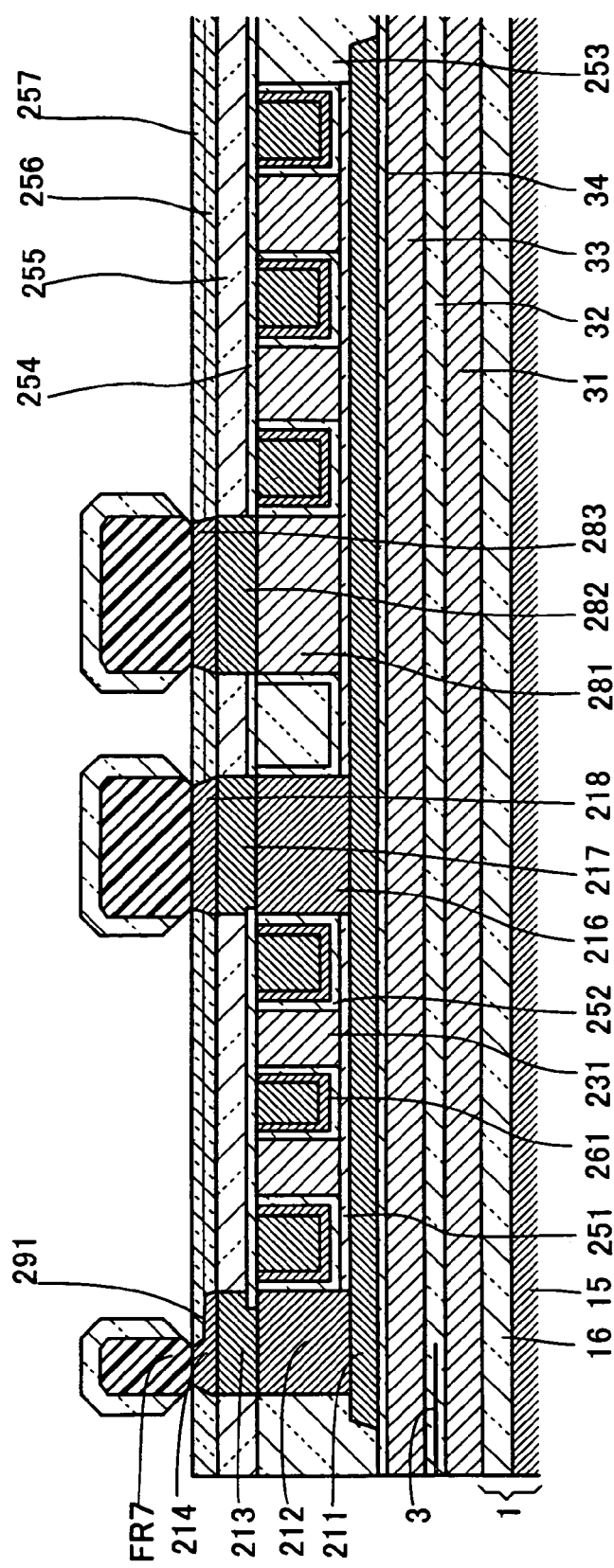
FIG. 59 is a diagram showing a process after the process shown in FIG. 58.

Process Leading to a State of FIG. 59

Next, a resist mask FR7 is formed on the fourth lower pole film 214, the third back gap film 218 and the third connecting conductor film 283. The resist mask FR7 on the fourth lower pole film 214 is shaped so as not to cover the rear part of the fourth lower pole film 214.

Next, IBE with the resist mask FR7 is performed, so that a part of the fourth lower pole film 214 of CoFeN is etched to be, for example, 0.2 to 0.3 µm in height, in which an indentation 291 is formed. Next, sputtering is performed so that an insulating film 257 of $Al_2O_3$ is deposited and self-aligned thereon to be 0.2 to 0.3 µm in thickness.

Figure 60:
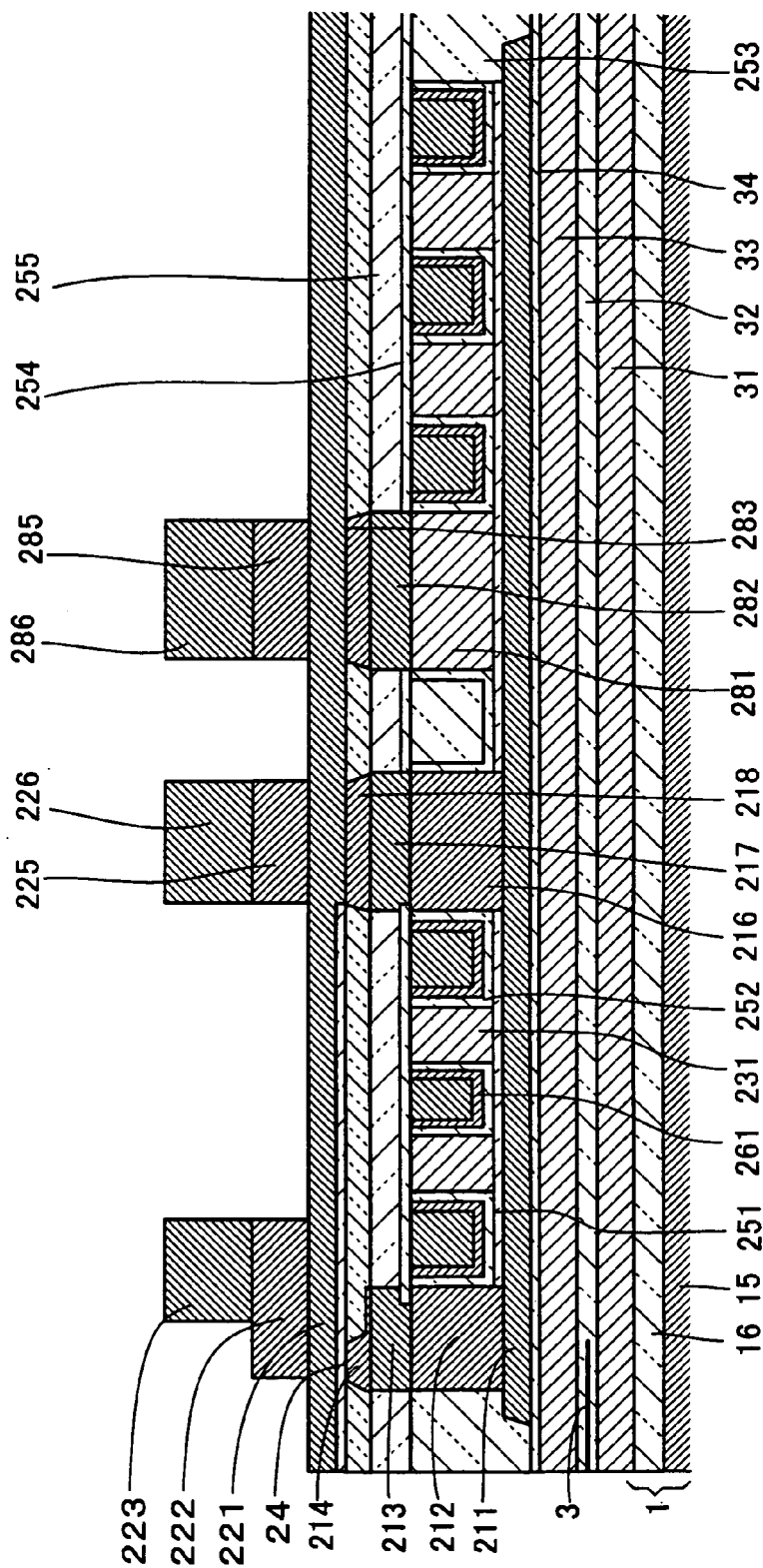
FIG. 60 is a diagram showing a process after the process shown in FIG. 59.
Figure 61:
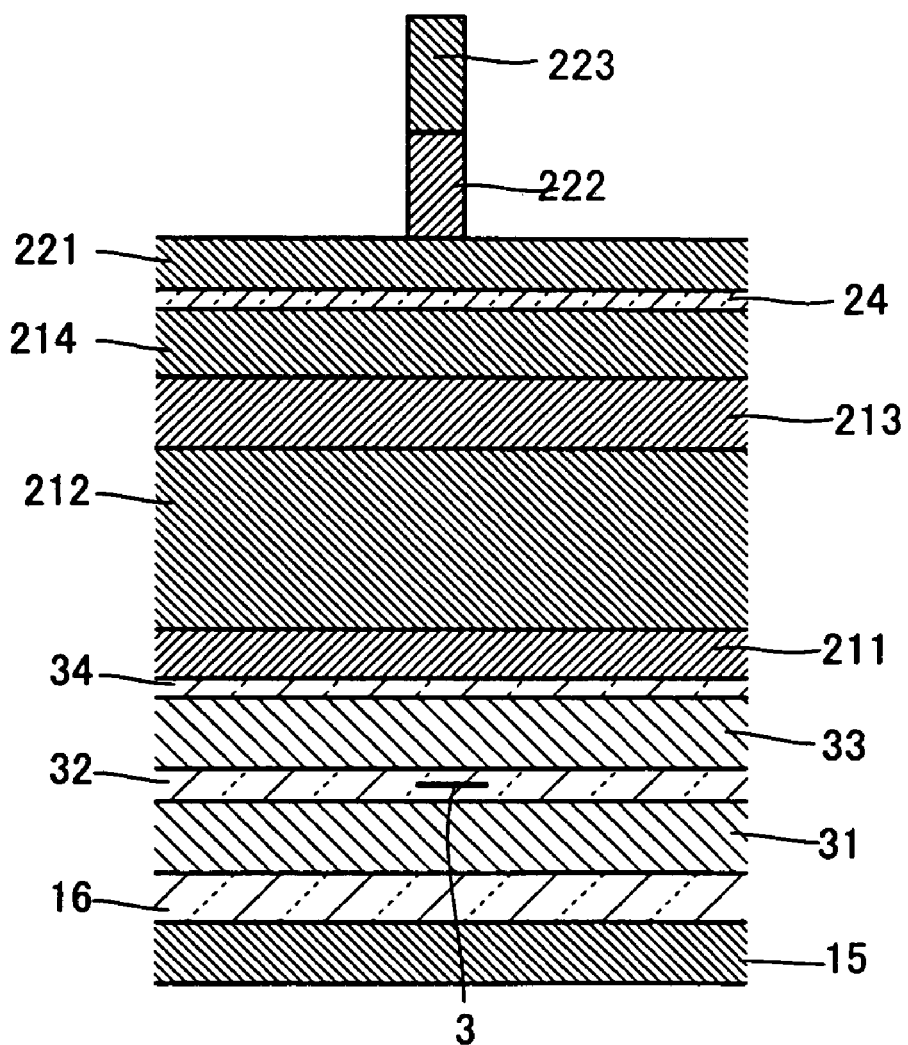
FIG. 61 is a diagram showing a process after the process shown in FIG. 60.

Process Leading to a State of FIGS. 60 and 61

Next, the resist mask FR7 is lifted off, and then CMP with a sight degree is performed on the surface so as to flatten the fourth lower pole film 214 and the insulating film 257. After that, a gap film 24 is formed 0.08 to 0.1 µm in thickness. The gap film 24 is made of a non-magnetic material such as $Al_2O_3$, Ru, NiCu or Ta.

Next, a sputtering film of a HiBs material such as FeAlN, FeN, FeCo, CoFeN or FeZrN, is formed 0.1 to 0.5 µm in thickness, which is to be a first upper pole film 221.

Next, a second upper pole film 222, a third upper pole film 223, a fifth back gap film 225, a sixth back gap film 226, a fifth connecting conductor film 285 and a sixth connecting conductor film 286 are formed on the first upper pole film 221 by means of a photolithography process and a frame plating method. The thickness and composition of each of them has been already described. The second upper pole film 222 and the third upper pole film 223 are made narrow in width so as to have a reduced track width with the pattern accuracy of a photolithography process (see FIG. 61).

Figure 62:
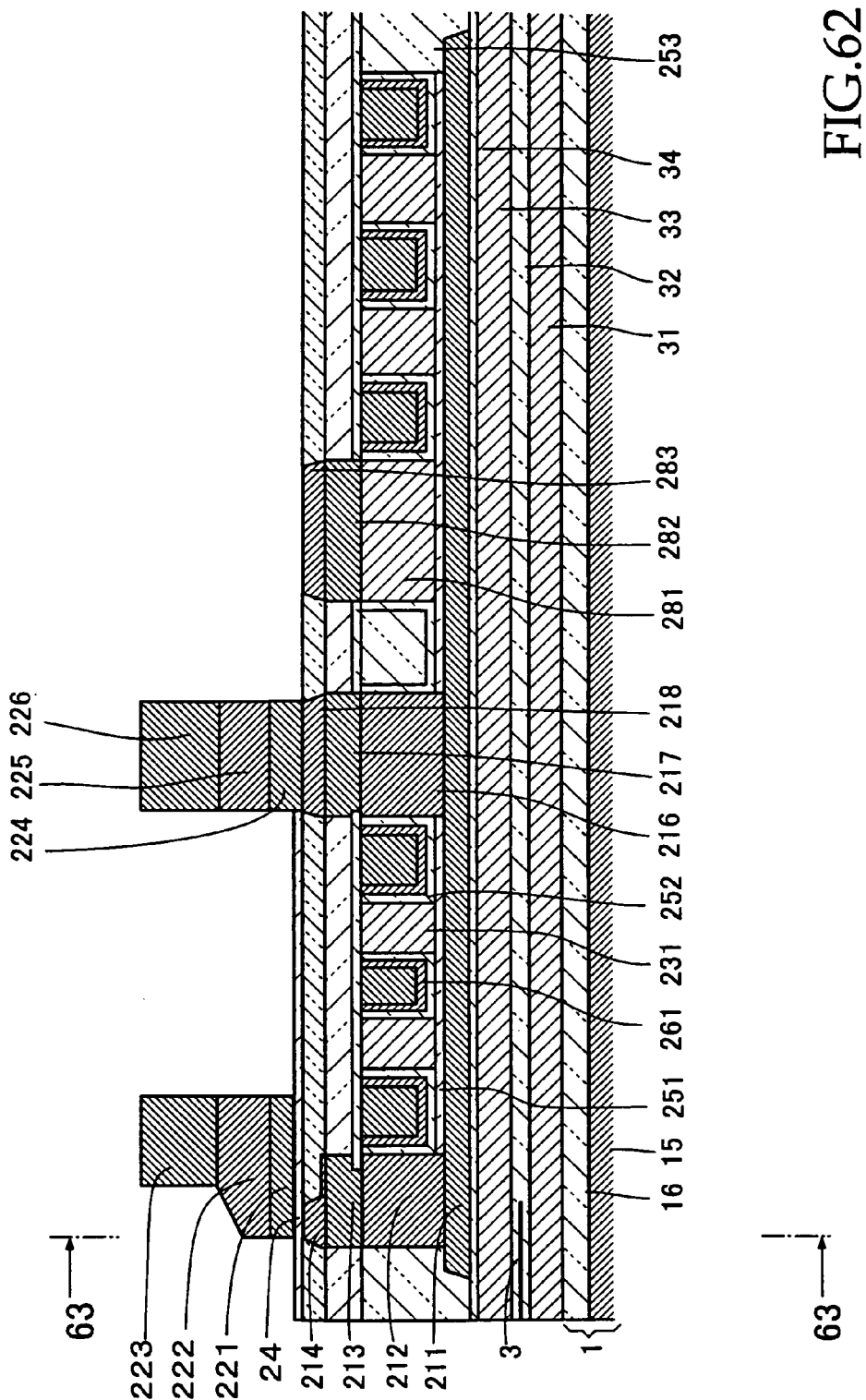
FIG. 62 is a diagram showing a process after the process shown in FIG. 61.
Figure 63:
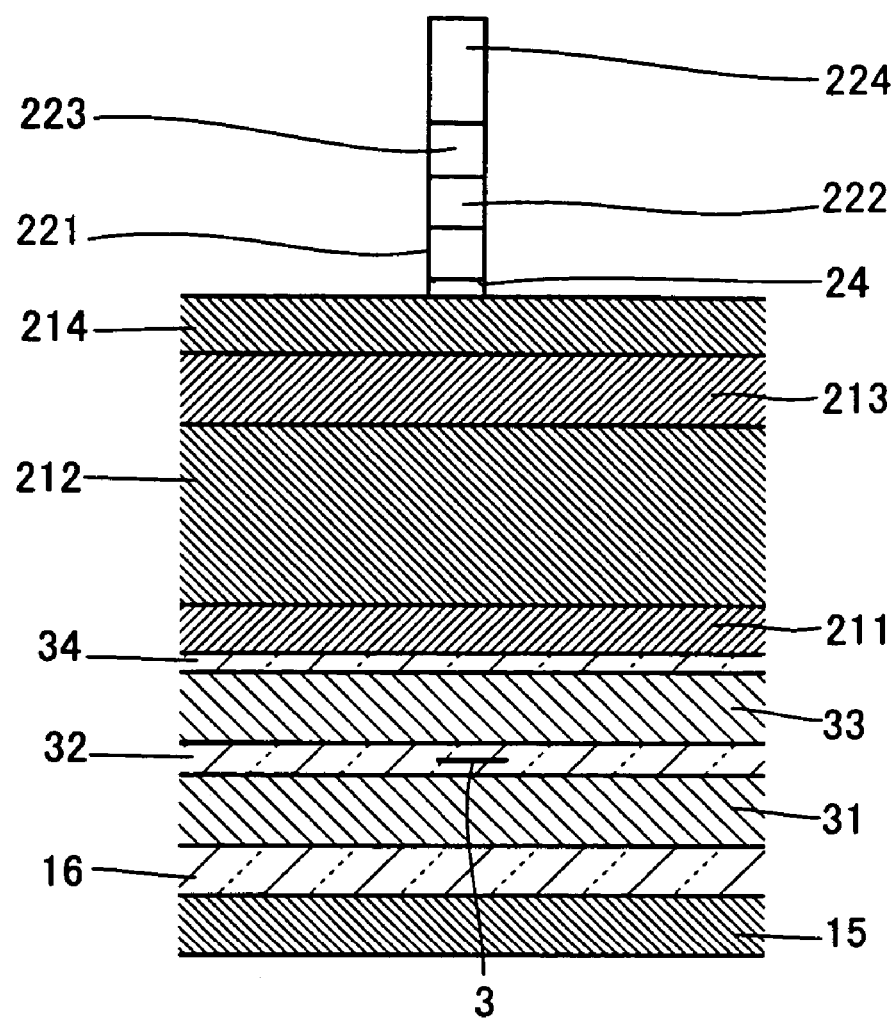
FIG. 63 is a sectional view of FIG. 62 taken along line 63—63.

Process Leading to a State of FIGS. 62 and 63

Next, the first upper pole film 221 is etched by using the second upper pole film 222, the third upper pole film 223, the fifth back gap film 225, the sixth back gap film 226, the fifth connecting conductor film 285 and the sixth connecting conductor film 286 as a mask. The etching is continued to expose the gap film 24. The etching is IBE or RIE. By this etching, the second upper pole film 222, the third upper pole film 223, the fifth back gap film 225, the sixth back gap film 226, the fifth connecting conductor film 285 and the sixth connecting conductor film 286 are patterned into prescribed shapes as shown in FIGS. 62 and 63. After that, the fifth connecting conductor film 285 and the sixth connecting conductor film 286 are selectively etched.

Figure 64:
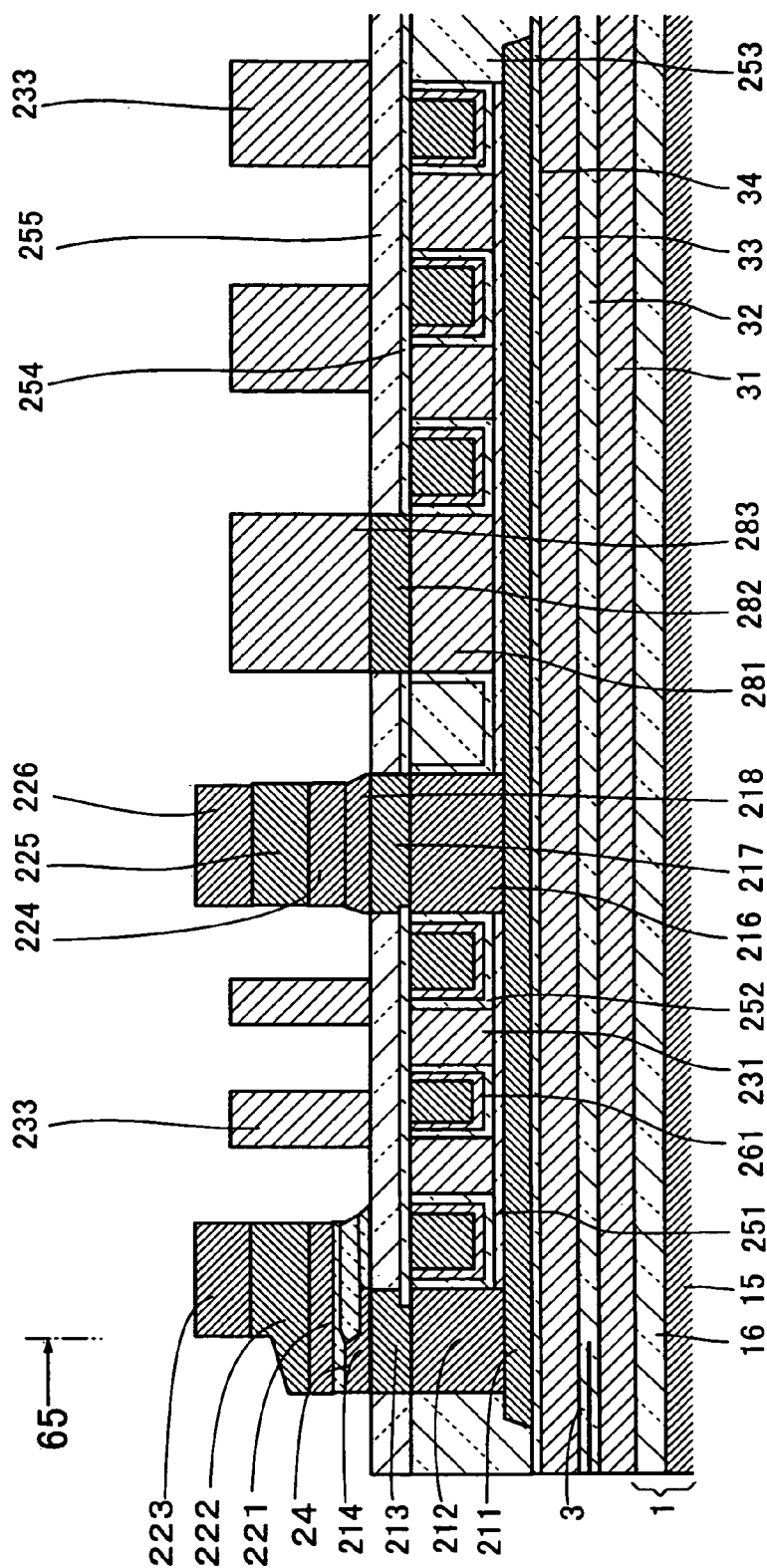
FIG. 64 is a diagram showing a process after the process shown in FIGS. 62 and 63.
Figure 65:
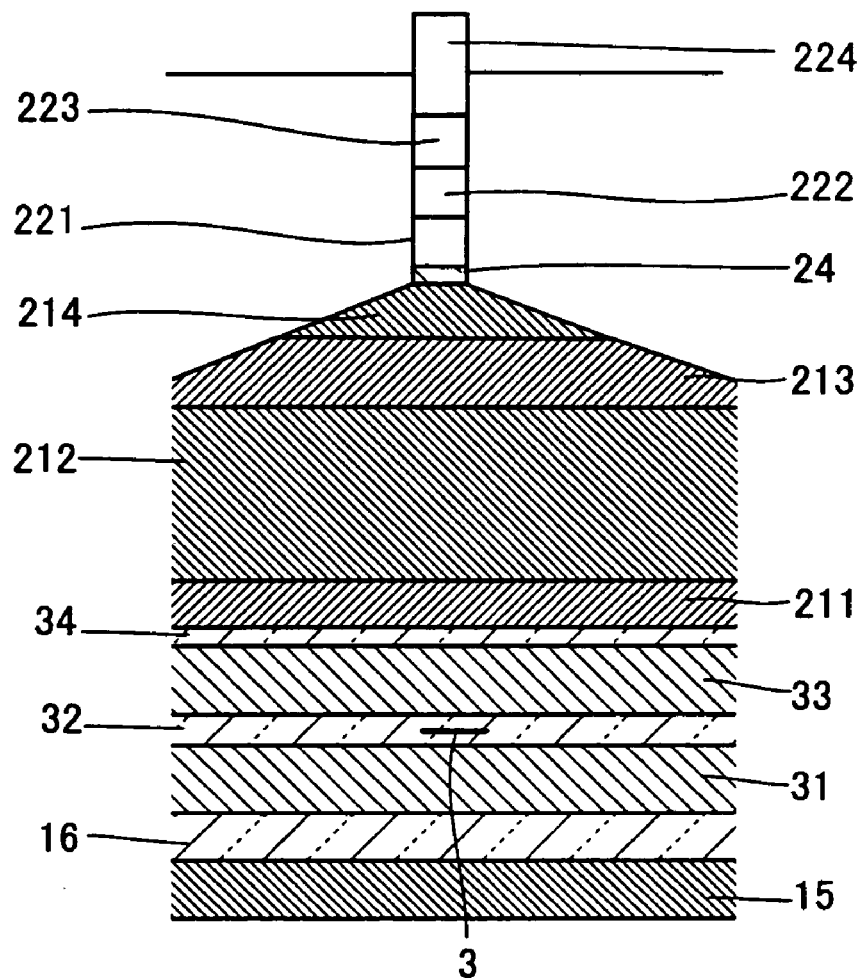
FIG. 65 is a sectional view of FIG. 64 taken along line 65—65.

Process Leading to a State of FIGS. 64 and 65

Next, an etching process is performed using the second upper pole film 222, the third upper pole film 223, the fifth back gap film 225, the sixth back gap film 226, the fifth connecting conductor film 285 and the sixth connecting conductor film 286 as a mask, the etching process is continued to expose the insulating film 255, and a flattening process is performed. After that, a third coil 233 is formed on the exposed surface of the insulating film 255. In this process, the third connecting conductor film 283 is formed again.

Figure 66:
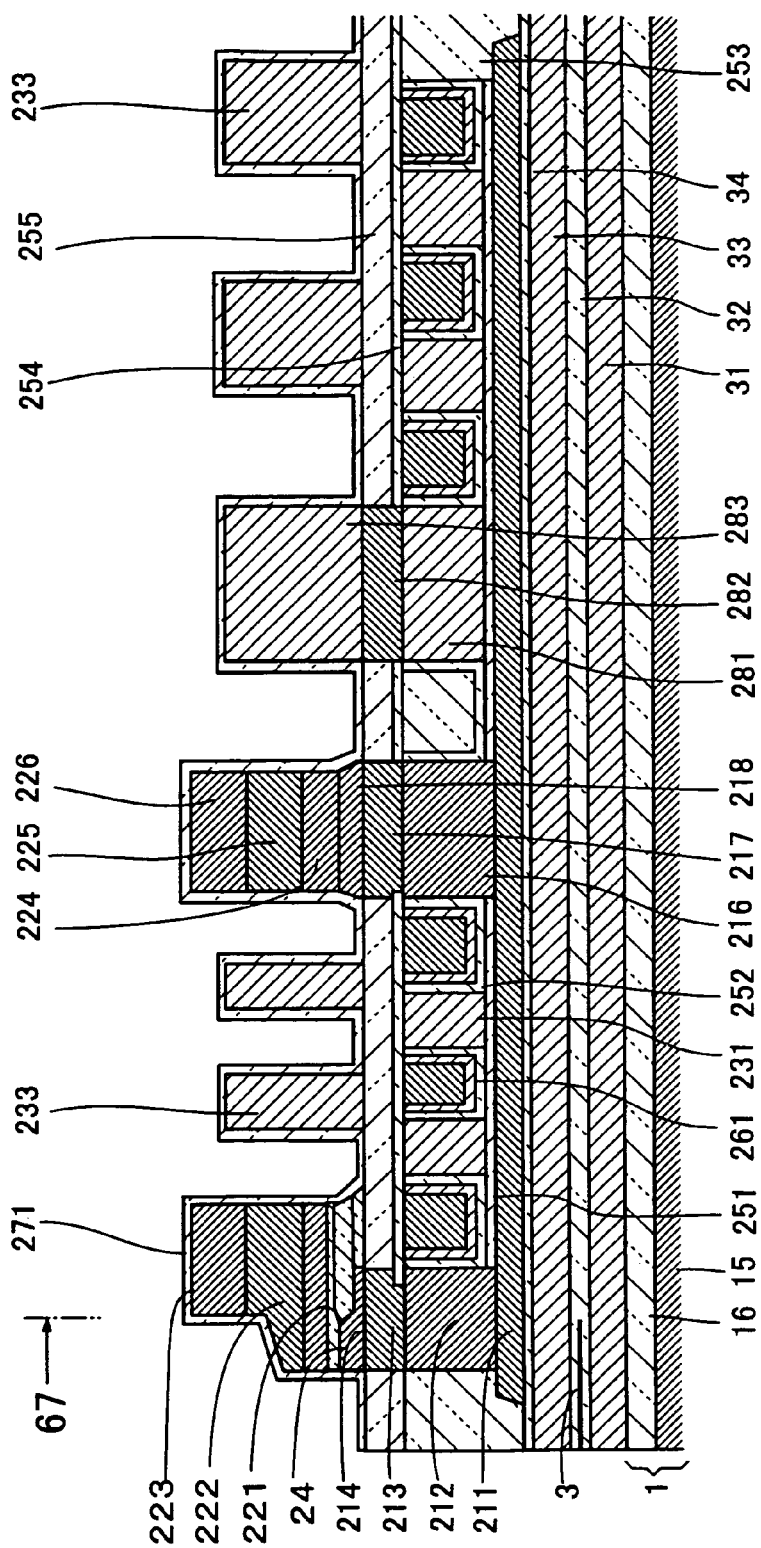
FIG. 66 is a diagram showing a process after the process shown in FIGS. 64 and 65.
Figure 67:
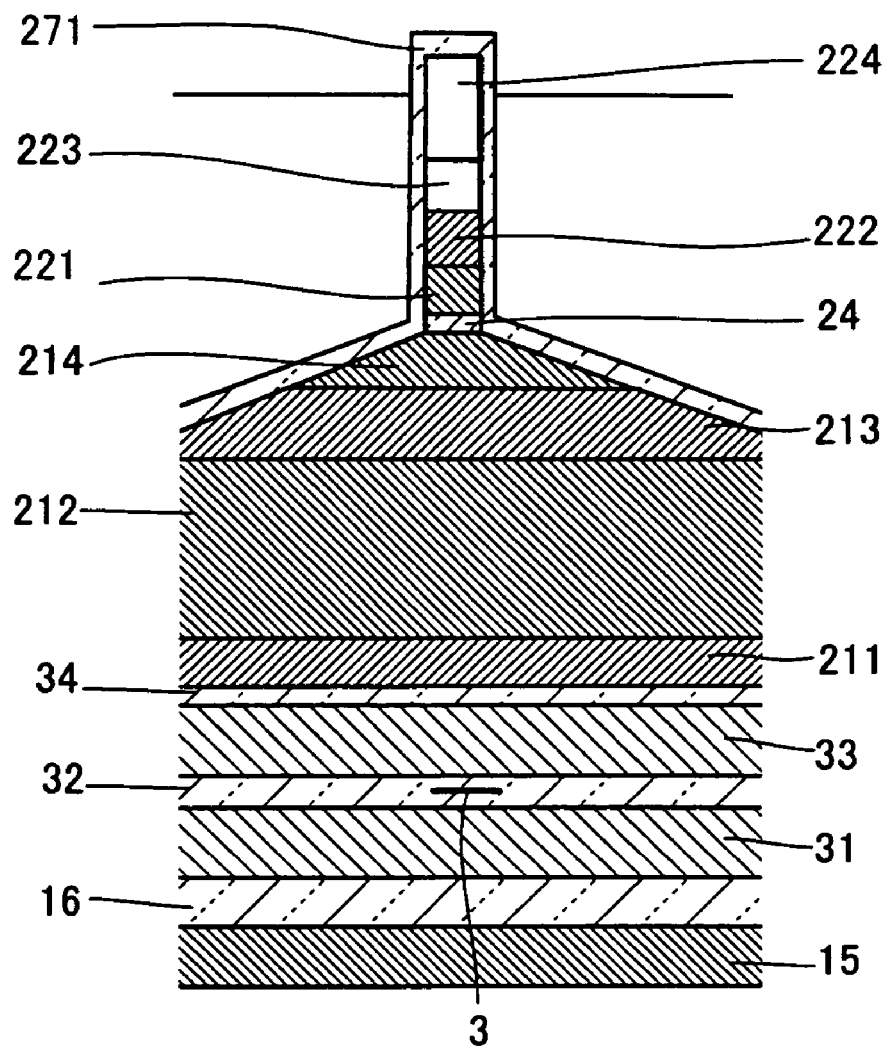
FIG. 67 is a sectional view of FIG. 66 taken along line 67—67.

Process Leading to a State of FIGS. 66 and 67

Next, an insulating film 271 is deposited on the surfaces and side surfaces of the insulating film 255, the third coil 233, the first to third upper pole films 221 to 223 and the third to sixth back gap films 218 and 224 to 226. The insulating film 271 is, specifically, formed about 0.1 to 0.15 µm in thickness by means of $Al_2O_3$-CVD with high-purity alumina.

Figure 68:
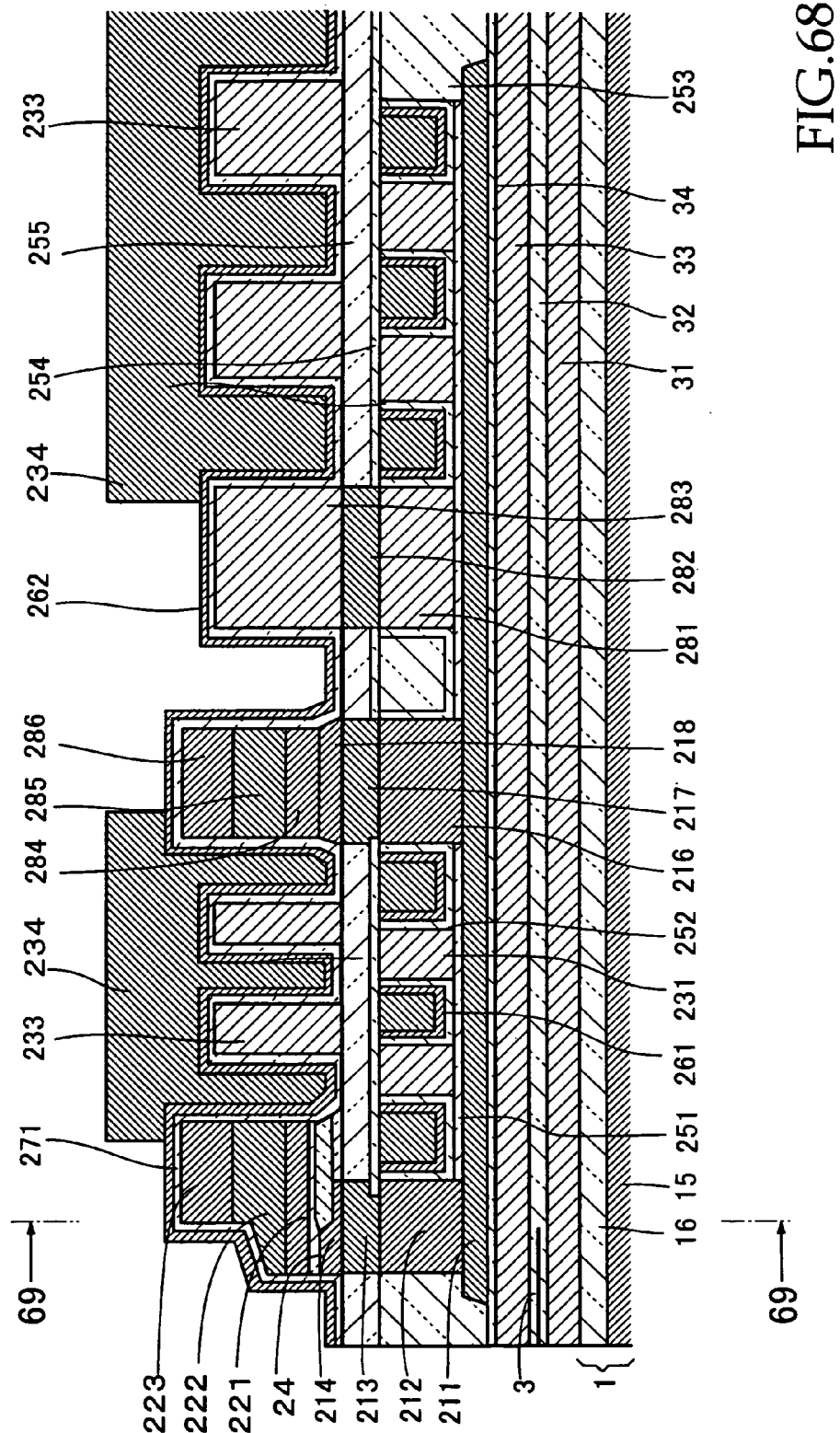
FIG. 68 is a diagram showing a process after the process shown in FIGS. 66 and 67.
Figure 69:
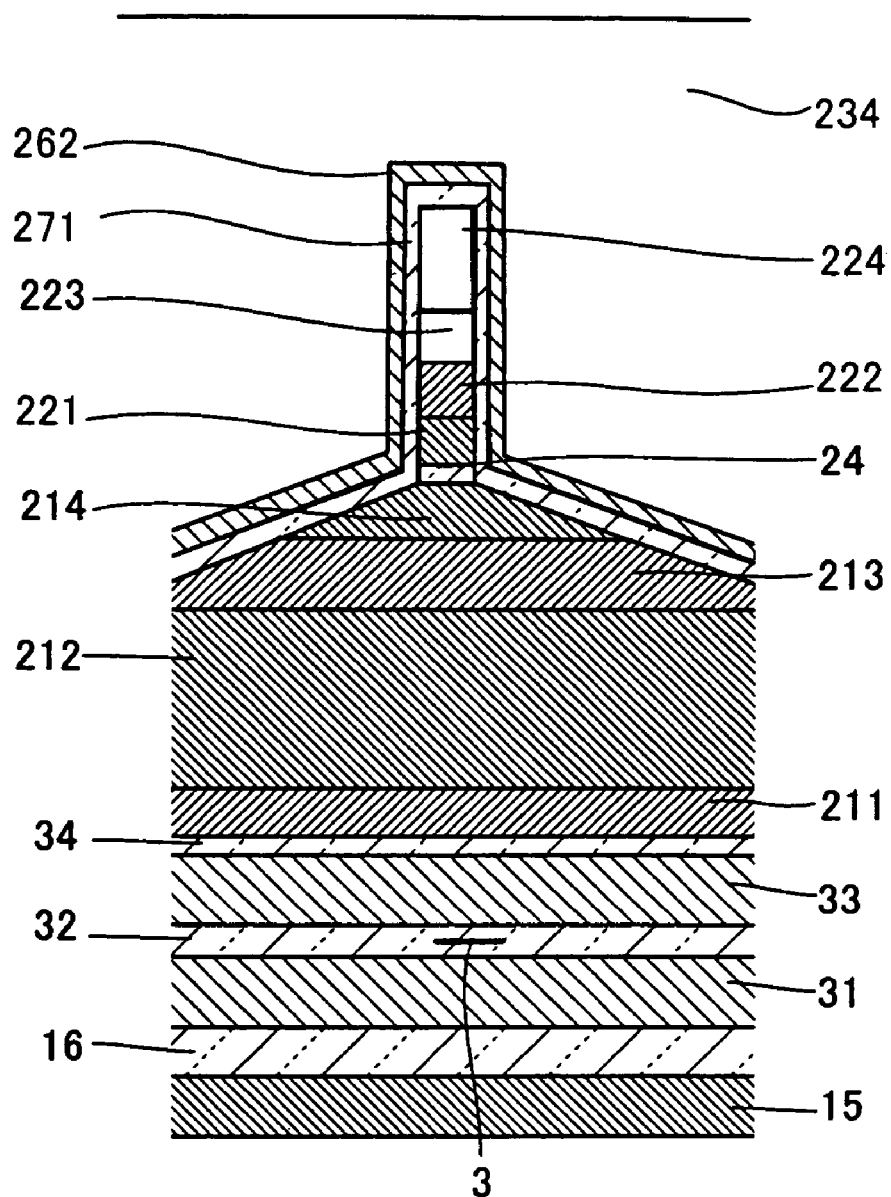
FIG. 69 is a sectional view of FIG. 68 taken along line 69—69.

Process Leading to a State of FIGS. 68 and 69

Next, a seed film 262 is deposited 50 to 80 nm in thickness on the surface of the insulating film 271 by means of sputtering or Cu-CVD.

Next, a plating film 234 to be a fourth coil is formed, for example, 3 to 4 µm in thickness on the seed film 262 by a frame plating method. The plating film 234 comprises Cu as its main constituent and is formed by a selective plating method.

Figure 70:
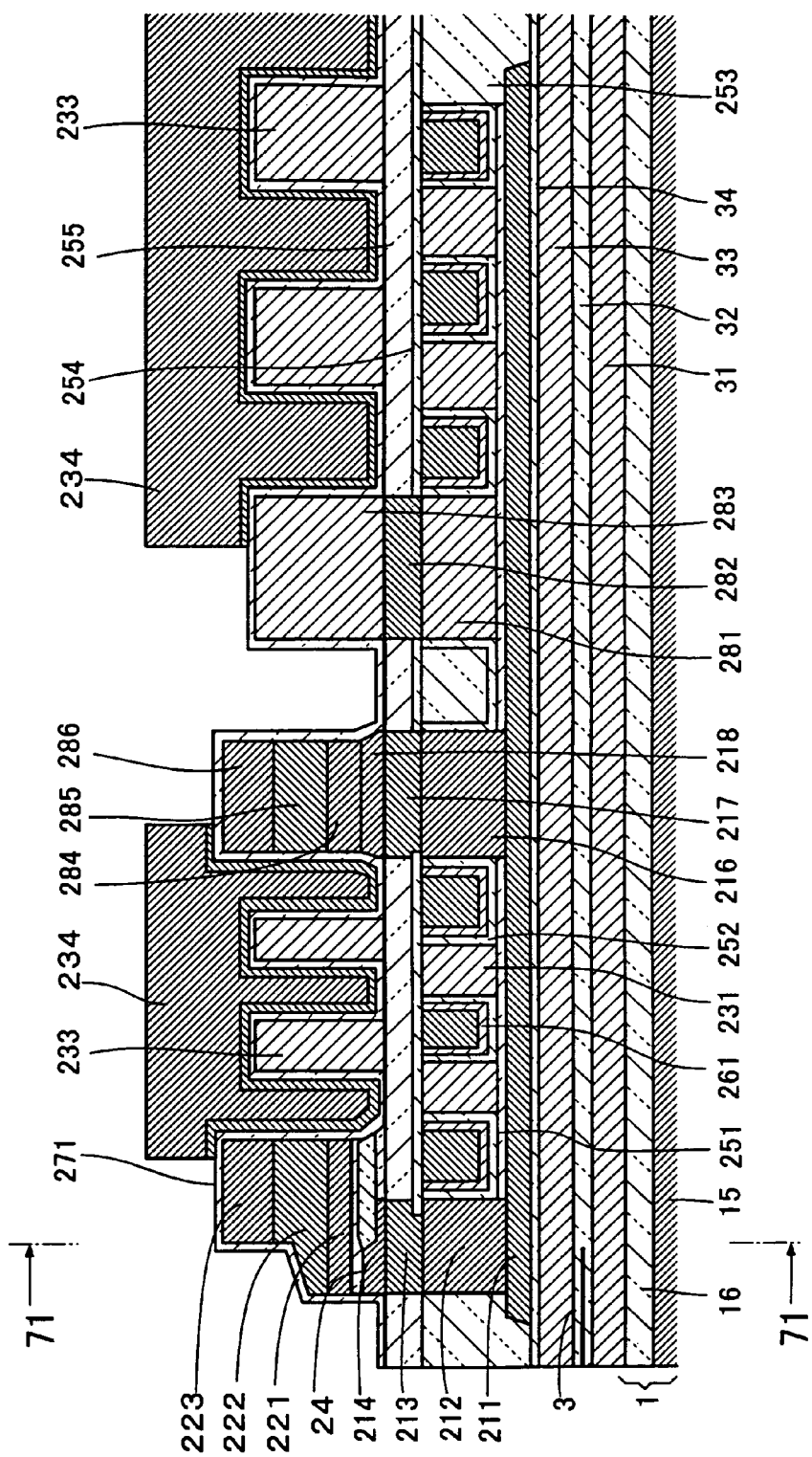
FIG. 70 is a diagram showing a process after the process shown in FIGS. 68 and 69.
Figure 71:
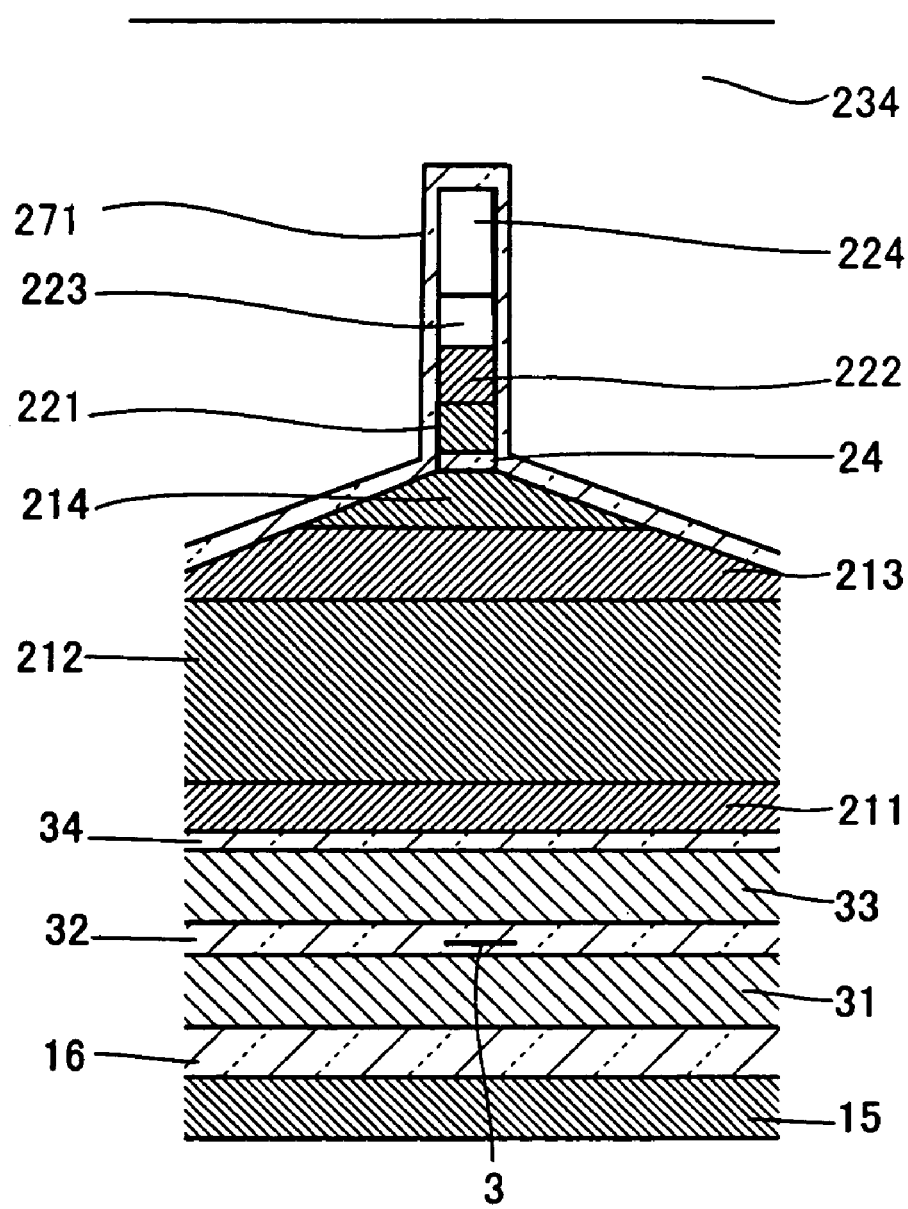
FIG. 71 is a sectional view of FIG. 70 taken along line 71—71.

Process Leading to a State of FIGS. 70 and 71

Parts of the seed film 262 not covered with the plating film 234 are removed by means of wet etching with dilute hydrochloric acid, dilute sulfuric acid, copper sulfate or the like, or dry etching such as ion milling.

The seed layer 262, which is formed by Cu-CVD, is a Cu-CVD film with excellent step coverage, which is deposited accurately according to the projections and indentations of the third coil 233. Consequently, even if the space between the coil turns of the third coil 233 is a long and narrow space, the plating film 234 to be a fourth coil is formed in the space without making a key hole.

Since a deposition gas required in Cu-CVD is expensive and Cu-CVD has excellent step coverage, Cu-CVD is used only for forming the seed film 262 in an uniform thickness in the long and narrow space and a necessary thickness is ensured by means of plating.

Hereupon, edges of the first to third upper pole films 221 to 223 and an edge of the fourth coil 234 are located close to each other with the insulating film 271 of $Al_2O_3$-CVD therebetween and so, they are close to the ABS. Consequently, the loss of magnetic flux is reduced and so, a write head with excellent over-write characteristic is obtained.

Figure 72:
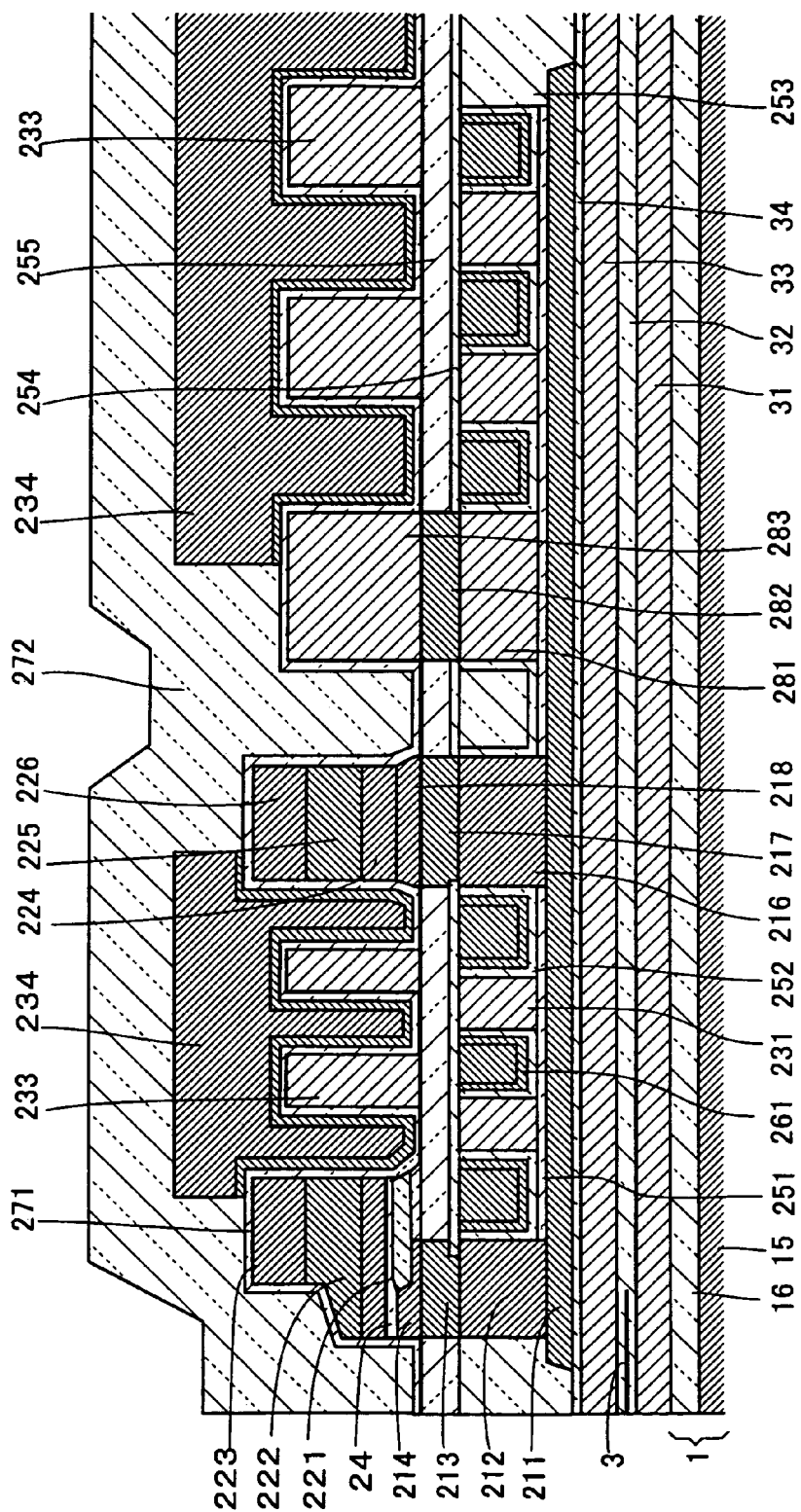
FIG. 72 is a diagram showing a process after the process shown in FIGS. 70 and 71.

Process Leading to a State of FIG. 72

Next, an insulating film 272 of $Al_2O_3$ is formed so as to cover the plating film 234 and the areas not covered with the plating film 234. The insulating film 272 is formed as a sputtering film of 4 to 6 μm in thickness.

Figure 73:
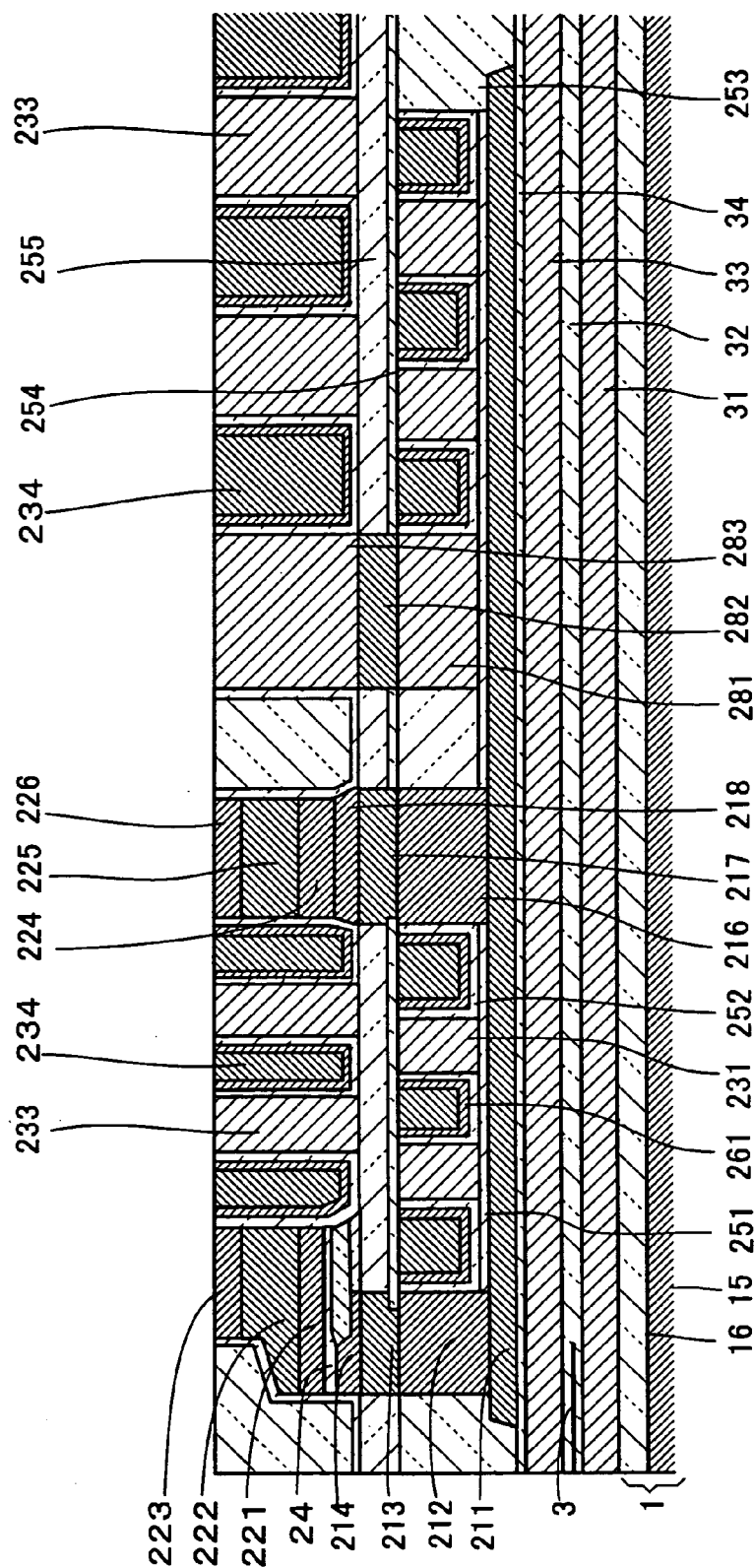
FIG. 73 is a diagram showing a process after the process shown in FIG. 72.

Process Leading to a State of FIG. 73

In a process leading from the state of FIG. 72 to a state of FIG. 73, the insulating film 272 and the plating film 234 are polished and flattened by CMP. Consequently, a fourth coil 234 in the flat spiral pattern is formed, insulated from the third coil 233 by the insulating film 272. In the CMP, the surfaces of the third upper pole film 223, the sixth connecting conductor film 226 and the insulating film 272 are also polished to be in the same plane as the surfaces of the third and fourth coils 233, 234.

Figure 74:
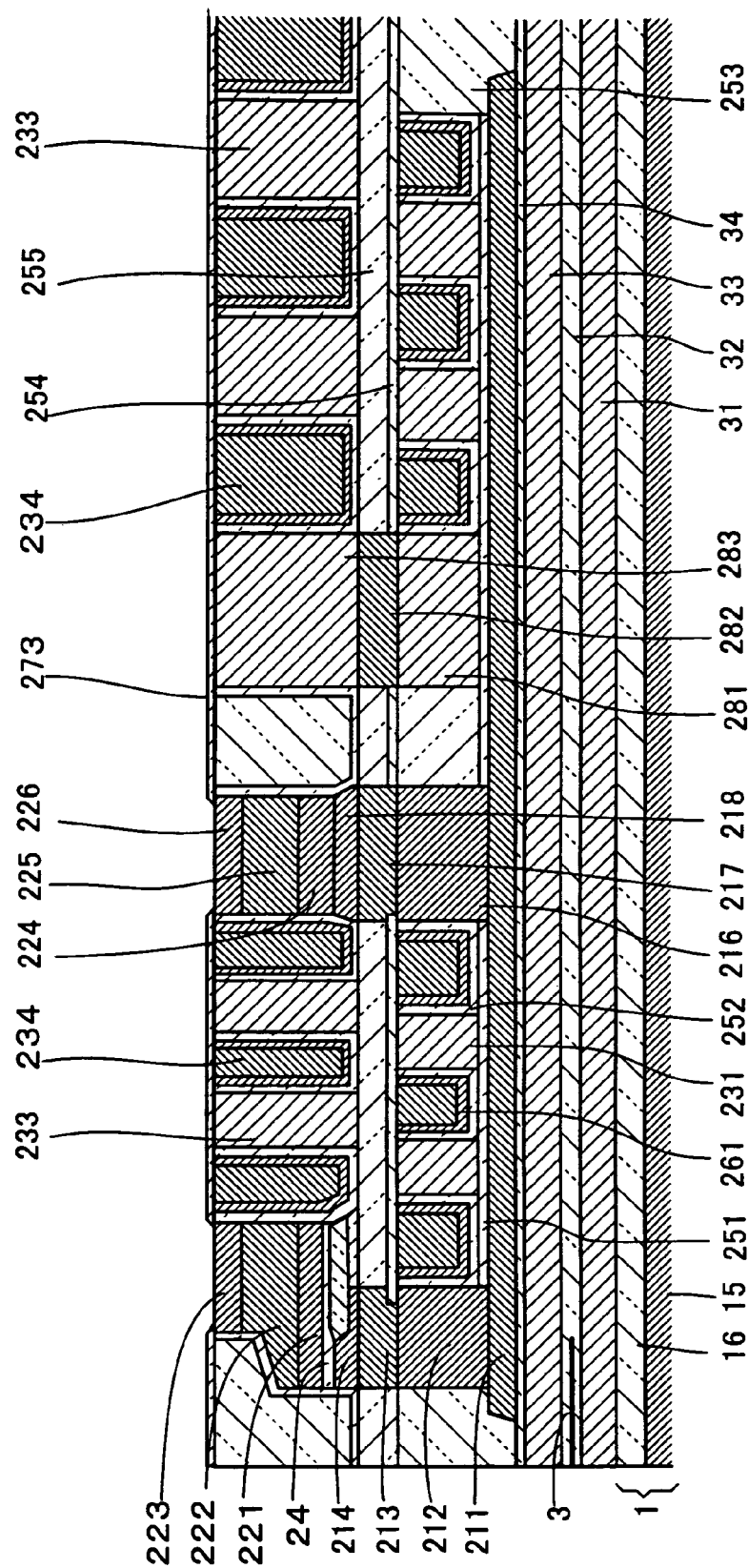
FIG. 74 is a diagram showing a process after the process shown in FIG. 73.

Process Leading to a State of FIG. 74

In a process leading from the state of FIG. 73 to a state of FIG. 74, an insulating film 273 covering the surface of the third and fourth coils 233, 234 is deposited thereon. The insulating film 273 is made of $Al_2O_3$ and formed, for example, 0.2 to 0.5 μm in thickness. Partial openings of the insulating film 273 are formed directly over the sixth back gap 226 and the fourth upper pole film 234.

Figure 75:
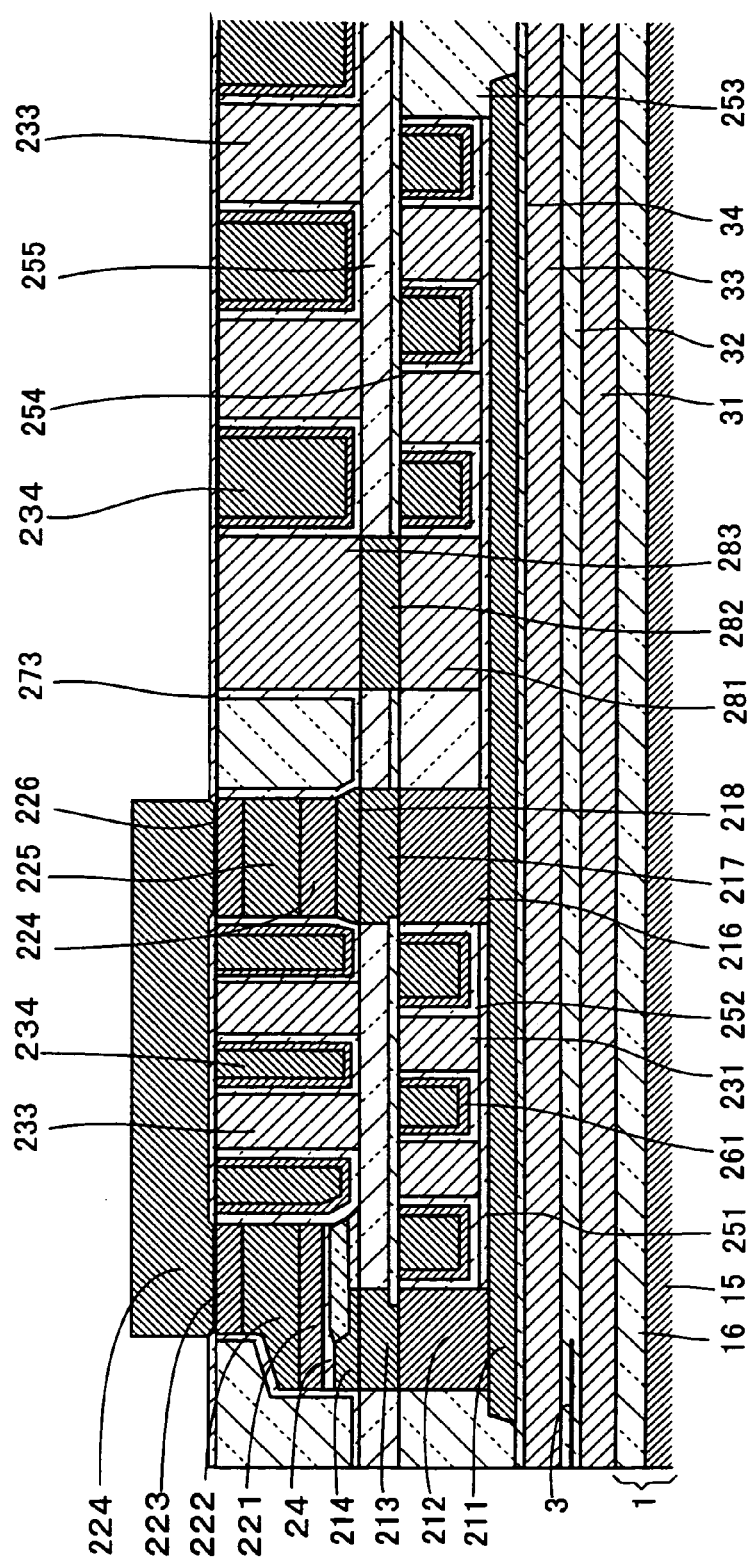
FIG. 75 is a diagram showing a process after the process shown in FIG. 74.
Figure 76:
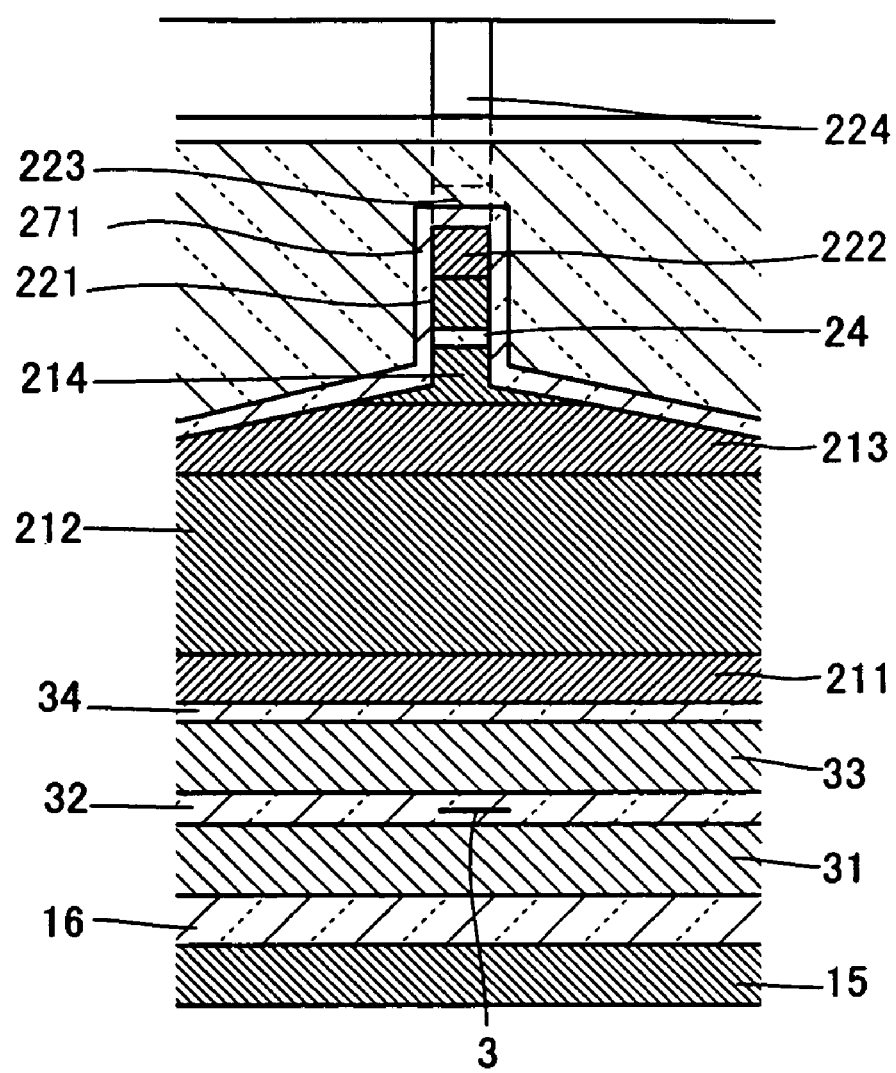
FIG. 76 is a view of the state shown in FIG. 75, seen from the ABS side.

Process Leading to a State of FIGS. 75 and 76

Next, an upper yoke 224 is formed on the surface of the insulating film 273 so as to connect the sixth back gap 226 and the fourth upper pole film 234. The upper yoke 224 is formed as a plating pattern of NiFe, CoNiFe or the like by a frame plating method.

Figure 77:
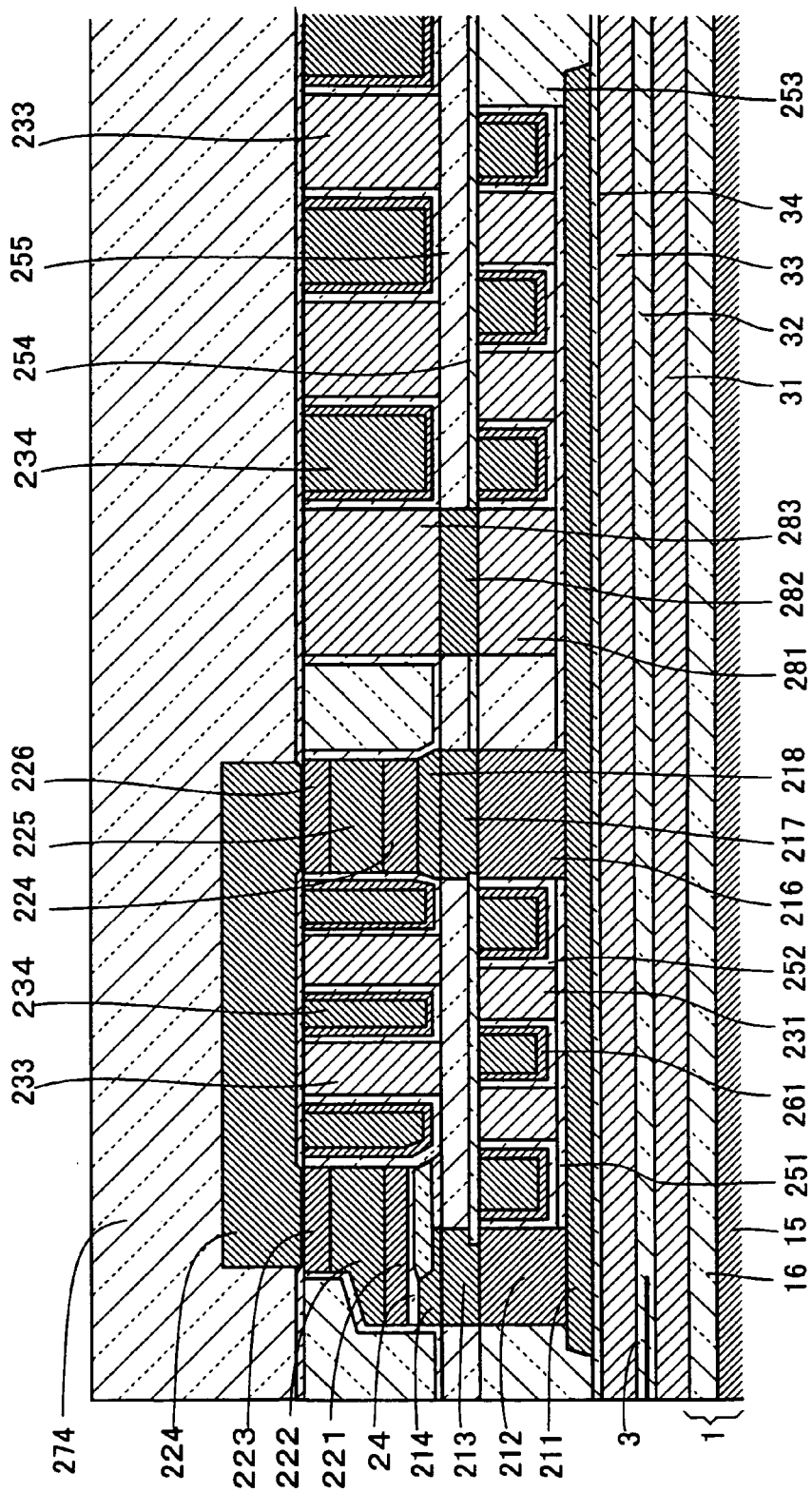
FIG. 77 is a diagram showing a process after the process shown in FIG. 76.

Process Leading to a State of FIG. 77

Next, a protective film 274 is deposited 20 to 40 μm in thickness thereon. The protective film 274 is formed by sputtering alumina.

Figure 78:
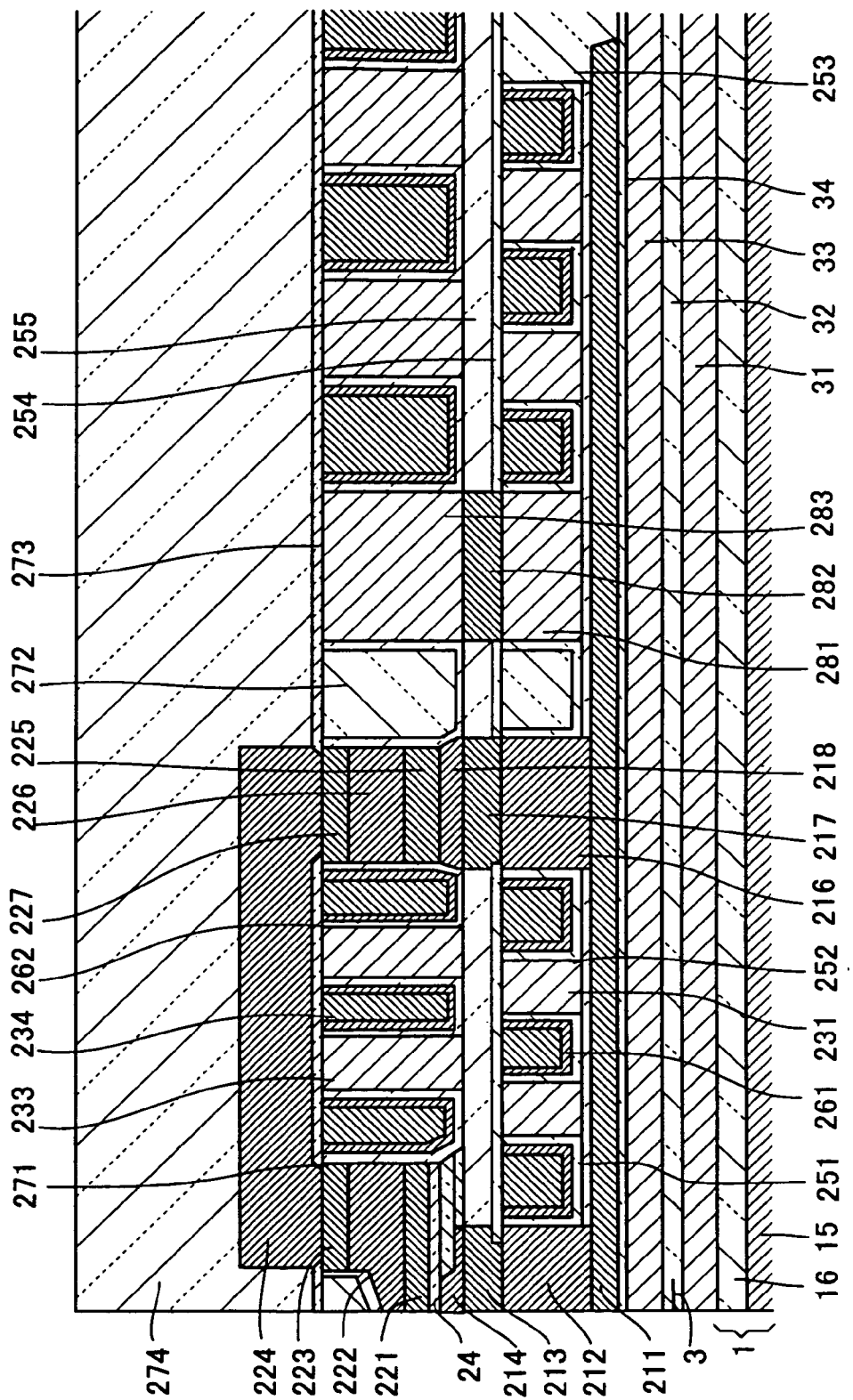
FIG. 78 is a diagram showing a process after the process shown in FIG. 77.
Figure 79:
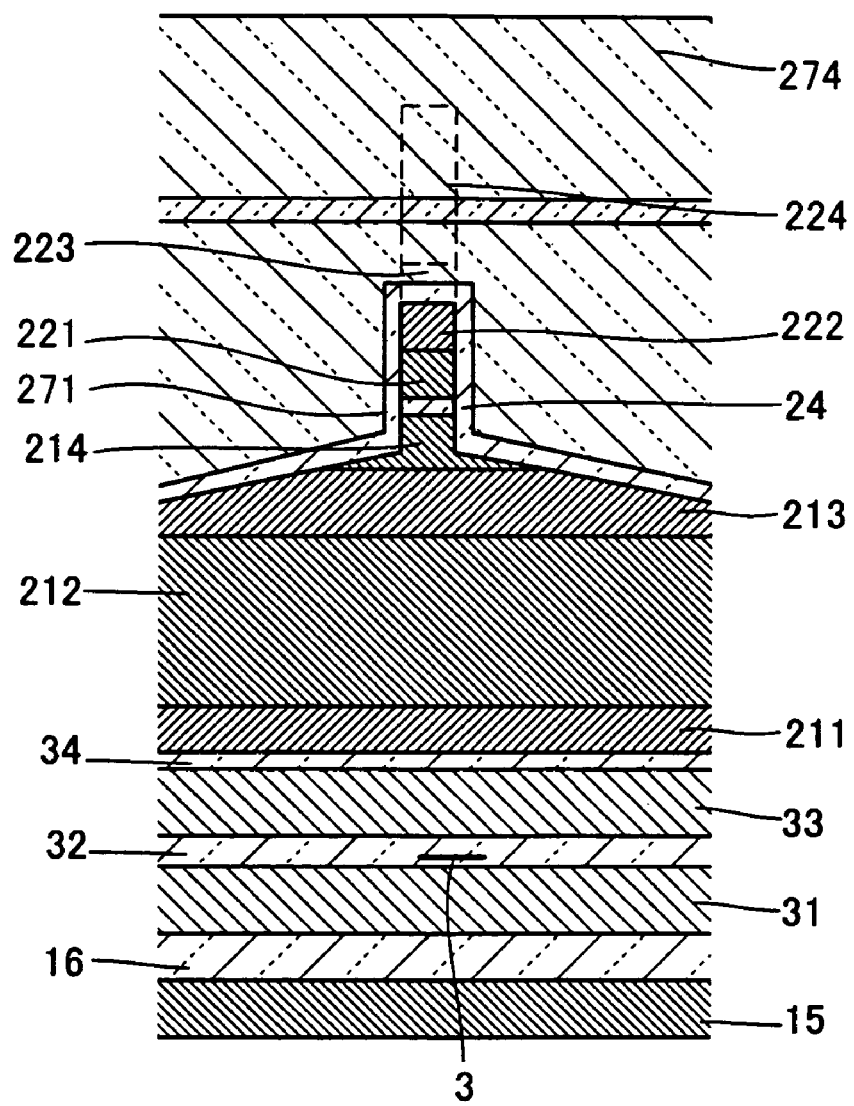
FIG. 79 is a view of the state shown in FIG. 78, seen from the ABS side.

Process Leading to a State of FIGS. 78 and 79

Next, a cutting process is performed to take a thin film magnetic head out of the wafer, the pole side of the magnetic head is polished. FIG. 78 shows a state in which the polishing has been performed. Hereupon, the first and second coils 231, 232 are arranged within the height of the second to fourth lower pole films 212 to 214 of the lower pole, and the third and fourth coils 233, 234 are arranged within the height of the first to third upper pole films 221 to 223 of the upper pole, and the gap film 24 is at an intermediate level in the pole length that is defined by the height of the second to fourth lower pole films 212 to 214 and the height of the first to third upper pole films 221 to 223. As a result, it is possible to balance the height of the lower pole disposed in the lower side of the gap film 24 with the height of the upper pole disposed in the upper side of the gap film 24, in spite of a coil-layered structure. Consequently, in case of polishing the ABS, uniformity in polishing quantity is achieved on the lower pole and the upper pole, which are disposed in both sides of the gap film 24. As a result, it is possible to avoid the collision between a magnetic head and a recording medium, which is caused by nonuniformity in polishing quantity. Consequently, it is possible to meet the demand for a low floating height of a slider, which is indispensable for high-density recording.

3. Magnetic Head Device and a Magnetic Recording/Reproducing Apparatus

Figure 80:
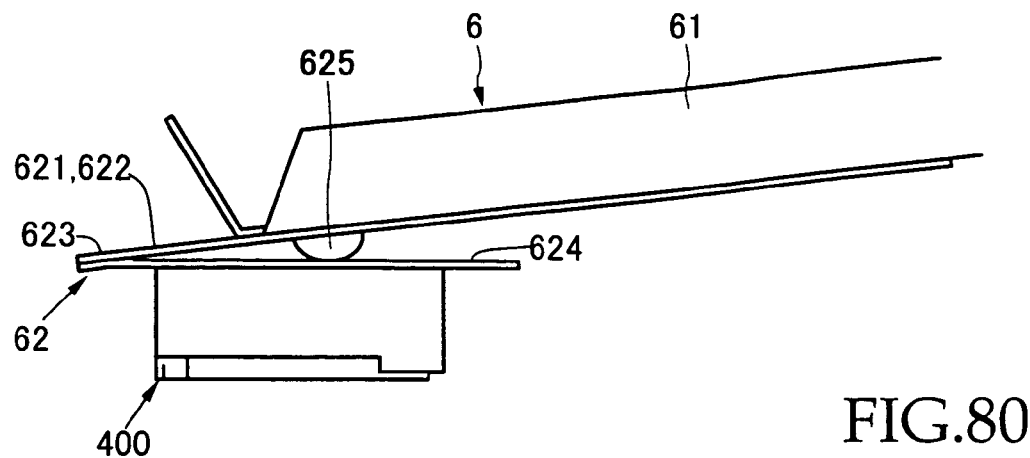
FIG. 80 is a front view of a magnetic head device using a thin film magnetic head according to the present invention.
Figure 81:
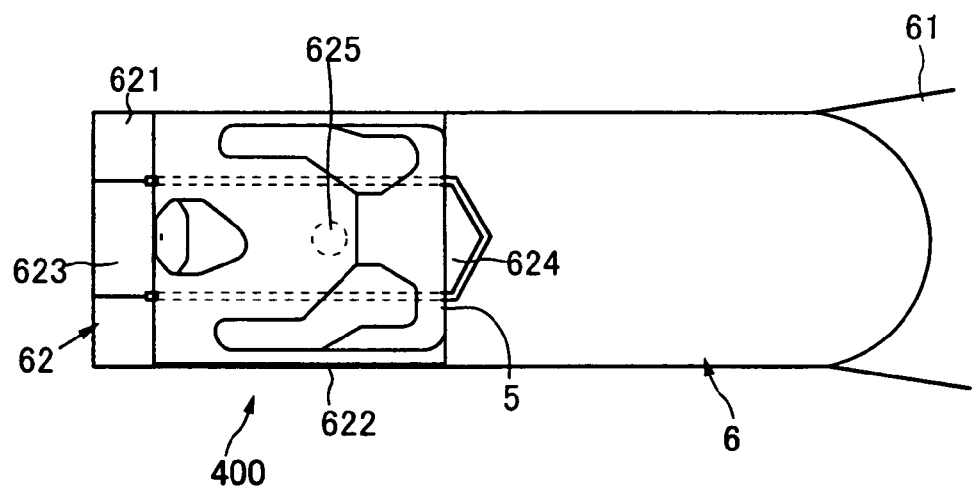
FIG. 81 is a view of the magnetic head device shown in FIG. 80, seen from the bottom side (ABS side)

The present invention also discloses a magnetic head device and a magnetic recording/reproducing apparatus. Referring to FIGS. 80 and 81, a magnetic head device according to the present invention comprises a thin film magnetic head 400 shown in FIGS. 1 to 7 and a head supporting device 6. The structure of the head supporting device 6 is as follows: a flexible member 62 made of a metal sheet is attached to a free end of a supporting member 61 made of a metal sheet, which the supporting member has at one end in the longitudinal direction thereof; and the thin film magnetic head 400 is attached to the lower surface of the flexible member 62.

Specifically, the flexible member 62 comprises: two outer frame portions 621 and 622 extending nearly in parallel with the longitudinal axial line of the supporting member 61; a lateral frame 623 for connecting the outer frame portions 621 and 622 at the end which is distant from the supporting member 61; and a tongue-shaped piece 624 extending nearly from the middle part of the lateral frame 623 nearly in parallel with the outer frame portions 621 and 622 and having a free end at the tip. One end of the flexible member 62 opposite to the lateral frame 623 is joined to the vicinity of the free end of the supporting member 61 by means of welding or the like.

The lower face of the supporting member 61 is provided with a loading projection 625 in the shape of a hemisphere, for example. This loading projection 625 transmits load from the free end of the supporting member 61 to the tongue-shaped piece 624.

The thin film magnetic head 400 is joined to the lower surface of the tongue-shaped piece 624 by means of adhesion or the like. The thin film magnetic head 400 is supported so as to allow pitching and rolling actions.

A head supporting device to which the present invention is applied is not limited to the above-described embodiment. The present invention can also be applied to head supporting devices which have been proposed up to now or will be proposed in the future. For example, the present invention can be applied to a head supporting device obtained by integrating the supporting member 61 and the tongue-shaped piece 624 by a flexible high-molecular wiring sheet such as a TAB tape (TAB: tape automated bonding), and a head supporting device having a publicly known conventional gimbals structure.

Figure 82:
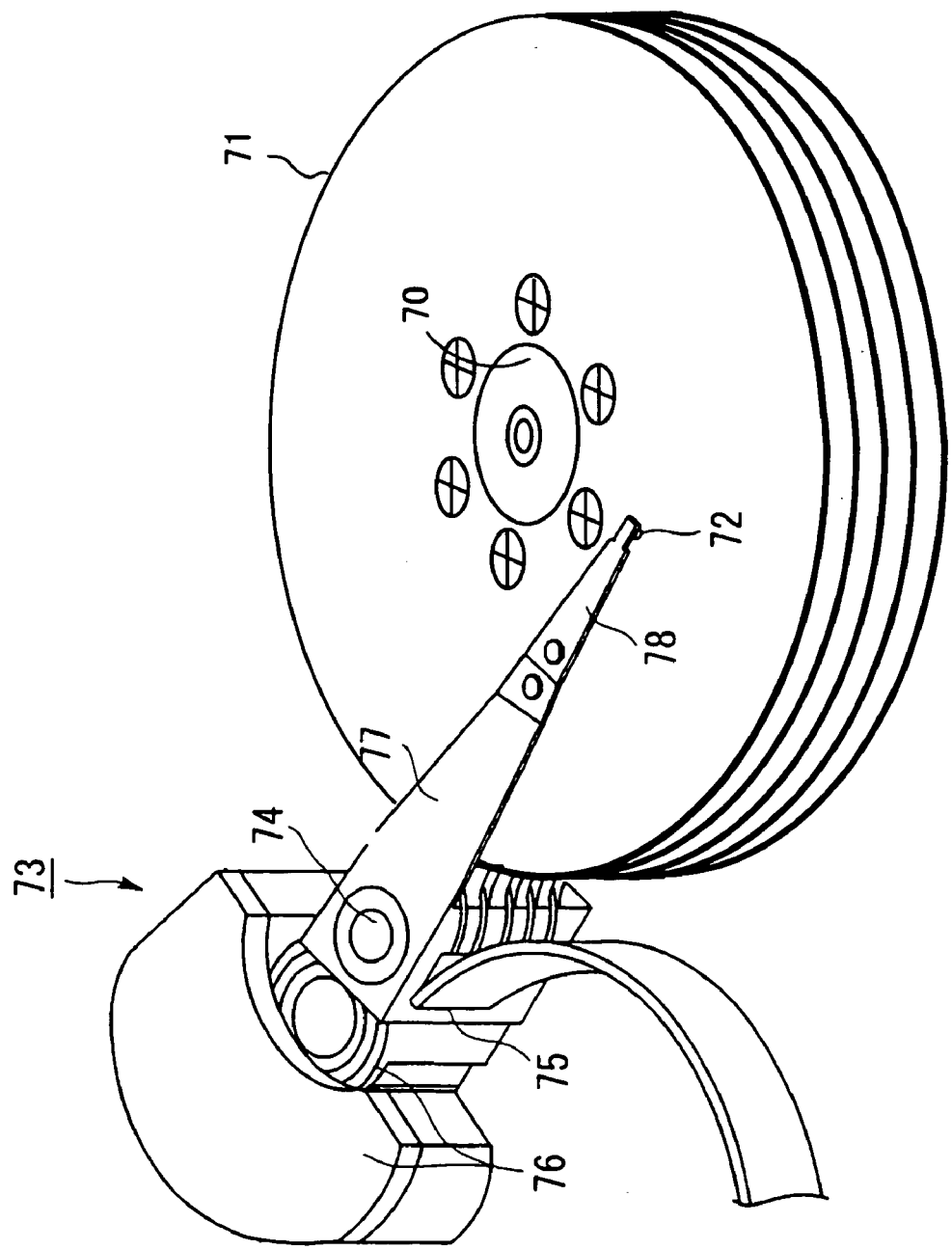
FIG. 82 is a perspective view roughly showing a magnetic recording/reproducing apparatus having a magnetic head device comprising a thin film magnetic head according to the present invention and a magnetic recording medium combined with one another.

Next, referring to FIG. 82, a magnetic recording/reproducing apparatus according to the present invention comprises a magnetic disk 71 provided so as to be capable of turning around an axis 70, a thin film magnetic head 72 for recording and reproducing information on the magnetic disk 71 and an assembly carriage device 73 for positioning the thin film magnetic head 72 on a track of the magnetic disk 71.

The assembly carriage device 73 comprises a carriage 75 capable of turning around an axis 74 and an actuator 76 composed of, for example, a voice coil motor (VCM) for turning this carriage 75, as main components.

The base portion of a plurality of driving arms 77 stacked in the axial direction of the axis 74 is attached to the carriage 75, and a head suspension assembly 78 with a thin film magnetic head 72 is fixedly joined to the tip of each driving arm 77. Each head suspension assembly 78 is joined to the tip of a driving arm 77 so that a thin film magnetic head 72 on the tip of the head suspension assembly 78 faces the surface of each magnetic disk 71.

The driving arm 77, head suspension assembly 78 and thin film magnetic head 72 form the magnetic-head device described with reference to FIGS. 80 and 81. The thin film magnetic head 72 has the structure shown in FIGS. 1 to 7. Thus, the magnetic recording/reproducing apparatus shown in FIG. 82 exhibits the action and effect described with reference to FIGS. 1 to 7.

Although the contents of the present invention have been concretely described above with reference to the preferred embodiments, it is obvious that people in this field can take various variations on the basis of the basic technical idea and teachings of the present invention.

What is claimed is:

1. A thin film magnetic head with a write element, the write element comprising a lower yoke, a lower pole, an upper yoke, an upper pole, a gap film, a lower coil, and an upper coil, wherein:
    the lower pole projects from one surface of the lower yoke at a medium-facing surface side;
    the upper yoke is disposed at a distance from the lower yoke and is connected to the lower yoke by a back gap portion that is recessed in the thin film magnetic head from a medium-facing surface;
    the upper pole is adjacent to the gap film, faces the lower pole with the gap film interposed between the lower pole and the upper pole, and has a top surface adjacent to one surface of the upper yoke;
    the lower coil surrounds in a spiral form the back gap portion and is arranged within a height of the lower pole in relation to said one surface of the lower yoke;
    the upper coil is disposed above the lower coil, is arranged within a height of the upper pole in relation to said one surface of the upper yoke, and surrounds in a spiral form the back gap portion;
    the gap film is at an intermediate level in a pole length that is defined by the height of the lower pole and the height of the upper pole;
    the lower coil comprises a first coil and a second coil;
    the first and second coils surround in a spiral form the back gap portion, and the first coil is fitted into a space between coil turns of the second coil and is insulated from the coil turns of the second coil, and the first and second coils are connected to each other so as to generate magnetic flux in the same direction;
    the upper coil comprises a third coil and a fourth coil; and
    the third and fourth coils surround in a spiral form the back gap portion, and the third coil is fitted into a space between coil turns of the fourth coil and is insulated from the coil turns of the fourth coil, and the third and fourth coils are connected to each other so as to generate magnetic flux in the same direction and connected to the lower coil so as to generate magnetic flux in the same direction as the lower coil.

2. The thin film magnetic head of claim 1, wherein the lower pole comprises:
    a first lower pole film formed of the lower yoke;
    a second lower pole film adjacent to the first lower pole film, having one surface flattened to the same level as the lower coil; and
    other lower pole films disposed in order adjacently to one another on the second lower pole film, where each of said other lower pole films has one surface flattened to the same level as an insulating film disposed in the vicinity of said each of said other lower pole films, and an uppermost film of said other lower pole films is adjacent to the gap film.

3. The thin film magnetic head of claim 2, wherein the lower pole comprises:
    a third lower pole film adjacent to the second lower pole film; and
    a fourth lower pole film adjacent to the third lower pole film, being the uppermost film in the lower pole.

4. The thin film magnetic head of claim 3, wherein the upper pole comprises:
    a plurality of upper pole films disposed in order adjacently to one another on the gap film, where an uppermost film of said plurality of upper pole films is adjacent to the upper yoke.

5. The thin film magnetic head of claim 4, wherein the upper pole comprises:
    a first upper pole film adjacent to the gap film;
    a second upper pole film adjacent to the first upper pole film; and
    a third upper pole film adjacent to the second upper pole film.

6. The thin film magnetic head of claim 5, further comprising a coil-connecting conductor, wherein:
    the coil-connecting conductor comprises:
        a first connecting conductor film formed of an inner end of the first coil and having one surface flattened to the same level as the first coil, the second coil and the second lower pole film;
        a second connecting conductor film made of the same material as the first connecting conductor film, disposed on said one surface of the first connecting conductor film and having one surface flattened to the same level as the third lower pole film that is adjacent to the second lower pole film;
        a third connecting conductor film adjacent to the second connecting conductor film;
        a fourth connecting conductor film adjacent to the third connecting conductor film;
        a fifth connecting conductor film adjacent to the fourth connecting conductor film; and
        a sixth connecting conductor film adjacent to the fourth connecting conductor film; and
    the back gap portion comprises:
        a first back gap film made of the same material as the second lower pole film, disposed on said one surface of the lower yoke and having one surface flattened to the same level as the first coil, the second coil and the second lower pole film;
a second back gap film made of the same material as the thud lower pole film, disposed on the second back gap film and having one surface flattened to the same level as the third lower pole film;
a third back gap film adjacent to the second back gap film;
a fourth back gap film adjacent to the third back gap film;
a fifth back gap film adjacent to the fourth back gap film; and
a sixth back gap film adjacent to the fifth back gap film.

7. The thin film magnetic head of claim 6, wherein:
the third lower pole film, the second connecting conductor film and the second back gap film have surfaces flattened to the same level;
the fourth lower pole film, the third connecting conductor film and the third back gap film have surfaces flattened to the same level;
the first upper pole film, the fourth connecting conductor film and the fourth back gap film have surfaces flattened to the same level;
the second upper pole film, the fifth connecting conductor film and the fifth back gap film have surfaces flattened to the same level;
the third upper pole film, the sixth connecting conductor film and the sixth back gap film have surfaces flattened to the same level as the top surfaces of the third and fourth coils; and
the upper yoke has one end adjacent to the third upper pole film and the other end adjacent to the sixth back gap film.

8. A method for manufacturing a thin film magnetic head comprising a write element, comprising the steps of:
forming a lower pole, a lower coil, a back gap portion, and a coil-connecting conductor on one surface of a lower yoke so that the lower coil surrounds in a spiral form the back gap portion and is arranged within a height of the lower pole in relation to said one surface of the lower yoke, and one end of the lower coil is formed of a first connecting conductor film of the coil-connecting conductor;
forming an insulating film covering the lower coil, and a gap film adjacent to the lower pole;
forming an upper coil on the insulating film, and an upper pole on the gap film so that the upper coil is disposed above the lower coil and is arranged within a height of the upper pole, and the upper coil surrounds in a spiral form the back gap portion and is connected to the lower coil by the coil-connecting conductor;
forming an upper yoke so that the upper yoke connects the upper pole and the back gap portion and
producing the thin film magnetic head of claim 1.

9. The manufacturing method of claim 8, wherein the step of forming the lower coil includes the steps of:
forming a first coil in a spiral form; and
forming a second coil so that the second coil is fitted into a space between coil turns of the first coil, is insulated from the coil turns of the first coil and is connected to the first coil so as to generate magnetic flux in the same direction as the first coil.

10. The manufacturing method of claim 9, wherein the step of forming the upper coil includes the steps of:
forming a third coil in a spiral form; and
forming a fourth coil so that the fourth coil is fitted into a space between coil turns of the third coil, is insulated from the coil turns of the third coil and is connected to the first, second and third coils so as to generate magnetic flux in the same direction as the first, second and third coils.

11. The manufacturing method of claim 10, comprising the steps of:
forming the lower coil, a second lower pole film, a first back gap film and a first connecting conductor film on one surface of the lower yoke which forms a first lower pole film;
flattening surfaces of the lower coil, the second lower pole film, the first back gap film and the first connecting conductor film; and
forming the gap film, the upper pole, the upper coil and the upper yoke after flattening surfaces of the lower coil, the second lower pole film, the first back gap film and the first connecting conductor film.

12. The manufacturing method of claim 11, comprising the steps of:
flattening surfaces of the upper pole and the upper coil after forming the gap film, the upper pole and the upper coil;
forming another insulating film on the flattened surface thus obtained; and
forming the upper yoke on said another insulating film.

13. A magnetic recording/reproducing apparatus comprising a thin film magnetic head and a magnetic recording medium, wherein:
the thin film magnetic head comprises a write element, the write element comprising a lower yoke, a lower pole, an upper yoke, an upper pole, a gap film, a lower coil, and an upper coil;
the lower yoke has one flat surface;
the lower pole projects from said one surface of the lower yoke at a medium-facing surface side and has a reduced track width at an upper end adjacent to the gap film;
the upper yoke is disposed at a distance from the lower yoke and is connected to the lower yoke by a back gap portion that is recessed in the thin film magnetic head from a medium-facing surface;
the upper pole is adjacent to the gap film, faces an upper end of the lower pole with the gap film interposed between the upper end of the lower pole and the upper pole, and has a top surface adjacent to one surface of the upper yoke;
the lower coil surrounds in a spiral form the back gap portion and is arranged within a height of the lower pole in relation to said one surface of the lower yoke;
the upper coil is disposed above the lower coil, is arranged within a height of the upper pole in relation to said one surface of the upper yoke, and surrounds in a spiral form the back gap portion;
the gap film is at an intermediate level in a pole length that is defined by the height of the lower pole and the height of the upper pole;
the lower coil comprises a first coil and a second coil;
the first and second coils surround in a spiral form the back gap portion, and the first is fitted into a space between coil turns of second coil and is insulated from the coil turns of the second coil, and the first and second coils are connected to each other so as to generate magnetic flux in the same direction;
the upper coil comprises a third coil and a fourth coil; and
the third and fourth coils surround in a spiral form the back gap portion, and the third is fitted into a space between coil turns of the fourth coil and is insulated from the coil turns of the fourth coil, and the third and fourth coils are connected to each other so as to generate magnetic flux in the same direction and connected to the lower coil so as to generate magnetic flux in the same direction as the lower coil.

14. The magnetic recording/reproducing apparatus of claim 13, wherein the lower pole comprises:
   a first lower pole film formed of the lower yoke;
   a second lower pole film adjacent to the first lower pole film, having one surface flattened to the same level as the lower coil; and
   other lower pole films disposed in order adjacently to one another on the second lower pole film, where each of said other lower pole films has one surface flattened to the same level as an insulating film disposed in the vicinity of said each of said other lower pole films, and an uppermost film of said other lower pole films is adjacent to the gap film.

15. The magnetic recording/reproducing apparatus of claim 14, wherein the lower pole comprises:
   a third lower pole film adjacent to the second lower pole film; and
   a fourth lower pole film adjacent to the third lower pole film, being the uppermost film in the lower pole.

16. The magnetic recording/reproducing apparatus of claim 15, wherein the upper pole comprises:
   a plurality of upper pole films disposed in order adjacently to one another on the gap film, where an uppermost film of said plurality of upper pole films is adjacent to the upper yoke.

17. The magnetic recording/reproducing apparatus of claim 16, wherein the upper pole comprises:
   a first upper pole film adjacent to the gap film;
   a second upper pole film adjacent to the first upper pole film; and
   a third upper pole film adjacent to the second upper pole film.

18. The magnetic recording/reproducing apparatus of claim 17, further comprising a coil-connecting conductor, wherein:
   the coil-connecting conductor comprises:
      a first connecting conductor film formed of an inner end of the first coil and having one surface flattened to the same level as the first coil, the second coil and the second lower pole film;
      a second connecting conductor film made of the same material as the first connecting conductor film, disposed on said one surface of the first connecting conductor film and having one surface flattened to the same level as the third lower pole film that is adjacent to the second lower pole film;
      a third connecting conductor film adjacent to the second connecting conductor film;
      a fourth connecting conductor film adjacent to the third connecting conductor film;
      a fifth connecting conductor film adjacent to the fourth connecting conductor film; and
      a sixth connecting conductor film adjacent to the fourth connecting conductor film; and
   the back gap portion comprises:
      a first back gap film made of the same material as the second lower pole film, disposed on said one surface of the lower yoke and having one surface flattened to the same level as the first coil, the second coil and the second lower pole film;
      a second back gap film made of the same material as the third lower pole film, disposed on the second back gap film and having one surface flattened to the same level as the third lower pole film;
      a third back gap film adjacent to the second back gap film;
      a fourth back gap film adjacent to the third back gap film;
      a fifth back gap film adjacent to the fourth back gap film; and
      a sixth back gap film adjacent to the fifth back gap film.

19. The magnetic recording/reproducing apparatus of claim 18, wherein:
   the third lower pole film, the second connecting conductor film and the second back gap film have surfaces flattened to the same level;
   the fourth lower pole film, the third connecting conductor film and the third back gap film have surfaces flattened to the same level;
   the first upper pole film, the fourth connecting conductor film and the fourth back gap film have surfaces flattened to the same level;
   the second upper pole film, the fifth connecting conductor film and the fifth back gap film have surfaces flattened to the same level;
   the third upper pole film, the sixth connecting conductor film and the sixth back gap film have surfaces flattened to the same level as the top surfaces of the third and fourth coils; and
   the upper yoke has one end adjacent to the third upper pole film and the other end adjacent to the sixth back gap film.

* * * * *